(12) United States Patent
Shirman et al.

(10) Patent No.: US 11,590,483 B2
(45) Date of Patent: Feb. 28, 2023

(54) ENHANCED CATALYTIC MATERIALS WITH PARTIALLY EMBEDDED CATALYTIC NANOPARTICLES

(71) Applicant: President and Fellows of Harvard College, Cambridge, MA (US)

(72) Inventors: Elijah Shirman, Arlington, MA (US); Tanya Shirman, Arlington, MA (US); Joanna Aizenberg, Boston, MA (US); Michael Aizenberg, Boston, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 0 days.

(21) Appl. No.: 16/651,951

(22) PCT Filed: Oct. 1, 2018

(86) PCT No.: PCT/US2018/053822
§ 371 (c)(1),
(2) Date: Mar. 27, 2020

(87) PCT Pub. No.: WO2019/068110
PCT Pub. Date: Apr. 4, 2019

(65) Prior Publication Data
US 2020/0254432 A1 Aug. 13, 2020

Related U.S. Application Data

(60) Provisional application No. 62/566,285, filed on Sep. 29, 2017.

(51) Int. Cl.
*B01J 21/00* (2006.01)
*B01J 23/00* (2006.01)
(Continued)

(52) U.S. Cl.
CPC ....... *B01J 35/0013* (2013.01); *B01J 23/8993* (2013.01); *B01J 35/006* (2013.01)

(58) Field of Classification Search
CPC ...... B01J 35/006; B01J 35/0013; B01J 23/00; B01J 21/00
See application file for complete search history.

(56) References Cited

U.S. PATENT DOCUMENTS

| 4,746,468 A | 5/1988 | Ozaki et al. |
| 6,853,760 B2 | 2/2005 | Sekine et al. |

(Continued)

FOREIGN PATENT DOCUMENTS

| CN | 102892506 A | 1/2013 |
| CN | 103547363 A | 1/2014 |

(Continued)

OTHER PUBLICATIONS

Agrawal et al., "Recent developments in fabrication and applications of colloid based composite particles," J. Mater. Chem., first published Oct. 20, 2010, vol. 21, pp. 615-627.
(Continued)

*Primary Examiner* — Cam N. Nguyen
(74) *Attorney, Agent, or Firm* — Foley & Lardner LLP

(57) ABSTRACT

Aspects of the present application provides for enhanced catalytic materials, which can feature multiple functional and/or catalytic species, and methods of their formation. The materials can include catalytic nanoparticles (NPs) partially embedded within a supporting matrix. Treatment of the material, e.g., thermal, optical, microwave, plasma, and/or chemical treatment, can lead to the formation of functionally, e.g., catalytic or co-catalytic, relevant chemical and structural/morphological species or features at the NP-ma-
(Continued)

trix, NP-pore, and matrix-pore interfaces. The treated material is characterized by enhanced properties, e.g., greater mechanical stability.

23 Claims, 47 Drawing Sheets

(51) Int. Cl.
 B01J 35/00 (2006.01)
 B01J 23/89 (2006.01)

(56) References Cited

U.S. PATENT DOCUMENTS

| | | | |
|---|---|---|---|
| 7,373,073 B2 | 5/2008 | Kamp et al. | |
| 7,700,520 B2 | 4/2010 | Chien et al. | |
| 7,902,275 B2* | 3/2011 | Gerhardt | H01B 1/24 524/1 |
| 8,334,014 B1 | 12/2012 | Petsev et al. | |
| 8,389,388 B2 | 3/2013 | Cho et al. | |
| 8,574,520 B2 | 11/2013 | Koplin et al. | |
| 8,613,900 B2* | 12/2013 | Frei | A61K 33/26 502/305 |
| 8,642,496 B2* | 2/2014 | Xia | B01J 23/626 429/484 |
| 8,835,003 B2 | 9/2014 | Chen et al. | |
| 8,936,683 B2 | 1/2015 | Marshall | |
| 8,974,993 B2 | 3/2015 | Richards-Johnson et al. | |
| 9,279,771 B2 | 3/2016 | Aizenberg et al. | |
| 9,441,462 B2* | 9/2016 | Chakraborty | B29C 44/02 |
| 9,682,170 B2* | 6/2017 | Malshe | A61L 27/32 |
| 9,861,958 B2* | 1/2018 | O'Keefe | C23C 22/83 |
| 9,957,379 B2* | 5/2018 | Hecht | C08K 7/22 |
| 10,245,322 B2* | 4/2019 | Lal | A61K 9/0009 |
| 10,265,694 B2* | 4/2019 | Aizenberg | B01J 37/0018 |
| 10,345,279 B1* | 7/2019 | Ohodnicki, Jr. | G01N 21/59 |
| 10,441,918 B2 | 10/2019 | Bauer | |
| 10,864,270 B2* | 12/2020 | Lal | A61K 47/6941 |
| 2003/0091647 A1 | 5/2003 | Lewis et al. | |
| 2003/0162004 A1 | 8/2003 | Mirkin et al. | |
| 2003/0215638 A1* | 11/2003 | Charnay | B22F 1/054 427/222 |
| 2008/0248086 A1* | 10/2008 | Asgari | A61L 27/58 424/426 |
| 2008/0249637 A1* | 10/2008 | Asgari | A61F 2/30756 623/23.72 |
| 2008/0249638 A1* | 10/2008 | Asgari | A61L 27/54 623/23.75 |
| 2009/0072222 A1 | 3/2009 | Radisic et al. | |
| 2009/0242839 A1 | 10/2009 | Winkler et al. | |
| 2009/0305135 A1* | 12/2009 | Shi | H01M 4/625 429/217 |
| 2011/0194304 A1 | 8/2011 | Han et al. | |
| 2011/0311635 A1 | 12/2011 | Stucky et al. | |
| 2011/0312080 A1 | 12/2011 | Hatton et al. | |
| 2012/0121820 A1 | 5/2012 | Kaplan et al. | |
| 2012/0238442 A1 | 9/2012 | Lee | |
| 2012/0326104 A1 | 12/2012 | Kwon et al. | |
| 2013/0337257 A1 | 12/2013 | Yano et al. | |
| 2014/0027346 A1 | 1/2014 | Chaumonnot et al. | |
| 2014/0254017 A1 | 9/2014 | Manoharan et al. | |
| 2015/0140317 A1 | 5/2015 | Biberger et al. | |
| 2016/0144350 A1 | 5/2016 | Aizenberg et al. | |
| 2017/0354962 A1 | 12/2017 | D'Souza et al. | |
| 2020/0023346 A1* | 1/2020 | Aizenberg | B01J 23/52 |

FOREIGN PATENT DOCUMENTS

| | | |
|---|---|---|
| CN | 105960272 A | 9/2016 |
| CN | 106659974 A | 5/2017 |
| CN | 107108206 A | 8/2017 |
| EA | 016136 | 2/2012 |
| JP | 2003-121601 A | 4/2003 |
| JP | 2008-173635 A | 7/2008 |
| JP | 2016-531066 A | 10/2016 |
| WO | WO-2009/148082 A1 | 12/2009 |
| WO | WO-2012/078351 A2 | 6/2012 |
| WO | WO-2014/210608 A1 | 12/2014 |
| WO | WO-2015/017722 A | 2/2015 |
| WO | WO-2017/173306 A1 | 10/2017 |
| WO | WO-2017/173439 A2 | 10/2017 |

OTHER PUBLICATIONS

Albrecht et al., "Thermal conductivity of opals and related composites," Physical Review B, Mar. 2001, vol. 63, p. 134303-1 to 134303-8.
An et al., "Nanocatalysis I: Synthesis of Metal and Bimetallic Nanoparticles and Porous Oxides and Their Catalytic Reaction Studies", Catal. Lett., 2015, vol. 145, pp. 233-248.
Anderson et al., "Nanoparticle conversion chemistry: Kirkendall effect, galvanic exchange, and anion exchange", Nanoscale, Nov. 7, 2014, vol. 6, No. 21, pp. 12195-12216.
Aprile et al., "Enhancement of the photocatalytic activity of TiO2 through spatial structuring and particle size control: from subnanometric to submillimetric length scale," Physical Chemistry Chemical Physics, Feb. 14, 2008, vol. 10, pp. 769-783.
Argyle et al., "Heterogeneous Catalyst Deactivation and Regeneration: A Review", Catalysts, Feb. 26, 2015, vol. 5, pp. 145-269.
Armstrong et al., "Artificial opal photonic crystals and inverse opal structures—fundamentals and applications from optics to energy storage," Journal of Materials Chemistry C, May 20, 2015, vol. 3, pp. 6109-6143.
Bacci et al., "Non-destructive spectroscopic detection of cobalt(II) in paintings and glass", Studies in Conservation, 1996, vol. 41, No. 3, pp. 136-144.
Biener et al., "Nanoporous Plasmonic Metamaterials," Adv. Mater. 20:1211-1217, 2008.
Biesinger et al., "Resolving surface chemical states in XPS analysis of first row transition metals, oxides and hydroxides: Cr, Mn, Fe, Co and Ni," Applied Surface Science, published online Oct. 20, 2010, vol. 257, pp. 2717-2730.
Boal et al., "Self-assembly of nanoparticles into structured spherical and network aggregates," Nature, Apr. 13, 2000, vol. 404, pp. 746-748.
Burgess et al., "Wetting in Color: Colorimetric Differentiation of Organic Liquids with High Selectivity," ACS Nano (2012), published online Dec. 20, 2011, vol. 6, pp. 1427-1437.
Cai et al., "Two-Dimensional Photonic Crystal Chemical and Biomolecular Sensors," Analytical Chemistry, Apr. 13, 2015, vol. 87, pp. 5013-5025.
Campbell, "The Energetics of Supported Metal Nanoparticles: Relationships to Sintering Rates and Catalytic Activity," Accounts of Chemical Research, published online Apr. 22, 2013, vol. 46, pp. 1712-1719.
Cao et al., "Stabilizing metal nanoparticles for heterogeneous catalysis", Physical Chemistry Chemical Physics, 2010, vol. 12, pp. 13499-13510.
Caruso, "Nanoengineering of Particle Surfaces", Advanced Materials, Jan. 5, 2001, vol. 13, No. 1, pp. 11-22.
Chemseddine et al., "Nanostructuring Titania: Control over Nanocrystal Structure, Size, Shape, and Organization," Eur. J. Inorg. Chem, Jan. 18, 1999, vol. 1999, Issue 2, pp. 235-245.
Chen et al., "A novel green synthesis approach for polymer nanocomposites decorated with silver nanoparticles and their antibacterial activity," Analyst, Nov. 21, 2014, vol. 139, pp. 5793-5799.
Chen et al., "Creating dynamic SERS hotspots on the surface of pH-responsive microgels for direct detection of crystal violet in solution," RSC Advances, Jun. 27, 2017, vol. 7, pp. 32743-32748.
Chen et al., "Effect of Disorder on the Optically Amplified Photocatalytic Efficiency of Titania Inverse Opals," J. Am. Chem. Soc. Jan. 12, 2007, vol. 129, pp. 1196-1202.
Chen et al., "Heterogeneous photocatalysis with inverse titania opals: probing structural and photonic effects," Journal of Materials Chemistry, first published online Mar. 17, 2009, vol. 19, pp. 2675-2678.

(56) References Cited

OTHER PUBLICATIONS

Cherdhirankorn et al., "Tracer Diffusion in Silica Inverse Opals," Langmuir, published online Mar. 16, 2010, vol. 26, pp. 10141-10146.
Climent et al., "Heterogeneous Catalysis for Tandem Reactions," ACS Catalysis, Jan. 23, 2014, vol. 4, pp. 870-891.
Corma et al., "Supported gold nanoparticles as catalysts for organic reactions", Chemical Society Reviews, 2008, vol. 37, pp. 2096-2126.
Costa et al., "Synthesis of supported metal nanoparticle catalysts using ligand assisted methods," Nanoscale, Aug. 23, 2012, vol. 4, pp. 5826-5834.
Das et al., "Microgels Loaded with Gold Nanorods: Photothermally Triggered Volume Transitions under Physiological Conditions", Langmuir, 2007, vol. 23, No. 1, pp. 196-201.
Diao et al., "Multiple Structural Coloring of Silk-Fibroin Photonic Crystals and Humidity-Responsive Color Sensing", Advanced Functional Materials, 2013, vol. 23, pp. 5373-5380.
Dick et al., "Size-Dependent Melting of Silica-Encapsulated Gold Nanoparticles", Journal of American Chemical Society, 2002, vol. 124, No. 10, pp. 2312-2317.
Dong et al., "Superhydrophobic polysilsesquioxane/polystyrene microspheres with controllable morphology: from raspberry-like to flower-like structure", RSC Advances, 2017, vol. 7, pp. 6685-6690.
Du et al., "Facile Fabrication of Raspberry-like Composite Nanoparticles and Their Application as Building Blocks for Constructing Superhydrophilic Coatings," The Journal of Physical Chemistry C, May 28, 2009, vol. 113, p. 9063-9070.
Dziomkina et al., "Colloidal crystal assembly on topologically patterned templates," Soft Matter, vol. 1, pp. 265-279, Sep. 12, 2005.
El Baydi et al., "A Sol-Gel Route for the Preparation of $Co_3O_4$ Catalyst for Oxygen Electrocatalysis in Alkaline Medium," Journal of Solid State Chemistry, Apr. 1994, vol. 109, p. 281-288.
Ennaert et al., "Potential and challenges of zeolite chemistry in the catalytic conversion of biomass," Chem. Soc. Rev., first published Dec. 21, 2015, vol. 45, pp. 584-611.
Erola et al., "Fabrication of Au— and Ag—$SiO_2$ inverse opals having both localized surface plasmon resonance and Bragg diffraction," Journal of Solid State Chemistry, Oct. 2015, vol. 230, pp. 209-217.
Esposito et al., "Cobalt-silicon mixed oxide nanocomposites by modified sol-gel method," Journal of Solid State Chemistry, Oct. 2007, vol. 180, pp. 3341-3350.
European Extended Search Report dated Jun. 23, 2020, in the European Application No. 20150420.6. 12 pages.
European Extended Search Report dated Nov. 14, 2019, in the European Application No. 17776797.7, 9 pages.
Fechete et al., "The past, present and future of heterogeneous catalysis," Catalysis Today, published online May 10, 2012, vol. 189, pp. 2-27.
Feinle et al., "Sol-gel synthesis of monolithic materials with hierarchical porosity," Chemical Society Reviews (2016), first published Nov. 13, 2015, vol. 45, pp. 3377-3399.
Ferrando et al., "Nanoalloys: From Theory to Applications of Alloy Clusters and Nanoparticles", Chemical Reviews, 2008, vol. 108, No. 3, pp. 845-910.
Fetterolf et al., "Adsorption of Methylene Blue and Acid Blue 40 on Titania from Aqueous Solution," Journal of Chemical & Engineering Data, Apr. 29, 2003, vol. 48, pp. 831-835.
Francesco et al., "Synergy in the Catalytic Activity of Bimetallic Nanoparticles and New Synthetic Methods for the Preparation of Fine Chemicals", ChemCatChem Minireviews, published online Aug. 19, 2014, vol. 6, pp. 2784-2791.
Fuhrmann et al., "Diatoms as living photonic crystals," Applied Physics B, Feb. 2004, vol. 78, pp. 257-260.
Gao et al., "Stimuli-responsive microgel-based etalons for optical sensing", RSC Advances, 2015. vol. 5, pp. 44074-44087.
Garcia et al., "Photonic crystals with controlled disorder," Physical Review A, Aug. 10, 2011, vol. 84, pp. 023813-1 to 023813-7.

Garcia et al., "Photonic Glass: A Novel Random Material for Light," Advanced Materials, Aug. 9, 2007, vol. 19, pp. 2597-2602.
Garcia et al., "Photonic Glasses: A Step Beyond White Paint," Advanced Materials, published online Aug. 3, 2009, vol. 22, pp. 12-19.
Girardon et al., "Effect of cobalt precursor and pretreatment conditions on the structure and catalytic performance of cobalt silica-supported Fischer-Tropsch catalysts," Journal of Catalysis, Mar. 10, 2005, vol. 230, pp. 339-352.
Goncalves et al., "Photoluminescence in Er3+/Yb3+-doped silica-titania inverse opal structures," Journal of Sol-Gel Science and Technology, vol. 55, No. 1, pp. 52-58, published online Apr. 29, 2010.
Gonzalez-Delgado, et al. "Control of the Lateral Organization in Langmuir Monolayers via Molecular Aggregation of Dyes," The Journal of Physical Chemistry C, Oct. 7, 2010, vol. 114, pp. 16685-16695.
Govorov et al., "Gold nanoparticle ensembles as heaters and actuators: melting and collective plasmon resonances," Nanoscale Research Letters, Jul. 26, 2006, vol. 1, pp. 84-90.
Grabar et al., "Two-Dimensional Arrays of Colloidal Gold Particles: A Flexible Approach to Macroscopic Metal Surfaces," Langmuir, May 15, 1996, vol. 12, pp. 2353-2361.
Griffete et al., "Inverse Opals of Molecularly Imprinted Hydrogels for the Detection of Bisphenol A and pH Sensing", Langmuir, Nov. 16, 2011, vol. 28, pp. 1005-1012.
Guerrero-Martinez et al., "Recent Progress on Silica Coating of Nanoparticles and Related Nanomaterials," Advanced Materials, Jan. 4, 2010, vol. 22, pp. 1182-1195.
Hall et al., "Mesostructure-Induced Selectivity in $CO_2$ Reduction Catalysis", Journal of the American Chemical Society, Nov. 4, 2015, vol. 137, pp. 14834-14837.
Han et al., "Selective oxidation of methanol to methyl formate on catalysts of Au—Ag alloy nanoparticles supported on titania under UV irradiation," Green Chemistry, May 19, 2014, vol. 16, pp. 3603-3615.
Hansen et al., "Sintering of Catalytic Nanoparticles: Particle Migration or Ostwald Ripening?", Accounts of Chemical Research, 2013, vol. 46, No. 8, pp. 1720-1730.
Hartmann, et al., "Catalytic test reactions for the evaluation of hierarchical zeolites," Chem. Soc. Rev. Mar. 17, 2016, vol. 45, pp. 3313-3330.
Hatton et al., "Assembly of large-area, highly ordered, crack-free inverse opal films", Proceedings of the National Academy of Sciences, vol. 107, No. 23, pp. 10354-10359, Jun. 8, 2010.
He et al., "Chemo-Mechanically Regulated Oscillation of an Enzymatic Reaction," Chemistry of Materials, Feb. 3, 2013, vol. 25, pp. 521-523.
Heveling, "Heterogeneous Catalytic Chemistry by Example of Industrial Applications", Journal of Chemical Education, Oct. 9, 2012, vol. 89, pp. 1530-1536.
Hou et al., "A Review of Surface Plasmon Resonance-Enhanced Photocatalysis," Advanced Functional Materials, Oct. 30, 2013, vol. 23, pp. 1612-1619.
Hou et al., "Bioinspired molecular co-catalysts bonded to a silicon photocathode for solar hydrogen evolution," Nature Materials, Jun. 2011, vol. 10, pp. 434-438.
Huang et al., "High-performance heterogeneous catalysis with surface-exposed stable metal nanoparticles", Scientific Reports, Nov. 27, 2014, vol. 4, p. 7228 (8 pages).
Huang et al., "Self-Assembly of Multi-nanozymes to Mimic an Intracellular Antioxidant Defense System," Angew. Chem. Int. Ed. Engl., Apr. 21, 2016, vol. 55, pp. 6646-6650.
Hunt et al., "Elemental Sustainability for Catalysis," Chapter 1 from: Sustainable Catalysis: With Non-endangered Metals, Part 1, Royal Society of Chemistry, Nov. 16, 2015, pp. 1-14.
Ibisate et al., "Silicon Direct Opals," Advanced Materials, May 7, 2009, vol. 21, pp. 2899-2902.
Iglesia, "Design, synthesis, and use of cobalt-based Fischer-Tropsch synthesis catalysts," Applied Catalysis A: General, Nov. 4, 1997, vol. 161, pp. 59-78.
International Search Report and Written Opinion dated Feb. 5, 2019, in the International Application No. PCT/US18/53822, 20 pages.

(56) References Cited

OTHER PUBLICATIONS

International Search Report and Written Opinion dated Jun. 20, 2017, in the International Application: PCT/US2017/025437, filed Mar. 31, 2017, 17 pages.
International Search Report and Written Opinion dated May 8, 2018 in International Application No. PCT/US17/25721, filed Apr. 3, 2017, 14 pages.
International Search Report and Written Opinion dated Oct. 30, 2014 in the International Application No. PCT/US2014/044939, filed Jun. 30, 2014, 14 pages.
Jarosz et al., "Heat Treatment Effect on Crystalline Structure and Photoelectrochemical Properties of Anodic $TiO_2$ Nanotube Arrays Formed in Ethylene Glycol and Glycerol Based Electrolytes", J. Phys. Chem. C, Oct. 5, 2015, vol. 119, pp. 24182-24191.
Jellinek, "Nanoalloys: tuning properties and characteristics through size and composition", Faraday Discussions, 2008, vol. 138, pp. 11-35.
Karg et al., "Nanorod-Coated PNIPAM Microgels: Thermoresponsive Optical Properties", Small, 2007, vol. 3, No. 7, pp. 1222-1229.
Keita et al., "Synthesis of remarkably stabilized metal nanostructures using polyoxometalates", Journal of Materials Chemistry, 2009, vol. 19, pp. 19-33.
Kessler et al., "New insight in the role of modifying ligands in the sol-gel processing of metal alkoxide precursors: A possibility to approach new classes of materials", J. Sol-Gel Sci Techn, 2006, vol. 40, pp. 163-179.
Khodakov et al., "Advances in the Development of Novel Cobalt Fischer-Tropsch Catalysts for Synthesis of Long-Chain Hydrocarbons and Clean Fuels," Chemical Reviews, May 9, 2007, vol. 107, pp. 1692-1744.
Kim et al., "Silk protein based hybrid photonic-plasmonic crystal," Optics Express, published Apr. 3, 2013, vol. 21, pp. 8897-8903.
Koay et al., "Hierarchical structural control of visual properties in self-assembled photonic-plasmonic pigments", Optics Express, Nov. 3, 2014, vol. 22, No. 23, pp. 27750-27768.
Laczka et al., "Chromium, cobalt, nickel and copper as pigments of sol-gel glasses," Journal of Alloys and Compounds, Feb. 15, 1995, vol. 218, pp. 77-85.
Lange, "Renewable Feedstocks: The Problem of Catalyst Deactivation and its Mitigation," Angew. Chem. Int. Ed. Engl., Oct. 12, 2015, vol. 54, 13186-13197.
Le Beulze et al., "Robust raspberry-like metallo-dielectric nanoclusters of critical sizes as SERS substrates," Nanoscale, Apr. 11, 2017, vol. 9, pp. 5725-5736.
Lee et al., "Facile fabrication of sub-100 nm mesoscale inverse opal films and their application in dye-sensitized solar cell electrodes," Scientific Reports, Oct. 28, 2014, vol. 4: 6804, 7 pages.
Lee et al., "Monolayer $Co_3O_4$ Inverse Opals as Multifunctional Sensors for Volatile Organic Compounds", Chemistry—A European Journal, published online Apr. 29, 2016, vol. 22, pp. 7102-7107.
Lee et al., "Rapid Hydrolysis of Organophosphorous Esters Induced by Nanostructured, Fluorine-Doped Titania Replicas of Diatom Frustules," Journal of the American Ceramic Society, May 10, 2007, vol. 90, pp. 1632-1636.
Li et al. "Improved electrochromic performance in inverse opal vanadium oxide films," Journal of Materials Chemistry, Jul. 22, 2010, vol. 20, pp. 7131-7134.
Li et al. "The forces at work in colloidal self-assembly: a review on fundamental interactions between colloidal particles," Asia-Pacific Journal of Chemical Engineering, Jul. 17, 2008, vol. 3, pp. 255-268.
Li et al., "Colloidal Assembly: The Road from Particles to Colloidal Molecules and Crystals," Angew. Chem. Int. Ed. Engl. Jan. 10, 2011, vol. 50, pp. 360-388.
Li et al., "Crack-free 2D-inverse opal anatase TIO2 films on rigid and flexible transparent conducting substrates: low temperature large area fabrication and electrochromic properties," Journal of Materials Chemistry C, Jul. 23, 2014, vol. 2, Issue 37, pp. 7804-7810.
Li et al., "Facile and Controlled Fabrication of Functional Gold Nanoparticle-coated Polystyrene Composite Particle," Macromolecular Rapid Communications, Nov. 1, 2011, vol. 32, pp. 1741-1747.
Li et al., "Silica-supported Au—Cu alloy nanoparticles as an efficient catalyst for selective oxidation of alcohols," Applied Catalysis A: General May 19, 2012, vol. 433-434, pp. 146-151.
Linic, et al., "Plasmonic-metal nanostructures for efficient conversion of solar to chemical energy," Nature Materials, published online Nov. 23, 2011, vol. 10, p. 911-921.
Liu et al., "A new type of raspberry-like polymer composite sub-microspheres with tunable gold nanoparticles coverage and their enhanced catalytic properties," J. Mater. Chem. A, Oct. 30, 2013, vol. 1, pp. 930-937.
Liu et al., "From Galvanic to Anti-Galvanic Synthesis of Bimetallic Nanoparticles and Applications in Catalysis, Sensing, and Materials Science," Advanced Materials, Jan. 27, 2017, vol. 29, 16 pages.
Liu et al., "Slow Photons for Photocatalysis and Photovoltaics", Advanced Materials, 2017, vol. 29, p. 1605349 (21 pages).
Livage et al., "Sol-Gel Chemistry of Transition Metal Oxides", Prog. Solid St. Chem., 1988, vol. 18, pp. 259-341.
Long, et al., "Oxidative etching for controlled synthesis of metal nanocrystals: atomic addition and subtraction," Chem. Soc. Rev., Sep. 7, 2014, vol. 43, pp. 6288-6310.
Lu et al., "Atomic layer deposition—Sequential self-limiting surface reactions for advanced catalyst "bottom-up" synthesis," Surface Science Reports, Jun. 2016, vol. 71, pp. 410-472.
Lytle et al., "Multistep, Low-Temperature Pseudomorphic Transformations of Nanostructured Silica to Titania via a Titanium Oxyfluoride Intermediate", Chem. Mater., 2004, vol. 16, No. 20, pp. 3829-3837.
Ma et al., "Transition metal-doped titania inverse opals: Fabrication and characterization," Colloids and Surfaces A: Physicochemical and Engineering Aspects (2010), vol. 370, pp. 129-135.
Mason, "The Electronic Spectroscopy of Dyes," Journal of the Society of Dyers and Colourists, Dec. 1968, vol. 84, pp. 604-612.
Ming et al., "Superhydrophobic Films from Raspberry-like Particles", Nano Letters, Oct. 1, 2005, vol. 5, No. 11, pp. 2298-2301.
Mohammadi et al., "Nanomaterials engineering for drug delivery: a hybridization approach," Journal of Materials Chemistry B, May 23, 2017, vol. 5, pp. 3995-4018.
Molenbroek et al., "Alloying in Cu/Pd Nanoparticle Catalysts," The Journal of Physical Chemistry B, Dec. 3, 1998, vol. 102, pp. 10680-10689.
Moon et al., "Chemical transformations of nanostructured materials," Nano Today, Apr. 2011, vol. 6, pp. 186-203.
Munnik et al., "Recent Developments in the Synthesis of Supported Catalysts," Chem. Rev., Jun. 19, 2015, vol. 115, pp. 6687-6718.
Newton et al., "Anisotropic Diffusion in Face-Centered Cubic Opals," Nano Letters, Apr. 10, 2004, vol. 4, pp. 875-880.
Nguyen et al., "Looking for Synergies in Molecular Plasmonics through Hybrid Thermoresponsive Nanostructures", Chemistry of Materials, May 10, 2016, vol. 28, pp. 3564-3577.
Oldenburg et al., "Nanoengineering of optical resonances", Chemical Physics Letters, May 22, 1998, vol. 288, pp. 243-247.
Olguin et al., "Tailoring the oxidation state of cobalt through halide functionality in sol-gel silica," Scientific Reports, Aug. 15, 2013, vol. 3: 2449, 5 pages.
Parlett et al., "Spatially orthogonal chemical functionalization of a hierarchical pore network for catalytic cascade reactions", Nature Materials, Feb. 2016, vol. 15, pp. 178-182 (7 pages).
Personick et al., "Catalyst design for enhanced sustainability through fundamental surface chemistry," Philos. Trans. A Math. Phys. Eng. Sci., Feb. 28, 2016, vol. 374, 24 pages.
Personick et al., "Ozone-Activated Nanoporous Gold: A Stable and Storable Material for Catalytic Oxidation," ACS Catalysis, May 28, 2015, vol. 5, pp. 4237-4241.
Phillips et al., "Tunable Anisotropy in Inverse Opals and Emerging Optical Properties," Chemistry of Materials, Jan. 28, 2014, vol. 26, pp. 1622-1628.
Prati et al., "The Art of Manufacturing Gold Catalysts," Catalysts, Dec. 21, 2011, vol. 2, pp. 24-37.

(56) References Cited

OTHER PUBLICATIONS

Qian et al., "A novel approach to raspberry-like particles for superhydrophobic materials," Journal of Materials Chemistry, Jan. 22, 2009, vol. 19, pp. 1297-1304.
Qian et al., "Raspberry-like Metamolecules Exhibiting Strong Magnetic Resonances," ACS Nano, Jan. 26, 2015, vol. 9, pp. 1263-1270.
Regonini et al., "Effect of heat treatment on the properties and structure of TiO2 nanotubes: phase composition and chemical composition," Surface and Interface Analysis, Mar. 2010, vol. 42, pp. 139-144.
Reisfeld et al., "Irreversible Spectral Changes of Cobalt(II) by Moderate Heating in Sol-Gel Glasses, and their Ligand Field Rationalization", Chemical Physics Letters, Dec. 8, 1989, vol. 164, No. 2,3, pp. 307-312.
Ren et al., "Ordered mesoporous metal oxides: synthesis and applications," Chem. Soc. Rev., May 31, 2012, vol. 41, pp. 4909-4927.
Richman et al., "Ordered Mesoporous Silicon through Magnesium Reduction of Polymer Templated Silica Thin Films," Nano Letters, Aug. 15, 2008, vol. 8, pp. 3075-3079.
Ryu et al., "Fabrication of Ag nanoparticles-coated macroporous $SiO_2$ structure by using polystyrene spheres," Materials Chemistry and Physics, vol. 101, No. 2-3, pp. 486-491, Jan. 26, 2007.
Sachse et al., "Surfactant-Templating of Zeolites: From Design to Application", Chemistry of Materials, Apr. 4, 2017, vol. 29, pp. 3827-3853.
Saib et al., "Silica supported cobalt Fischer-Tropsch catalysts: effect of pore diameter of support," Catalysis Today, Jan. 15, 2002, vol. 71, pp. 395-402.
Sanchez et al., "Biomimetism and bioinspiration as tools for the design of innovative materials and systems," Nature Materials, Apr. 2005, vol. 4, pp. 277-288.
Sandhage et al., "Merging Biological Self-Assembly with Synthetic Chemical Tailoring: The Potential for 3-D Genetically Engineered Micro/Nano-Devices (3-D GEMS)", International Journal of Applied Ceramic Technology, 2005, vol. 2, No. 4, pp. 317-326.
Sandhage et al., "Novel, Bioclastic Route to Self-Assembled, 3D, Chemically Tailored Meso/Nanostructures: Shape-Preserving Reactive Conversion of Biosilica (Diatom) Microshells", Advanced Materials, Mar. 18, 2002, vol. 14, No. 6, pp. 429-433.
Sandhage, "Materials "Alchemy": Shape-Preserving Chemical Transformation of Micro-to-Macroscopic 3-D Structures", JOM, Jun. 2010, vol. 62, No. 6, pp. 32-43.
Sankar et al., "Designing bimetallic catalysts for a green and sustainable future," Chem. Soc. Rev. Oct. 23, 2012, vol. 41, pp. 8099-8139.
Schauermann et al., "Nanoparticles for Heterogeneous Catalysis: New Mechanistic Insights", Accounts of Chemical Research, 2013, vol. 46, No. 8, pp. 1673-1681.
Schneider et al., "Understanding $TiO_2$ Photocatalysis: Mechanisms and Materials," Chemical Reviews, Sep. 19, 2014, vol. 114, pp. 9919-9986.
Schultz et al., "From Molecular Diversity to Catalysis: Lessons from the Immune System," Science, Sep. 29, 1995, vol. 269, pp. 1835-1842.
Schwieger et al., "Hierarchy concepts: classification and preparation strategies for zeolite containing materials with hierarchical porosity", Chem. Soc. Rev., Jun. 21, 2016, vol. 45, pp. 3353-3376.
Serp et al,. "Chemical Vapor Deposition Methods for the Controlled Preparation of Supported Catalytic Materials," Chemical Reviews, Aug. 3, 2002, vol. 102, pp. 3085-3128.
Shastri et al., "An aptamer-functionalized chemomechanically modulated biomolecule catch-and-release system," Nature Chemistry, published online Mar. 23, 2015, DOI: 10.1038/NCHEM.2203. 8 pages.
Shepherd et al., "Stop-Flow Lithography of Colloidal, Glass, and Silicon Microcomponents", Advanced Materials, 2008, vol. 20, pp. 4734-4739.
Shi et al., "Amorphous Photonic Crystals with Only Short-Range Order," Advanced Materials, Jun. 20, 2013, vol. 25, pp. 5314-5320.
Shi et al., "Gold Nanoshells on Polystyrene Cores for Control of Surface Plasmon Resonance," Langmuir Jan. 15, 2005, vol. 21, pp. 1610-1617.
Shi et al., "Recent advances of pore system construction in zeolite-catalyzed chemical industry processes," Chem. Soc. Rev., Nov. 16, 2015, vol. 44, pp. 8877-8903.
Shi et al., "Recent progress on upgrading of bio-oil to hydrocarbons over metal/zeolite bifunctional catalysts," Catalysis Science & Technology, May 3, 2017, vol. 7, 2385-2415.
Shirman et al., "New Architectures for Designated Catalysts: Selective Oxidation using AgAu Nanoparticles on Colloid-Templated Silica", Chemistry—A European Journal, 2018, vol. 24, pp. 1833-1837.
Singh et al., "Synergistic Catalysis over Bimetallic Alloy Nanoparticles", ChemCatChem Reviews, 2013, vol. 5, pp. 652-676.
Singleton et al., "Photo-tuning of highly selective wetting in inverse opals," Soft Matter, Mar. 7, 2014, vol. 10, Issue 9, pp. 1325-1328.
Sofo et al., "Diffusion and transport coefficients in synthetic opals," Physical Review B, Jul. 15, 2000, vol. 62, pp. 2780-2785.
Stein et al., "Design and functionality of colloidal-crystal-templated materials—chemical applications of inverse opals," Chem. Soc. Rev. Apr. 7, 2013, vol. 42, pp. 2763-2803.
Stein et al., "Morphological Control in Colloidal Crystal Templating of Inverse Opals, Hierarchical Structures, and Shaped Particles," Chemistry of Materials, vol. 20, No. 3, pp. 649-666, Feb. 1, 2008.
Surnev et al., "Structure-Property Relationship and Chemical Aspects of Oxide-Metal Hybrid Nanostructures", Chemical Reviews, Dec. 13, 2012, vol. 113, pp. 4314-4372.
Sutton et al., "Photothermally triggered actuation of hybrid materials as a new platform for in vitro cell manipulation," Nature Communications, Mar. 13, 2017, vol. 8, No. 14700, 13 pages.
Takeoka, "Stimuli-responsive opals: colloidal crystals and colloidal amorphous arrays for use in functional structurally colored materials", J. Mater. Chem. C, Oct. 14, 2013, vol. 1, No. 38, pp. 6059-6074.
Telford et al., "Mimicking the Wettability of the Rose Petal using Self-assembly of Waterborne Polymer Particles", Chemistry of Materials, Jul. 23, 2013, vol. 25, pp. 3472-3479.
Tian et al., "Design of Raspberry-Shaped Microcarriers with Adjustable Protrusions and Functional Groups for the Improvement of Lipase Immobilization and Biocatalysis: Environmentally Friendly Esterification of Oleic Acid for Biodiesel," ChemCatChem, (2016) vol. 8, p. 2576.
Tian et al., "Monodisperse raspberry-like multihollow polymer/Ag nanocomposite microspheres for rapid catalytic degradation of methylene blue", Journal of Colloid and Interface Science, 2017, vol. 491, pp. 294-304.
Trogadas et al., "Nature-inspired optimization of hierarchical porous media for catalytic and separation processes", New J. Chem., 2016, vol. 40, pp. 4016-4026.
Turkevich et al., "A Study of the Nucleation and Growth Processes in the Synthesis of Colloidal Gold," Discussions of the Faraday Society, Jan. 1951, 11, pp. 55-75.
Tétreault et al., "High-Efficiency Dye-Sensitized Solar Cell with Three-Dimensional Photoanode", Nano Letters, Sep. 30, 2011, vol. 11, pp. 4579-4584.
Vasquez et al., "Three-Phase Co-assembly: In Situ Incorporation of Nanoparticles into Tunable, Highly Ordered, Porous Silica Films," ACS Photonics, published online Nov. 1, 2013, vol. 1, pp. 53-60.
Vlasov et al., "Different regimes of light localization in a disordered photonic crystal," Physical Review B, Jul. 15, 1999, vol. 60, pp. 1555-1562.
Vogel et al., "Color from hierarchy: Diverse optical properties of micron-sized spherical colloidal assemblies," PNAS, Sep. 1, 2015, vol. 112, pp. 10845-10850.
Vogel et al., "Wafer-Scale Fabrication of Ordered Binary Colloidal Monolayers with Adjustable Stoichiometries," Advanced Functional Materials, vol. 21, Issue 6, published online Jun. 14, 2011, pp. 3064-3073.
Wang et al., "New Polymer Colloidal and Carbon Nanospheres: Stabilizing Ultrasmall Metal Nanoparticles for Solvent-Free Catalysis", Chemistry of Materials, Apr. 18, 2017, vol. 29, pp. 4044-4051.

(56) References Cited

OTHER PUBLICATIONS

Xia et al., "Freestanding $Co_3O_4$ nanowire array for high performance supercapacitors," RSC Advances Jan. 4, 2012, vol. 2, pp. 1835-1841.

Xie, et al., "Temperature-Controlled Diffusion in PNIPAM-Modified Silica Inverse Opals," ACS Macro Letters, Jan. 15, 2016, vol. 5, pp. 190-194.

Xu et al., "Composite Microspheres for Separation of Plasmid DNA Decorated with MNPs through in Situ Growth or Interfacial Immobilization Followed by Silica Coating," ACS Applied Materials and Interfaces, Sep. 5, 2012, vol. 4, pp. 4764-4775.

Yang et al., "Hierarchical $TiO_2$ photonic crystal spheres prepared by spray drying for highly efficient photocatalysis", Journal of Materials Chemistry A, 2013, vol. 1, pp. 541-547.

Yang et al., "Synthesis of replica mesostructures by the nanocasting strategy" Journal of Materials Chemistry, 2005, vol. 15, pp. 1217-1231.

Yetisen et al., "Photonic hydrogel sensors," Biotechnology Advances, May-Jun. 2016, vol. 34, pp. 250-271.

Yoon et al., "Multifunctional polymer particles with distinct compartments", Journal of Materials Chemistry, 2011, vol. 21, pp. 8502-8510.

Yoon et al., "Tuning of Silver Catalyst Mesostructure Promotes Selective Carbon Dioxide Conversion into Fuels," Angewandte Chemie, published online Nov. 10, 2016, vol. 128, pp. 15508-15512.

Zhang et al., "Reprogrammable Logic Gate and Logic Circuit Based on Multistimuli-Responsive Raspberry-like Micromotors," ACS Applied Materials & Interfaces, May 30, 2016, vol. 8, 15654-15660.

Zhang et al., "Size and composition tunable Ag—Au alloy nanoparticles by replacement reactions", Nanotechnology, May 18, 2007, vol. 18, p. 245605 (9 pages).

Zhang, et al. "Enhanced electrochromic performance of highly ordered, macroporous $WO_3$ arrays electrodeposited using polystyrene colloidal crystals as template," Electrochimica Acta, Mar. 2013, vol. 99, pp. 1-8.

Zhou et al., "Surface plasmon resonance-mediated photocatalysis by noble metal-based composites under visible light", Journal of Materials Chemistry, 2012, vol. 22, pp. 21337-21354.

Cozzoli et al., "Low-Temperature Synthesis of Soluble and Processable Organic-Capped Anatase $TiO2$ Nanorods," J. Am. Chem. Soc., Oct. 31, 2003, vol. 125, pp. 14539-14548.

Hague et al., "Controlling Crystallinity during Processing of Nanocrystalline Titania," J. Am. Ceram. Soc., Jul. 1994, vol. 77, No. 7, pp. 1957-1960.

Subramania et al., "Optical Photonic Crystals Synthesized from Colloidal Systems of Polystyrene Spheres and Nanocrystalline Titania," Journal of Lightwave Technology, Nov. 1999, vol. 17, No. 11, pp. 1970-1974.

Boualleg, M. et al., "Selective and regular localization of accessible Pt nanoparticles inside the walls of an ordered silica: Application as highly active and well-defined heterogeneous catalyst for propene and styrene hydrogenation reactions", Journal of Catalysis 284 (2011) 184-193.

Chave, Tony et al., "Sonochemical deposition of platinum nanoparticles on polymer beads and their transfer of the pore surface of a silica matrix", Journal of Colloid and Interface Science 395 (2013) 81-84.

Search Report for corresponding EP Patent Application No. 18861253.5, dated Jun. 24, 2021, 10 pages.

Jeong Ho Ryu et al., Fabrication of Ag nanoparticles-coated macroporous $SiO2$ structure by using polystyrene spheres, Materials Chemistry and Physics, 2007, vol. 101, p. 486-491.

Office Action with English summary for corresponding Japanese Patent Application No. 2020-518020, dated Sep. 6, 2022, 7 pages.

Office Action with English translation for corresponding Chinese Patent Application No. 201880074992.9, dated Aug. 25, 2022, 17 pages.

Search Report with English translation for corresponding Chinese Patent Application No. 201880074992.9, dated Aug. 25, 2022, 4 pages.

* cited by examiner

ENHANCED CATALYTIC MATERIALS WITH PARTIALLY EMBEDDED CATALYTIC NANOPARTICLES

CROSS-REFERENCE TO RELATED APPLICATIONS

This application is a U.S. National Stage Application under 35 U.S.C. § 371 of International Patent Application No. PCT/US2018/053822, filed on Oct. 1, 2018, which claims priority to U.S. Provisional Patent Application No. 62/566,285, filed Sep. 29, 2017, and titled "Enhanced Catalytic Materials with Partially Embedded Catalytic Nanoparticles" the entire contents of which is hereby incorporated by reference in its entirety.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

INCORPORATION BY REFERENCE

All patents, patent applications and publications cited herein are hereby incorporated by reference in their entirety in order to more fully describe the state of the art as known to those skilled therein as of the date of the invention described herein.

FIELD OF THE INVENTION

The present application relates to microstructured materials with enhanced functional properties and/or durability. More particularly, the present application relates to novel catalytic materials with improved performance characteristics that may be useful in applications, such as sustainable ways to generate energy, treat pollution, produce raw and fine chemicals and the like applications.

BACKGROUND

Many different applications employ the use of functional material as a catalytic material at the barrier between a matrix and a network of pores. Generally, this functional material needs to contact the material of interest (e.g., reactants, analytes, etc.) to be active.

SUMMARY

Disclosed herein are porous catalytic materials with enhanced reactivity and durability and methods of making these porous catalytic materials. The porous catalytic materials can have nanoparticles or other functional material disposed at an interface between a matrix and a network of pores or channels. Additional features and functionality of the porous catalytic material and their methods of manufacture are also disclosed herein.

In accordance with certain embodiments, catalytic materials and methods of making catalytic materials are described. The catalytic material includes an interconnected matrix material defining a network of interconnected channels, and a plurality of catalytic nanoparticles having proximal portions and distal portions. In certain embodiments, the nanoparticles are partially embedded in the matrix material such that the proximal portions of the nanoparticles are embedded in the matrix material and the distal portions of the nanoparticles are exposed to the interconnected channels.

In accordance with certain embodiments, at least part of the proximal portions of the nanoparticles are physically bound to the matrix material.

In accordance with certain embodiments, at least part of the proximal portions is rougher than the distal portions.

In accordance with certain embodiments, at least part of the proximal portions is chemically bound to the matrix material at the interface between the matrix material and the catalytic nanoparticles.

In accordance with certain embodiments, at least part of the proximal portions are chemically bound at the interface by covalent interaction, ionic bonding, through formation of oxides, mixed oxides, oxometallates, aluminates, mixed aluminates, silicates, mixed silicates, alumosilicates, titanates, mixed titanates, stannates, mixed stannates, stannites, mixed stannites, ceria oxides, mixed ceria oxides, vanadia oxides, mixed vanadia oxides, boron oxides, zirconia oxides, mixed zirconia oxides, hafnia oxides, mixed hafnia oxides, yttria oxides, mixed yttria oxides, niobia oxides, mixed niobia oxides, iron oxides, mixed iron oxides, tin oxides, mixed tin oxides, cobalt oxides, mixed cobalt oxides, indium oxide, mixed indium oxide, scandium oxides, mixed scandium oxides, rare earth oxides, uranium oxides, thorium oxides, mixed oxides of elements from one or more groups I, II, III, IV V, VI, heteropolyacids, zeolites, carbides, metal alloys, intermetallic compounds, organometallic compounds, coordination compounds, organic compounds, synthetic or natural polymers, inorganic compounds, or combinations thereof. In certain embodiments, the compound includes one of local oxidation or reduction of at least one of the interconnected matrix material and the catalytic nanoparticles near the proximal portions between the matrix material and the catalytic nanoparticles.

In accordance with certain embodiments, chemical binding to the support creates a different catalytic species than unmodified catalytic nanoparticles.

In accordance with certain embodiments, the distal portions are chemically modified at the interface between the interconnected channels and the catalytic nanoparticles.

In accordance with certain embodiments, the distal portions are physically modified to produce a roughened distal portion or a faceted distal portion.

In accordance with certain embodiments, a circumference of the catalytic nanoparticles at the interface between the matrix material, the catalytic nanoparticle, and the interconnected channels is chemically modified.

In accordance with certain embodiments, the interface between the matrix material and the interconnected channels is chemically modified. In certain embodiments, the chemical modification at the interface between the matrix material and the interconnected channels includes an interfacial material deposited on the surface of the matrix material. In certain embodiments, the interfacial material is a catalytic material. In certain embodiments, the chemical modification at the interface between the matrix material and the interconnected channels includes an interfacial material deposited on the surface of a templating material before assembly and matrix infiltration. In certain embodiments, the interfacial material is a catalytic material. In certain embodiments, the interfacial material is deposited as one or more films, one or more islands, or as a plurality of particles. In certain embodiments, the interfacial material is further deposited at the interface between the catalytic nanoparticles and the interconnected channels.

In accordance with certain embodiments, the proximal portions and the distal portions have different chemical compositions.

In accordance with certain embodiments, the proximal portions and the distal portion have at least one of different crystallinity, crystal structure, or different density.

In accordance with certain embodiments, the proximal portion of the catalytic nanoparticles and the portion of the matrix material at the interface with the catalytic nanoparticles include oppositely charged species.

In accordance with certain embodiments, the catalytic nanoparticles include a metal.

In accordance with certain embodiments, the catalytic nanoparticles include two or more metals. In certain embodiments, the nanoparticles are bimetallic or multimetallic. In certain embodiments, the nanoparticles of two or more metals include at least some nanoparticles of a first metal and at least some nanoparticles of a second metal. In certain embodiments, the proximal portions include a first atomic distribution or chemical composition of the two or more metals and the distal portions include a second atomic distribution or chemical composition of the two or more metals, and the first atomic distribution or chemical composition is different from the second atomic distribution or chemical composition. In certain embodiments, one of the proximal portions is partially oxidized with respect to the distal portions or the distal portions are partially oxidized with respect to the proximal portions. In certain embodiments, the distal portions further include a crust or shell of a metal or metal alloy that is different from the bulk of the NPs.

In accordance with certain embodiments, the matrix material further includes a second network of channels smaller than the interconnected network of channels.

In accordance with certain embodiments, the matrix material is chemically strengthened.

In accordance with certain embodiments, the matrix material is roughened.

In accordance with certain embodiments, the matrix material further includes functional moieties onto a surface of the matrix material. In certain embodiments, the functional moieties change the surface energy of the matrix material or act as recognition units for attracting a target moiety.

In accordance with certain embodiments, the matrix material further includes ions from an ion exchange process.

In accordance with certain embodiments, the matrix material further includes changed oxidation states from a redox process.

In accordance with certain embodiments, the matrix material further includes a wettability gradient in on the surface of the matrix material.

In accordance with certain embodiments, the proximal portions include a first morphology and the distal portions include a second morphology, the second morphology having a different number of facets than the first morphology. In certain embodiments, the second morphology has a higher number of facets than the first morphology.

In accordance with certain embodiments, the interconnected matrix material include silica, alumina, titania, ceria, boron oxide, zirconia, hafnia, yttria, vanadia, niobia, tantalum oxide, iron oxides, cobalt oxides, tin oxides, indium oxide, scandium oxide, rare earth oxides, uranium oxides, thorium oxides, mixed oxides of elements from one or more groups I, II, III, IV V, VI, mixtures of oxides of elements from one or more groups I, II, III, IV, V, VI, aluminates, mixed aluminates, silicates, mixed silicates, alumosilicates, titanates, mixed titanates, stannates, mixed stannates, stannites, mixed stannites, oxometallates, heteropolyacids, zeolites, synthetic or natural polymers, metals, alloys and mixtures and combinations thereof.

In accordance with certain embodiments, the catalytic nanoparticles include a metal, a metal oxide, a mixed metal oxide, a metal sulfide, a metal pnictide, a binary metal salt, a complex metal salt, a metal salt of an organic acid, a metal salt of inorganic acid, a metal salt of a complex acid, a base, an acid, a metal alloy, a multimetallic species, an intermetallic compound, an organometallic compound, a coordination compound, one or more platinum group metal, one or more platinum group metal oxide, iron, cobalt, nickel, ruthenium, rhodium, palladium, osmium, iridium, platinum, copper, silver, gold, iron oxides, cobalt oxides, nickel oxides, ruthenium oxides, rhodium oxides, palladium oxides, osmium oxides, iridium oxides, platinum oxides, copper oxides, silver oxides gold oxides, vanadium oxides, niobium oxide, tantalum oxide, chromium oxide, molybdenum oxide, tungsten oxide, scandium oxide, yttrium oxide, lanthanum oxide, rare earth metal oxide, any species above in a single crystal polymorph, any species above presenting to the channel a specific crystallographic plane, and combinations thereof.

In accordance with certain embodiments, the light-off temperature for a chemical reaction the catalytic material catalyzes is at least 3-5° less than the light-off temperature for the same reaction catalyzed by a conventional catalytic material of the same composition.

In accordance with certain embodiments, the catalytic nanoparticles are mechanically stable in the matrix material when subject to a temperature of 150° C. over a period of six months.

In accordance with certain embodiments, the nanoparticles are do not grow more than 1-10% of their original size when subjected to reaction conditions of 150° C., 1-20% of their original size when subjected to 500° C., and 1-40% of their original size when subjected to reaction conditions of 800° C.

In accordance with certain embodiments, the catalytic material has reduced amounts of catalytic NPs compared to conventional catalytic materials and showing a catalytic activity of at least equal to that of conventional catalytic material under the same conditions.

In accordance with certain embodiments, the catalytic material is used as a paint.

In accordance with certain embodiments, the catalytic material is used on at least part of a surface of a device. In certain embodiments, the device is one of an indoor air heater, an air conditioning unit, a vent, an HVAC duct, a fan, a hair dryer, an air purifier, a humidifier, a dehumidifier, an indoor electrical fixture, an indoor lighting fixture, a wall, a ceiling, and furniture.

In accordance with certain embodiments, a method of fabricating a catalytic material is described. In certain embodiments, the method includes attaching a plurality of catalytic nanoparticles to the surface of a templating component to obtain a NP-decorated templating component, a plurality of catalytic nanoparticles having proximal portions and distal portions. In certain embodiments, the method includes arranging the modified templating component into an interconnected templating component with a filling material that fills the interstitial spaces of said interconnected templating component. In certain embodiments, the method includes at least partially removing the templating component such that the filling material forms an interconnected matrix material defining a network of interconnected channels. In certain embodiments, the catalytic nanoparticles are partially embedded in the matrix material such that the proximal portions of the catalytic nanoparticles are embedded in the matrix material and the distal portions of the catalytic nanoparticles are exposed to the interconnected channels.

In accordance with certain embodiments, the method includes at least partially removing the templating component further includes treating the templating material, the catalytic nanoparticles, and interconnected templating component under one of annealing or calcining conditions, by one of selective dissolution, etching, and sublimation.

In accordance with certain embodiments, the method includes locally oxidizing at least one of the matrix material and the catalytic nanoparticles near the interface between the matrix material and the catalytic nanoparticles.

In accordance with certain embodiments, the method includes locally reducing at least one of the matrix material and the catalytic nanoparticles near the interface between the matrix material and the catalytic nanoparticles.

In accordance with certain embodiments, the matrix material further includes a second material on the surface thereof.

In accordance with certain embodiments, the second material is a catalytic material that is different from a material of the catalytic nanoparticles.

In accordance with certain embodiments, the surface of the interconnected channels include at least one of a deposit of the templating component or a deposit of a residual material formed from partial removal of the templating component.

In accordance with certain embodiments, the deposit of the templating component or the residual material is one of non-continuous, continuous, or in the form of isolated nanoparticles.

In accordance with certain embodiments, the interface between the interconnected channels and the catalytic nanoparticles include a deposit of the templating component or a deposit of a residual material formed from partial removal of the templating component.

In accordance with certain embodiments, the deposit or the residue is a catalytic material.

In accordance with certain embodiments, the deposit or the residue is formed by incomplete combustion or chemical removal of the templating material.

In accordance with certain embodiments, the deposit is one of activated carbon, a polycondensed carbon-rich species, metal, or metal oxide.

In accordance with certain embodiments, the templating material is a composite templating material.

In accordance with certain embodiments, the deposit is a non-catalytic species.

In accordance with certain embodiments, the method includes subjecting the matrix material and catalytic nanoparticles to thermal treatment to modify the catalytic nanoparticles. In certain embodiments, the proximal portions of the modified catalytic nanoparticles have a first chemical composition and the distal portions have a second chemical composition. In certain embodiments, the first chemical composition is different from the second chemical composition. In certain embodiments, the first portion and the second portion have a different crystallinity or density.

In accordance with certain embodiments, the nanoparticles include a material made from a single metal.

In accordance with certain embodiments, the catalytic nanoparticles are multi-metallic nanoparticles include two or more metals. In certain embodiments, the method includes heating the matrix material and the multi-metallic nanoparticles to modify the multi-metallic nanoparticles, wherein the proximal portions include a first atomic distribution of the two or more metals and the distal portions include a second atomic distribution of the two or more metals, and wherein the first atomic distribution is different from the second atomic distribution. In certain embodiments, the distal portions are partially oxidized with respect to the proximal portions or the proximal portions are partially oxidized with respect to the distal portions.

In accordance with certain embodiments, the distal portions include a crust. In certain embodiments, the method includes forming the crust by deposition from one of solution, etching, and doping by exposure to salts. In certain embodiments, the method includes forming the crust by reducing or oxidizing conditions. In certain embodiments, the method includes forming the crust by exposing the catalytic material to a solution containing a precursor to metallic crust growth, and selectively growing the metallic crust on the distal portions of the catalytic nanoparticles. In certain embodiments, the proximal portions and the distal portions have different chemical compositions.

In accordance with certain embodiments, the method includes subjecting the matrix material and catalytic nanoparticles to calcination to modify the catalytic nanoparticles. In certain embodiments, the proximal portions include metal ions and the distal portions include an oxide of said metal ions.

In accordance with certain embodiments, the method includes subjecting the matrix material, the catalytic nanoparticles, and interconnected templating component to heat treatment or etching conditions to modify the catalytic nanoparticles. In certain embodiments, the proximal portions include a first morphology and the distal portions include a second morphology, and the second morphology has a greater degree of roughness than the first morphology.

In accordance with certain embodiments, the method includes subjecting the matrix material, the catalytic nanoparticles, and interconnected templating component to heat treatment or etching conditions to modify the catalytic nanoparticles. In certain embodiments, the proximal portions include a first morphology and the distal portions include a second morphology, and the second morphology has a greater number of facets than the first morphology.

In accordance with certain embodiments, the method includes subjecting the matrix material, of the catalytic nanoparticles, and interconnected templating component to heat treatment or etching conditions to modify the catalytic nanoparticles. In certain embodiments, the proximal portions include a first crystallinity and the distal portions include a second crystallinity, and the second crystallinity is different from the first crystallinity.

In accordance with certain embodiments, the method includes subjecting the matrix material, the catalytic nanoparticles, and interconnected templating component to heat treatment to change the crystallinity of a portion of the matrix material at the interface between the catalytic nanoparticles and the matrix material. In certain embodiments, the matrix material has a first crystallinity and the portion of the matrix material at the interface between the catalytic nanoparticles and the matrix material has a second crystallinity, and the second crystallinity is different from the first crystallinity.

In accordance with certain embodiments, the method includes subjecting the matrix material, of the catalytic nanoparticles, and interconnected templating component to a heat treatment to change the crystal structure of a portion of the matrix material at the interface between the catalytic nanoparticles and the matrix material. In certain embodiments, the network of matrix material has a first crystal structure and the portion of the matrix material at the interface between the catalytic nanoparticles and the matrix material has a second crystal structure, and the second crystal structure is different from the first crystal structure.

In accordance with certain embodiments, the method includes subjecting the network of matrix material, the catalytic nanoparticles, and interconnected templating component to heat treatment to change the roughness of a portion of the matrix material at the interface between the catalytic nanoparticles and the matrix material. In certain embodiments, the network of matrix material has a first degree of roughness and the portion of the matrix material at the interface between the catalytic nanoparticles and the matrix material has a second roughness, and the second roughness is different from the first roughness.

In accordance with certain embodiments, the matrix material has a first phase, the portion of the matrix material at the interface between the catalytic nanoparticles and the matrix material has a second phase, and the second phase is different from the first phase. In certain embodiments, one of the first phase or the second phase is one of amorphous, crystalline, or quasi-crystalline.

In accordance with certain embodiments, the method includes coating an exterior of the modified templating material with a material prior to arranging the modified templating material. In certain embodiments, the material is a catalytic material.

In accordance with certain embodiments, the method includes modifying the embedded nanoparticles. In certain embodiments modifying the embedded catalytic nanoparticles includes growing or depositing a shell on a surface of the distal portion of the catalytic nanoparticles. In certain embodiments modifying the embedded catalytic nanoparticles includes galvanic replacement. In certain embodiments modifying the embedded catalytic nanoparticles includes inducing a phase transformation by heating the catalytic nanoparticles.

In accordance with certain embodiments, the method includes modifying the matrix material after removing the templating material. In certain embodiments, modifying the matrix material includes heating the matrix material to induce one of phase transition of the matrix material or roughening of a surface of the matrix material. In certain embodiments, modifying the matrix material includes selectively etching the matrix material to produce a second network of channels. In certain embodiments, modifying the matrix material includes chemically transforming the matrix material to maintain the shape of the matrix material. In certain embodiments, modifying the matrix material includes deposition of functional moieties onto a surface of the matrix material, and in certain embodiments the functional moieties change the surface energy of the matrix material or act as recognition units for attracting a target moiety. In certain embodiments, modifying the matrix material further includes chemically transforming the matrix material. In certain embodiments, chemically transforming includes ion exchanging the matrix material. In certain embodiments, chemically transforming includes performing a redox process on the matrix material. In certain embodiments, modifying the matrix material further includes forming a wettability gradient in on the surface of the matrix material.

In accordance with certain embodiments, the catalytic nanoparticles are selected from one of gold, silver, platinum, palladium, ruthenium, rhodium, cobalt, iron, nickel, osmium, iridium, rhenium, copper, chromium, and combinations thereof.

In accordance with certain embodiments, the catalytic nanoparticles are selected from one of a metal, a metal alloy, a semiconductor, a metal oxide, a mixed metal oxide, a metal sulfide, and combinations thereof.

In accordance with certain embodiments, the two or more metals of the catalytic nanoparticles are selected from gold, silver, platinum, palladium, ruthenium, rhodium, cobalt, iron, nickel, osmium, iridium, rhenium, copper, and chromium.

In accordance with certain embodiments, the matrix material is selected from one of silica, titania, inorganic sol-gel derived oxides, polymers and combinations thereof.

In accordance with certain embodiments, the templating component is selected from one of a polymer, a random copolymer, a biopolymer, an organometallic compound, a supramolecular polymer, and combinations thereof.

In accordance with certain embodiments, the catalytic material is used as a catalytic paint. In certain embodiments, the catalytic paint is used on a surface of a device. In certain embodiments, the device is one of an indoor air heater, an air conditioning unit, a vent, an HVAC duct, a fan, a hair dryer, an air purifier, a humidifier, a dehumidifier, an indoor electrical fixture, an indoor lighting fixture, a wall, a ceiling, and furniture.

In accordance with certain embodiments, a method of fabricating a catalytic material is described herein. In certain embodiments, the method includes providing a templating material having ligands having an affinity for metal ions, metal ions, and a matrix precursor. In certain embodiments, the method includes mixing the templating material, metal ions, and matrix precursor such that the metal ions form a plurality of catalytic nanoparticles on the templating material, a plurality of catalytic nanoparticles having proximal portions and distal portions. In certain embodiments, the method includes arranging the templating material into an interconnected templating component such that the matrix precursor fills the interstitial spaces of said interconnected templating component. In certain embodiments, the method includes at least partially removing the templating component such that the filling material forms an interconnected matrix material defining a network of interconnected channels. In certain embodiments, the catalytic nanoparticles are partially embedded in the matrix material such that the proximal portions of the catalytic nanoparticles are embedded in the matrix material and the distal portions of the catalytic nanoparticles are exposed to the interconnected channels. In accordance with certain embodiments, the metal ions are one of Ca, Mg, Ni, Cu, Fe, or combinations thereof. In accordance with certain embodiments, the ligands are one of polyethylene glycol (PEG) or polyvinylpyrrolidone (PVP).

In accordance with certain embodiments, a method of fabricating a catalytic material is described. In certain embodiments, the method includes providing a templating component having nanoparticle precursors therein. In certain embodiments, the method includes arranging the templating component into an interconnected templating component; such that the matrix precursor fills the interstitial spaces of said interconnected templating component. In certain embodiments, the method includes arranging the templating component into an interconnected templating component with a filling material that fills the interstitial spaces of said interconnected templating component. In certain embodiments, the method includes at least partially removing the templating component such that the filling material forms an interconnected matrix material defining a network of interconnected channels such that plurality of catalytic nanoparticles having proximal portions and distal portions are formed In certain embodiments, the catalytic nanoparticles are formed partially embedded in the matrix material such that the proximal portions of the catalytic nanoparticles are embedded in the matrix material and the distal portions of the catalytic nanoparticles are exposed to the interconnected channels.

In accordance with certain embodiments, a method of preparing a hierarchically porous material is described. In certain embodiments, the method includes providing a porous macroscopic monolithic substrate having a first porosity with a first average pore size. In certain embodiments, the method includes applying to the pores of the monolithic substrate a co-assembly mixture comprising templating sacrificial material and a matrix precursor material. In certain embodiments, the method includes removing the templating sacrificial material to form a templated porous coating (TPC) within the porous monolithic substrate, wherein the TPC has a second porosity with a second average pore size, and wherein the second average pore size is smaller than the first average pore size.

In accordance with certain embodiments, the porous monolithic substrate is one of a ceramic, cordierite, Mullite, zeolite, natural or synthetic clay.

In accordance with certain embodiments, the porous monolithic substrate includes a conductive material.

In accordance with certain embodiments, the porous monolithic substrate is a metal, metal alloy, stainless steel, ferritic steel, austenitic steel, copper, nickel, brass, gold, silver, titanium, tungsten, aluminum, palladium, platinum, graphite, a conductive carbon material, a conductive inorganic material, a conductive organic materials, or combinations thereof.

In accordance with certain embodiments, a monolithic porous substrate having the catalytic material of certain embodiments disclosed herein. In certain embodiments, the monolithic porous substrate of claim 110, wherein the monolithic porous substrate is used in a catalytic converter. In certain embodiments, the monolithic porous substrate is used in a fuel cell. In certain embodiments, the monolithic porous substrate is used in an elecrrolyzer.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which: FIG. 1A is a schematic illustration showing an example of a catalytic material featuring its design features, in accordance with certain embodiments.

FIG. 1B is a schematic illustration showing examples of nanoparticles (NPs) partially embedded into the matrix material resulting in strong particle attachment that leads to substantially improved mechanical, thermal and chemical stability of the enhanced catalyst in accordance with certain embodiments.

DETAILED DESCRIPTION

Figure 1A:
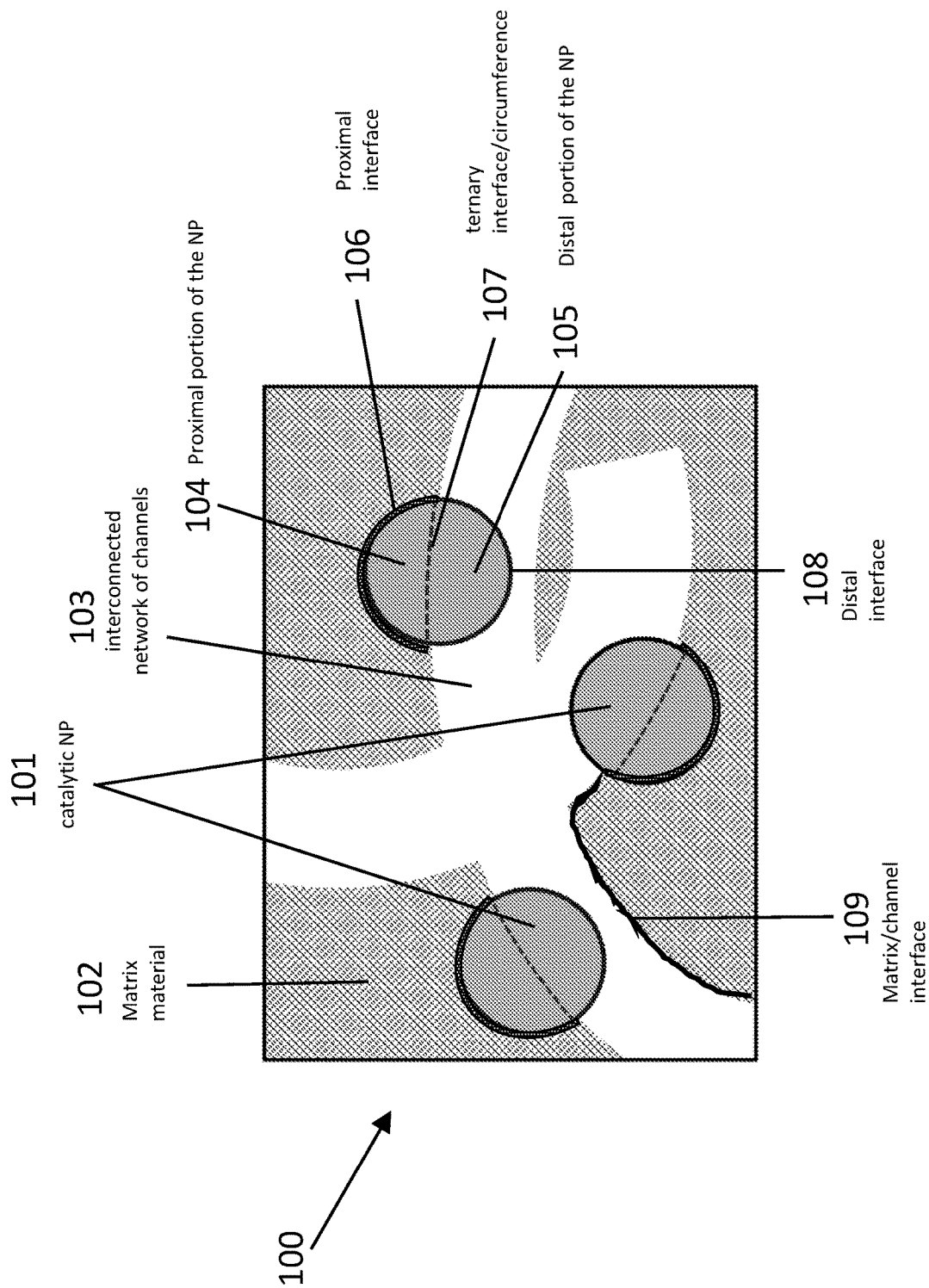
FIGS. 1A-B are schematic illustrations of nanoparticles in accordance with certain embodiments.

The design of advanced catalytic systems is important for, by way of example, developing sustainable ways to generate energy, treat pollution, and produce raw and fine chemicals for a wide range of sectors, including agriculture, construction, medicine, chemical and pharmaceutical industries, and transportation. For example, catalysts are used in production of synthetic fuels (synfuels) such as gasoline, jet and diesel fuels, kerosene, methane, biofuels from renewable (e.g. biomass) and nonrenewable sources (natural gas, coal and oil shale). Examples of catalytic processes include coal and natural gas liquefaction, hydrogenation, dehydrogenation, syngas synthesis, Fischer-Tropsch process, methanol synthesis, ammonia synthesis, sulfur dioxide oxidation, ammonia oxidation, synthesis of terephthalic acid, and oil extraction processes (e.g. hydropyrolysis and fracking). Catalysts are key elements in the synthesis of hydrogen using such processes as catalytic partial oxidation, steam reforming, reforming renewable fuels, electrolytic processes, and photoelectrochemical water splitting. Catalysts are widely used in polymer syntheses, in refining and recycling industries in such processes as fluid catalytic cracking, hydrocracking, hydrotreating, alkylation, isomerization, and catalytic reforming. Catalysts are used in energy conversion (fuel cells), green processes (production of chemicals, textiles and leather, pulp and paper, and food processing) and air and water pollution remediation applications (e.g., treatment of emissions from power plants and automobiles). In certain embodiments, the catalytic materials disclosed herein can be used in any of these applications.

Optimization of catalytic reactions for such a diverse range of applications and settings remains one of the most challenging contemporary technological and scientific goals. This is due to many reasons, including wide variety of catalytic and support materials involved, their variable performance, availability, lifetime, cost contributions, recyclability, and disposal costs. Typical catalysts technologies have a number of disadvantages. For example, they often require relatively high loading of expensive catalysts, such as for example, platinum group metals, so-called platinum group metals (PGMs) (Pt, Pd, Rh, Ir, Ru, and Os) combined with elevated operating temperatures (typically 100-800° C.). The selectivity, efficiency, stability, and lifetime of these catalysts are non-optimal and are desired to be improved. Much catalysis technology was developed at a time when feedstock restrictions, energy costs and environmental concerns were different from the current conditions.

The incorporation of metal nanoparticles (NPs) into porous structures can introduce certain desired properties, such as optical, sensing and catalytic properties. Methods for catalyst immobilization include attachment of preformed nanoparticles, deposition of a metal precursor onto a substrate followed by a reduction step leading to formation of NPs, and one-pot concurrent synthesis of catalytic NPs and their supporting matrix. However, control over one parameter frequently comes at the expense of control over others. As discussed below, infusing catalyst particles into a pre-assembled porous substrate, for example by adsorption or deposition of metal NPs, yields highly accessible catalytic sites; however, the NPs are loosely bound and often unstable leading to their sintering and fusion, especially in high-temperature catalytic reactions. Other methods yield porous substrates with metal residing only or predominantly at the air/solid interface of the interconnected structure.

Catalysts capable of providing the following benefits are disclosed, in certain embodiments:
1. Greater selectivity and higher yields, enabling manufacturers to reduce waste and energy consumption, minimize feedstock costs or facilitate substitution with new feedstocks.
2. Clearer structure/function relationships, making it possible to better predict and control catalyst performance metrics and reduce the time to market for new products and processes.
3. Minimization of pollution and pollution-abatement costs.
4. Improved separation, recovery and recycling.
5. Reduced loading of expensive catalysts, for example platinum group metals, or their replacement with more abundant elements.
6. Improved long-term stability under reaction conditions.
7. Ability to operate at lower temperatures and pressures, leading to energy savings.
8. Ability to control catalyst poisoning and resulting catalysts' deactivation.
9. Minimization of sintering and agglomeration of catalytic particles that generally lead to catalysts' deactivation and reduced lifetime.

In certain embodiments, improvements in efficiency, selectivity, operating temperatures, particles deactivation, thermal and mechanical stability, catalyst loadings, are discussed. Moreover, in certain embodiments, active sites can be integrated into multiscale, multifunctional material infrastructures designed to control mass transport, reaction coupling, conduction or dissipation of heat or light, and provision of long-term stability under reaction conditions, among other things. Furthermore, for successful industrial utilization, in certain embodiments, the catalytic materials can be made in a scalable manner with economic material use and in a format that facilitates their integration into larger systems, whether, for example, supported on a substrate or dispersed in a medium. While certain porous structures, such as zeolites, carbon-based systems, and metal organic frameworks, provide large reactive surface areas and allow for designed mass transport, many other factors remain difficult to control synthetically. To fundamentally advance the field, disclosed herein are comprehensive synthetic strategies for tailoring the roles of numerous material features, such as distribution of one or more types of active sites on the bulk matrix, geometry of the pores/channels, their size, arrangement and connectivity, as well as mechanical and optical properties of the system.

In certain embodiments, different approaches for forming catalytic structures can include directly combining a catalyst support with active catalyst precursors (for example as a slurry), or infusing a catalyst into a pre-formed support structure. The present disclosure provides nanoscale active sites that can be locally arranged on mesoscale entities, and self-organization of the mesoscale particles within a matrix can further mediate the formation of diverse macroscopic hierarchical architectures containing precisely structured networks of catalytic sites.

In certain embodiments, mesoscale templating materials, such as for example polymeric colloids and/or fibers (for example, having dimensions in the range of about 10 nm to 100 micron) with catalysts on their surfaces are co-assembled with metal oxide matrix precursors, leading to highly interconnected networks of channels or pores with precisely positioned catalysts upon removal of the templating sacrificial material. The terms "interconnected network of channels", "interconnected porous networks" and "interconnected network of pores" are used in this description interchangeably, to mean three-dimensionally connected space as a conduit for reactants. In addition, as described herein, the terms "pore" and "channel" are used interchangeably (e.g., use of "pore" also refers to use of a "channel"), and pore also refers specifically to an inverse opal structure. In some embodiments, the strategy enables independent specification of the reactive components, matrix, and template properties, allowing the catalytic material's physical, chemical, and architectural characteristics—including composition, surface area, porosity, interconnectivity, and tortuosity—to be designed quasi-independently on multiple length scales, from the molecular, to nanometer and micrometer scales, and finally to the macroscopic (for example 10 microns and above). The contribution of each of these parameters and exemplary functional advantages of the resulting catalytic architectures are described in certain embodiments herein.

In certain embodiments, the three-dimensionally porous structures can have various architectures, e.g., inverse opal, gyroid, double gyroid, Lincoln log structure, sponge structure, a structure resulting from an assembly of fibers, assembly of irregular, arbitrary objects, combinations thereof, and the like. In certain embodiments, the three-dimensionally porous structures can be both highly ordered and partly disordered. In certain embodiments, the three-dimensionally porous structures have an inverse opal architecture which is both highly ordered and partly disordered. In certain embodiments, the three dimensionally porous structures have a gyroid architecture which is both highly ordered and partly disordered. In certain embodiments, the three dimensionally porous structures have a double gyroid architecture which is both highly ordered and partly disordered. In certain embodiments, the three dimensionally porous structures have a Lincoln log architecture which is both highly ordered and partly disordered.

Figure 35:
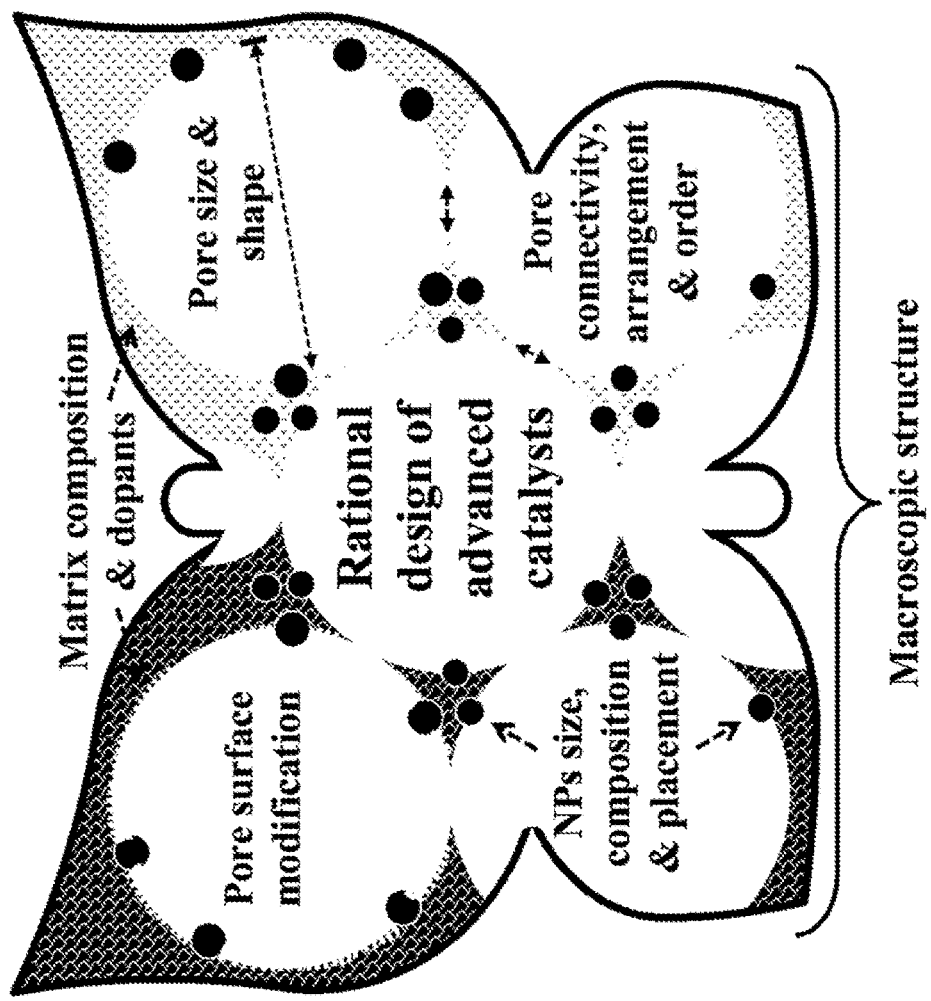
FIG. 35 is a schematic illustration of a catalytic system design 3500 incorporating exemplary degrees of freedom, in accordance with certain embodiments.

Building from this principle, in certain embodiments, disclosed herein is a versatile synthetic framework for design of hierarchical organic-inorganic catalytic architectures, with numerous degrees of freedom, for example, as depicted in FIG. 35. As shown in FIG. 35, in certain embodiments, architectural and compositional degrees of freedom are provided by a disclosed methodology for the design of advanced catalysts. In certain embodiments, the system is finely tuned from the molecular scale (surface modification and matrix composition), through the nanoscale (composition, size, and placement of catalytic nanoparticles and matrix dopants), microscale (pore size, shape and connectivity), and to the macroscale (overall shape and macroscopic patterns) in order to create the desired functional architecture. For example, disclosed herein is a catalytic system design 3500 for selecting one or more degrees of freedom including matrix composition, matrix dopants, pore size, pore shape, pore connectivity, pore arrangement, pore order, pore surface modification, nanoparticle size, nanoparticle composition, nanoparticle loading, and nanoparticle placement to achieve desired functional architecture.

As disclosed herein, Section I describes characteristics of interfaces between catalytic nanoparticles and a matrix, between catalytic nanoparticles and a network of channels or pores, and between a matrix and a network of channels or pores, according to certain embodiments. Section II describes exemplary methods of controlling morphology and chemistry of the interfaces according to certain embodiments. Section III describes exemplary applications of catalytic material, according to certain embodiments. Section IV describes various materials that can be used in certain embodiments. In certain embodiments, disclosure of each section can be combined with teachings of disclosure of other section to produce additional porous catalytic structures with combined or additional functionality. By means of non-limiting example, embodiments disclosed in Sections I-III can be made with the materials of Section IV, or the embodiments of Section I can be made using the methods and concepts of Sections II and III.

I. Design Features of the Enhanced Catalytic Material

In various embodiments, the features disclosed below can be included alone, or in combination with other features disclosed herein.

In certain embodiments, disclosed herein and schematically shown in FIG. 1A is a versatile synthetic framework for the design of enhanced catalytic architectures 100, with catalytic nanoparticles (NPs) 101 strategically placed at the interface between the matrix material 102 and interconnected network of channels 103. In some embodiments, the NPs are described as partially embedded, entrenched, ingrained or engraved into or within the matrix material. For the purposes of this application, these terms are meant to be used interchangeably and their intended meaning, along with the quantification metrics, are provided below. As is demonstrated in certain embodiments of this invention, such partial embedding of the catalytic NPs provides a number of unprecedented advantages, such as for example (i) exceptional mechanical stability against agglomeration and sintering, leading to enhanced activity and longevity of the catalysts, (ii) exceptional thermal stability, in particular under high-temperature reaction conditions; and (iii) is also associated, in certain embodiments, with the enhancement of catalysts' performance due to the modulation of the chemical nature of the NPs or their interfaces with the matrix and the channels, as well as formation of additional co-catalytic species.

A particle, partially embedded, entrenched, ingrained or engraved into or within the matrix material, is a particle that resides in such a way, with respect to the adjacent surfaces of the matrix, that a certain portion of it, called a proximal portion of the NP 104, is enveloped by the matrix material 102, forming a proximal interface 106 between the NP and the matrix, while the remainder, called a distal portion of the NP 105, is not enveloped by the matrix and is exposed to the channel 103, forming a distal interface 108 between the NP and the channel. The two interfaces intersect, forming the ternary interface 107 between NP-matrix material-channel, termed in some embodiments "circumference", "equator", "perimeter", "three-phase contact line", "matrix-channel interface at the nanoparticle circumference". The term "partially embedded" is intended to mean that there exist certain finite ratios between the depth of the proximal, or embedded, portion 104 of the nanoparticle and the height of the distal, or exposed to the channel, portion of the nanoparticle 105. These notions can be additionally illustrated by referring to FIG. 1B, which shows several possible exemplary arrangements of embodiments of differently shaped nanoparticles 100 (the catalytic materials 100 of FIG. 1B have like structures to the catalytic materials 100 of FIG. 1A that are unlabeled, for example nanoparticles 101 of FIG. 1B have corresponding proximal portions 104, distal portions 105, proximal interfaces 106, circumference 107, and distal interfaces 108). In certain embodiments the proximal interface of the embedded particle can be smooth, curved, faceted, roughened, or rugged, with the NP-matrix attachment being continuous, conformal, or non-continuous and spotty. The terms circumference, equator, perimeter, three-phase contact line matrix-channel interface at the nanoparticle circumference are intended to be applicable to any one of possible shapes of the NPs, which includes, for example, spherical, ellipsoid, elongated, rod-like, polyhedral, faceted, arbitrarily curved shapes, possessing rugged, jagged outlines, anything in between the above, and to any combination of more than one of these shapes, and not just spherical nanoparticles.

Figure 1B:
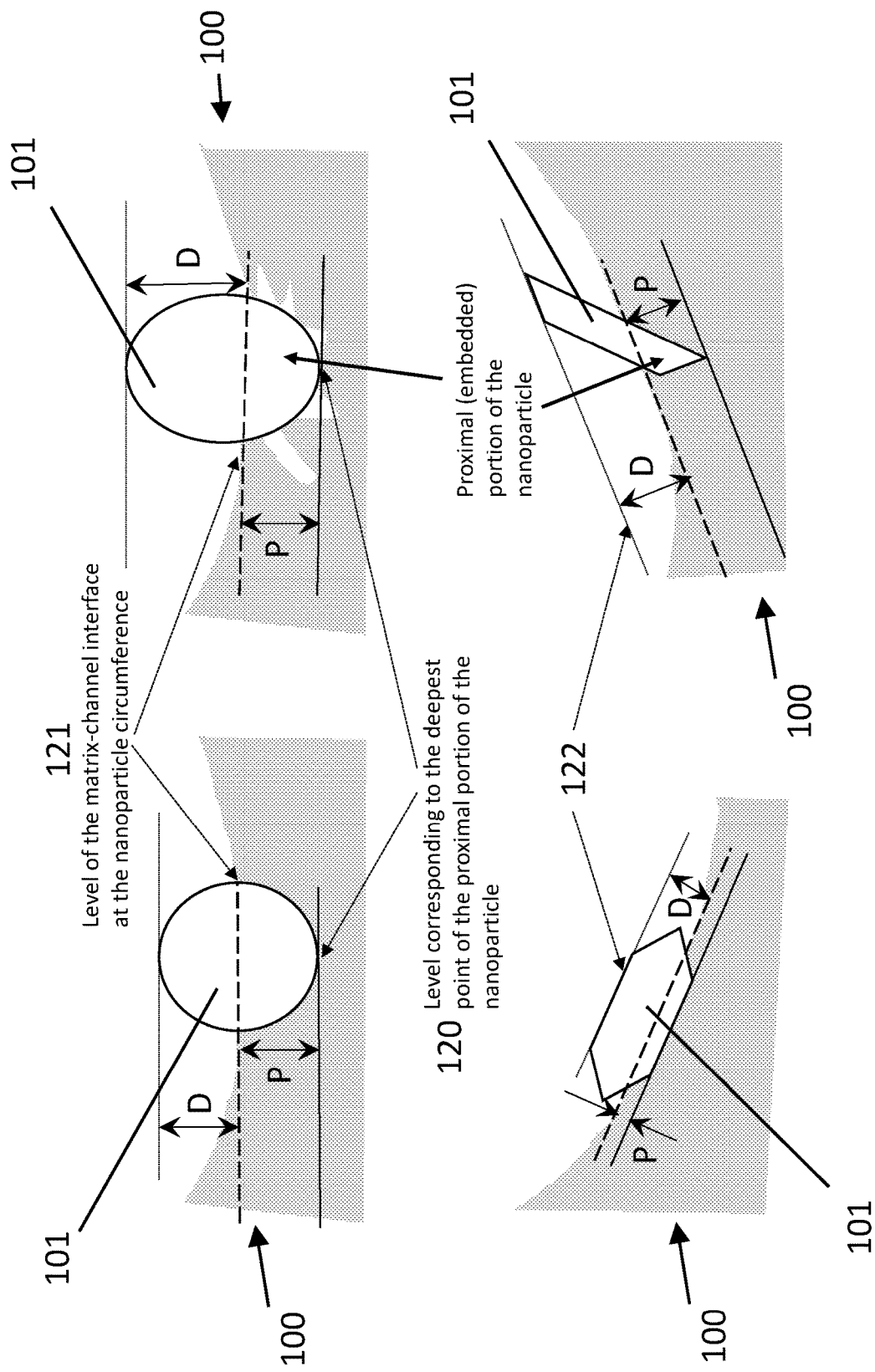

For the purposes of this application, the absolute depth of such partial embedment, entrenchment, or engravement of the NPs into the matrix material is characterized by the distance between the level of the matrix-channel interface at the nanoparticle circumference and the level corresponding to the deepest point of the proximal portion of the nanoparticle, as shown in the embodiments of FIG. 1B. Additionally, the degree of embedment is defined by the ratio of the depth of the proximal part of nanoparticle shown as P in FIG. 1B (delineated by the deepest point of the proximal interface 120 and the plane of circumference 121) and the height of the distal portion of the nanoparticle shown as D in FIG. 1B (delineated by the furthest point 122 of the distal interface and the plane of circumference), called P:D ratio. Though the P:D ratio can vary widely, and in certain embodiments not less than one atomic layer of the catalytic material is embedded in the matrix material, in order to achieve significant attachment of the nanoparticle to the matrix that leads to the enhanced catalytic activity described herein. P:D rations of certain embodiments are explained, below.

The lower limits of the P:D ratios are estimated, in certain embodiments, for spherical gold nanoparticles having diameters 1 nm to 20 nm that cover the size range typical for catalytic nanoparticles. Under the specified above assumption that not less than one atomic layer of gold (~0.288 nm, based on the metallic radius of Au atom of 144 pm) should be embedded in the matrix, the lower limits of P:D ratios calculated for spherical gold nanoparticles having diameters of d=1 nm to d=20 nm result in ~29% to ~1.4%.

The lower limits of the P:D ratios are estimated, in certain embodiments, also for cubic-shaped gold nanoparticles having sides of 1 nm to 20 nm that cover the size range typical for catalytic nanoparticles. Under the specified above assumption that not less than one atomic layer of gold (~0.288 nm, based on the metallic radius of Au atom of 144 pm) should be embedded in the matrix, the lower limits of P:D ratios calculated for cubic gold nanoparticles having sides of d=1 nm to d=20 nm and embedded parallel to their faces result in the same values—~29% to ~1.4%.

The lower limits of the P:D ratios are estimated, in certain embodiments, also for rod-like gold nanoparticles oriented perpendicular to the matrix interface and having 10 nm length, 20 nm length, and 50 nm length, that cover the size range typical for catalytic nanorods. Under the specified above assumption that not less than one atomic layer of gold (~0.288 nm, based on the metallic radius of Au atom of 144 pm) should be embedded in the matrix, the lower limits of P:D ratios calculated for these rod-like gold nanoparticles result in the values—~2.9% and ~1.4%, and ~0.6%.

For a person skilled in the art, it should be evident that similar calculations and estimates can be made for different materials of NPs, different shapes of nanoparticles, their different orientations with respect to the plane of the circumference of the nanoparticle embedded into the matrix, as well as for the ratios of the volumes of their proximal and distal parts. In certain embodiments, at least one atomic layer of the catalytically active material should be exposed to the channel, in order to avoid full particle encapsulation and form the enhanced catalysts with catalytic NPs exposed to the porous network described in the present invention, so the methodology used for the lower limit estimates above equally apply to the higher limit of embedment.

To achieve the beneficial results described herein, in certain embodiments, proximal portion of the catalytic NPs can vary between 0.5% and 99.5% and the exposed, distal portion of the catalytic NPs can vary between 99.5% and 0.5%. More specifically, in certain embodiments, the P:D ratios, as defined herein, include P:D ratios of 0.5:99.5; 1:99; 2:98; 3:97; 4:96; 5:95; 6:94; 7:93; 8:92; 9:91; 10:90; 20:80; 30:70; 40:60; 50:50; 60:40; 70:30; 80:20; 90:10; 91:9; 92:2; 93:7; 94:6; 95:5; 96:4; 97:3; 98:2; 99:1; and 99.5:0.5.

Figure 8:
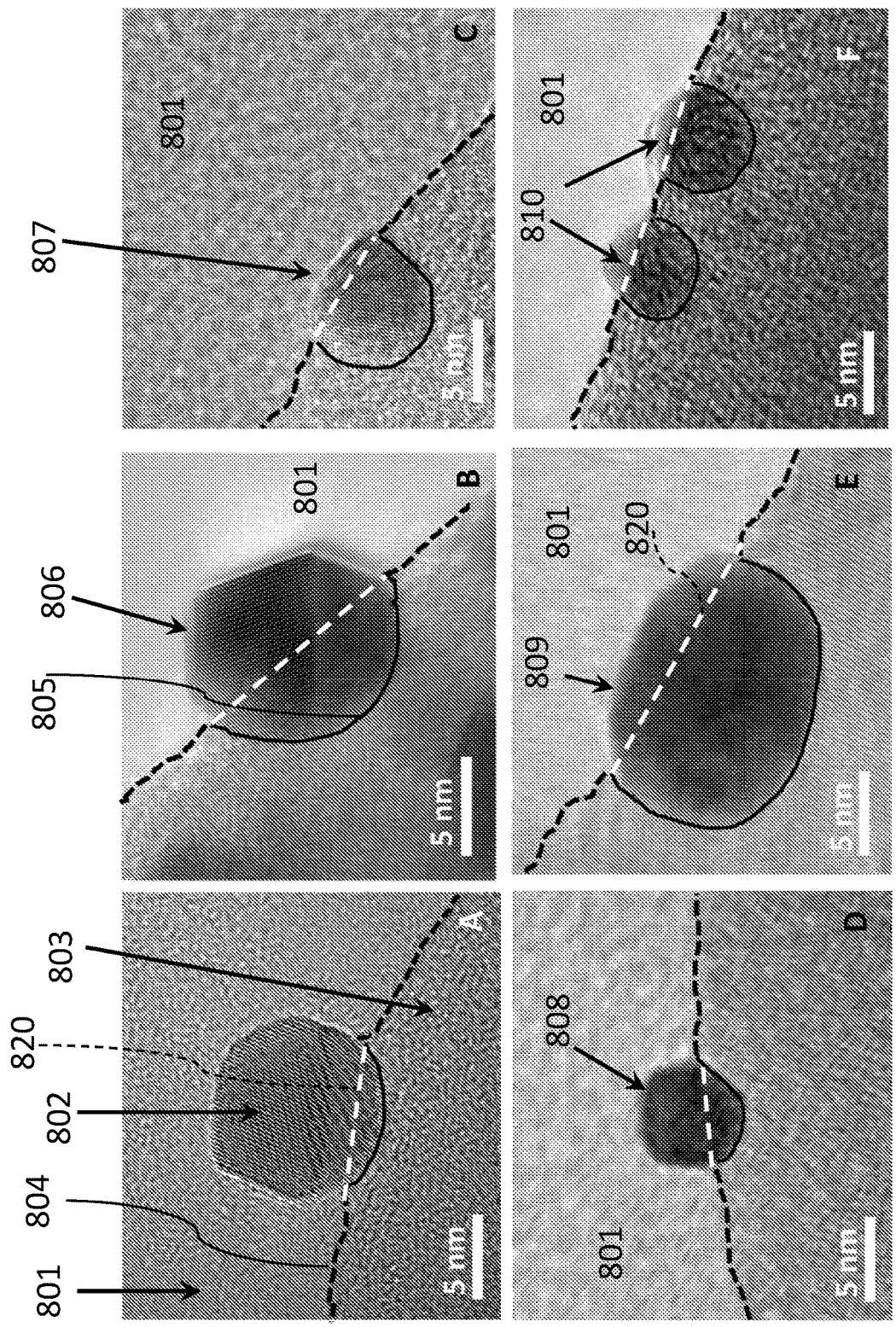
FIG. 8 is a schematic illustration and representative transmission electron microscopy (TEM) images showing NPs with various depths of embedding inside the matrix, in accordance with certain embodiments.

In certain embodiments, P:D ratios for different NPs in the same catalytic material can vary, such that there is significant numbers of NPs in various P:D categories, in particular those with a higher embedding ratio to ensure high mechanical and thermal stability (as shown in FIG. 8). For example, FIG. 8 shows nanoparticles 802 embedded within matrix material 803 and exposed to channels 801. The nanoparticles have circumference 820, proximal interfaces 805, and distal interfaces 806. The catalytic material also has matrix/channel interface 804. In certain embodiments, nanoparticles are embedded to varying degrees. In certain embodiments, it is desirable to have significant proportions of nanoparticles (e.g., greater than 50%) only slightly embedded (i.e., having a low P:D ratio) to maximize the amount of exposed catalytic material. In this embodiment, the nanoparticles are not considered to be embedded in the matrix material. Examples of nanoparticles are depicted in views A and D of FIG. 8. In certain embodiments, it is desirable to have significant proportions of nanoparticles (e.g., greater than 30%, 40%, 50%, 60%, 70%, 80%, 90%, according to certain embodiments) significantly embedded (i.e., having a high P:D ratio) to maximize the mechanical and thermal stability of the catalytic material. Examples of nanoparticles are depicted in views C and E-F of FIG. 8. In certain embodiments, it is desirable to have significant proportions of nanoparticles (e.g., greater than 50%) having substantially equal proximal and distal portions (i.e., having a P:D ratio of approximately 1) to achieve both high mechanical thermal stability and high exposed catalytic material for catalysis. Examples of nanoparticles are depicted in view B of FIG. 8. The systems and methods disclosed herein have been found to be capable of producing significant amounts of nanoparticles embedded in the matrix material, e.g., not just kissing or touching the surface.

In certain embodiments, the catalytic nanoparticles comprise a metal, a transition metal, a main group metal, a metal oxide, a mixed metal oxide, any one or more metals from group I, II, III, IV, V, VI, VII, VIII, from both main and transition series, or groups 1-16 in alternative nomenclature, any one or more oxides of metals from group I, II, III, IV, V, VI, VII, VIII, from both main and transition series, or groups 1-16 in alternative nomenclature, oxometallates, a metal sulfide, a metal pnictide, a metal carbide, a binary metal salt, a complex metal salt, a metal salt of an organic acid, a metal salt of inorganic acid, a metal salt of a complex acid, a base, an acid, a metal alloy, a multimetallic species, an intermetallic compound, non-stoichiometric phases, an organometallic compound, a coordination compound, one or more platinum group metal, one or more platinum group metal oxide, carbon, iron, cobalt, nickel, ruthenium, rhodium, palladium, osmium, iridium, platinum, copper, silver, gold, iron oxides, cobalt oxides, nickel oxides, ruthenium oxides, rhodium oxides, palladium oxides, osmium oxides, iridium oxides, platinum oxides, copper oxides, silver oxides gold oxides, titanium oxides, zirconium oxides, hafnium oxides, vanadium oxides, niobium oxides, tantalum oxides, chromium oxides, molybdenum oxides, tungsten oxides, manganese oxides, rhenium oxides, scandium oxide, yttrium oxide, lanthanum oxide, rare earth metal oxides, any species above in a single crystal polymorph or in several polymorphs, any species above presenting to the channel a specific crystallographic plane, any species above in non-crystalline form, and combinations thereof.

In certain embodiments, complex catalytic materials, which feature multiple catalytic nanoparticles that bear functional and/or catalytic species, and methods of their formation are described. The materials include catalytic nanoparticles (NPs) partially embedded within a supporting matrix of the three-dimensionally porous structure. In certain embodiments, the NPs are incorporated through the aid of interconnected network of an interconnected templating component. The NPs experience unique asymmetric conditions in the process of treating the composite precursor. Given this very specific local chemical environment, in certain embodiments, the treatment (such as thermal, optical, microwave, plasma, and chemical; under oxygen, other gases, etc.) can lead to the formation of functionally (e.g., catalytic or co-catalytic) relevant chemical and structural/morphological species or features at the NP-matrix, NP-pore, and matrix-pore interfaces. Relative to the untreated material, the treated or final material is characterized by enhanced properties.

In certain embodiments, the final catalytic material is characterized by one or more of the following:

increased mechanical and thermal stability and protection from the particles agglomeration and diffusion due to the strong particle anchoring arising from the partial embedding of the NPs within the supporting matrix;

additional mechanical and thermal reinforcement and protection from the particles agglomeration and diffusion arises due to the treatment-induced formation of chemical bonding (e.g., metal oxide, metal silicate, alloys, etc.) at the proximal interface between the NP and the matrix;

formation of catalytically relevant ionic species (i.e. ions and radicals, e.g., Ag(II), Au(III), Pd(II, IV), Pt(II, IV)) predominantly at the NP-matrix interfaces;

treatment-induced deposition of catalytically (or co-catalytically) active species (e.g., carbon or polycyclic/polycondensed carbon-rich species) predominantly at the matrix-pore interface due to incomplete removal or chemical transformation of the interconnected templating component (which contains e.g., an organic, metal NPs, organometallic or oxide phase);

treatment-induced deposition of catalytically (or co-catalytically) active species (e.g. metal, metal oxides, metal or metal-oxide nanoparticles) predominantly at the NP-pore interfaces due to combustion of composite templating material;

redistribution of the NP's content (e.g., to obtain inhomogeneous distribution of different metal atoms in the case of multimetallic NPs) resulting from the treatment-induced presence of certain species predominantly at interfaces and/or temperature gradients promoting such transformations;

treatment-induced modification of the shape of the supported NPs (e.g., formation of facets, roughening, and elongation) due to the specific and asymmetric chemical conditions, thermal gradients, etc. at the different interfaces;

formation of different catalytically relevant phase changes within the matrix material predominantly at the proximal NP-matrix interface and at the matrix-templating component interface, emergence of or change in the porosity of the NPs themselves, and other chemical, structural and mechanical transformations occurring on the proximal, distal and matrix-channel interfaces The above mentioned changes in the anchoring, chemical and mechanical bonding and the appearance of additional catalytic species in the catalytic material lead to an unprecedented improvement of catalytic performance, that includes, but is not limited to one or more of the following: significant reduction in catalysts loading, reduction of reaction temperatures, improved selectivity, improved longevity, reduced catalyst poisoning and deactivation, according to certain embodiments. More specific features are discussed below.

Figure 10:
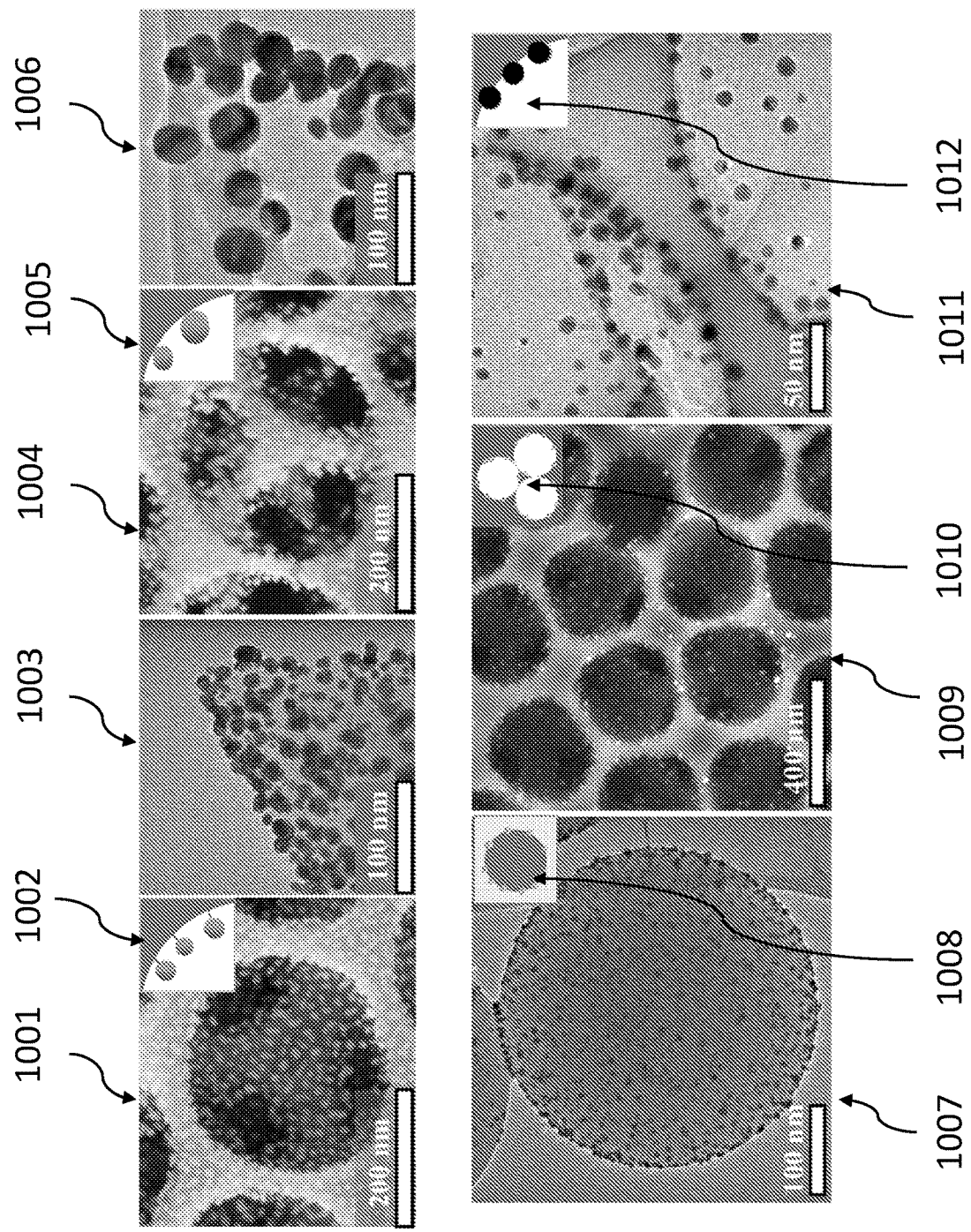
FIG. 10 is a schematic and pictorial comparison of thermal stabilities of Au NPs grown in a preformed silica porous structure (so-called inverse opal—IO—structure) by a traditional approach (top row) and those incorporated into silica IOs using the templating approach presented in FIG. 2 (bottom row), showing significant agglomeration and growth of NP in a typical approach and no changes in the particle size in the catalytic material of embodiments disclosed herein, in accordance with certain embodiments.

In some embodiments, the final material is characterized by increased mechanical and thermal stability due to the partial embedding of the NPs within the supporting matrix, as shown for example in FIG. 1. In some embodiments, the final material is characterized by increased adhesion to the substrate (e.g., the matrix material) and thus stability against migration, agglomeration, and sintering that would otherwise cause early catalyst deactivation or reduced activity, as shown in example presented in FIG. 10. In particular, FIG. 10 depicts a comparison of thermal stabilities of Au NPs grown in a preformed pure IO (1001-1006) and those incorporated into silica IOs using the NP-decorated templating approach (1007-1012), in accordance with certain embodiments. 1001 shows an SEM image of a silica IO with Au NPs grown on the surface before heat treatment, along with a schematic representation 1002. 1003 shows a TEM image of a fragment of the IO shown in view 1001. The particle size at that stage is 9±3 nm. 1004 shows an SEM image of an IO shown in view 1001 after heat treatment at 600° C., along with a schematic illustration 1005. The average particle size at that stage is 28±9 nm (>200% increase), as shown in 1006 TEM image of a fragment of IO after thermal treatment. Since the increase in the size of catalytic particles significantly reduces their activity, the resulting (traditional) catalysts will show continuously reduced activity, as the particles diffuse and grow upon thermal treatment. On the contrary, according to certain embodiments, 1007 shows a TEM image of NP-decorated particles consisting of polystyrene colloids modified with Au NPs (5±1 nm) in accordance with certain embodiments, along with a schematic illustration 1008. 1009 shows an SEM image of an IO fabricated using the colloids shown in 1007, according to certain embodiments, along with a schematic illustration 1010. 1011 shows a TEM image of the IO shown in 1009 shows an insignificant change in the Au NPs diameter after calcination at 600° C. (6±1 nm, ~20% increase), along with a schematic illustration 1012. The absence of growth will result in a highly enhanced thermal stability of the catalyst and its long-term function. Such results are demonstrated, for example, in FIGS. 12-13.

Enhanced thermal stability of the incorporated NPs is of high practical importance as it affects the limits of operating conditions and usable lifetime of a catalytic device (e.g. catalytic converter, reformer, or fuel cell). The catalysts described herein are non-limiting examples of systems providing significant stabilization of NPs from diffusion and sintering at elevated temperatures. For different reactions conditions and different catalysts, the stabilization effect can have different magnitude. In some embodiments, the NPs growth can in systems disclosed herein can constitute increase by 1-2%, 2-5%, 5-10%, 10-20%, 20-40%, and more than 40% compared with conventional systems, while at the same conditions the increase in NPs size of the corresponding conventional catalyst will correspond to 5-10%, 10-20%, 20-30%, 40-60%, 60-80%, 80-100%, and more than 100%.

Figure 3:
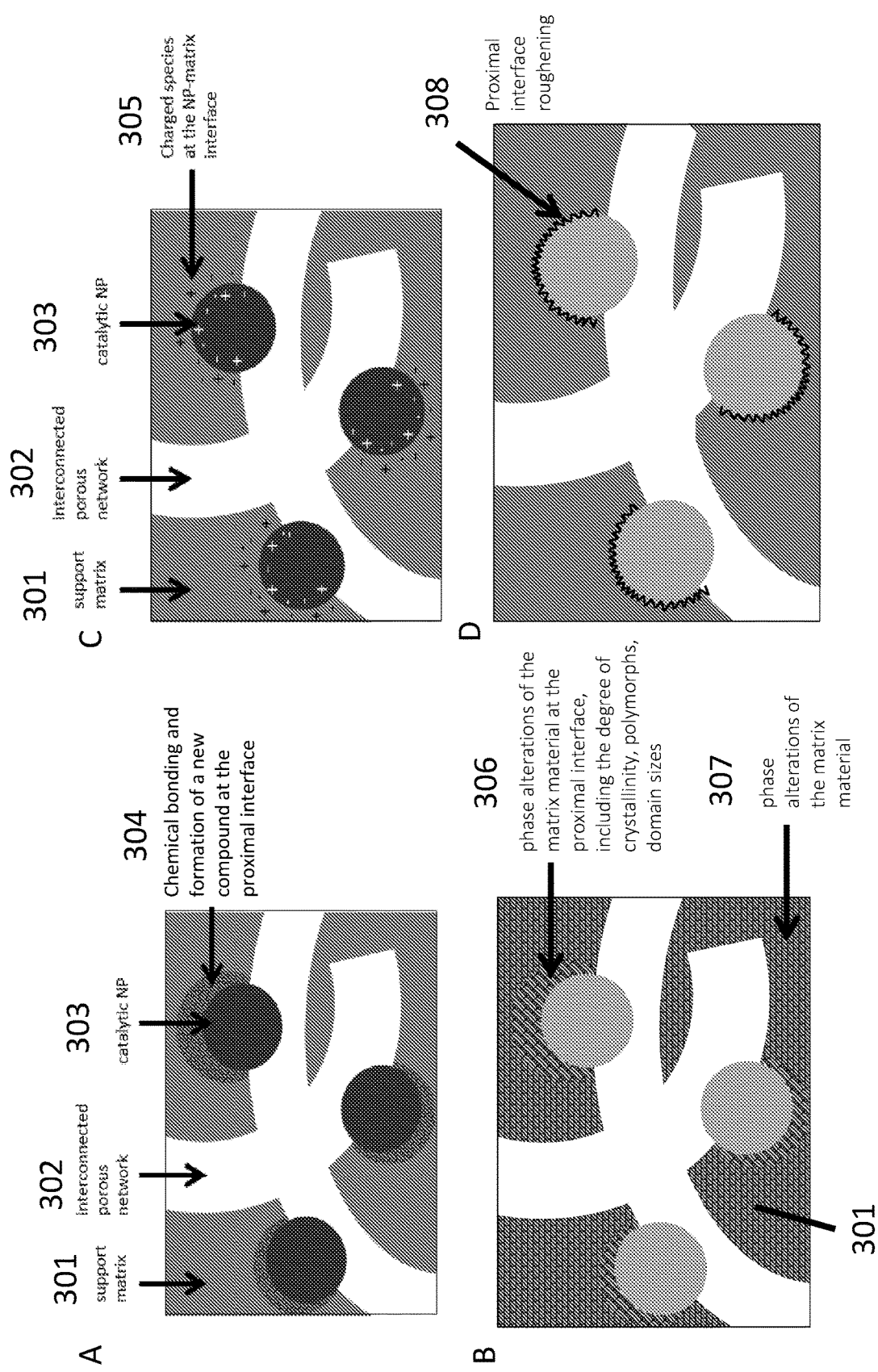
FIG. 3 is a schematic illustration showing examples of the treatment-induced changes at the proximal interfaces, i.e. between NP and matrix material strengthening the thermal and mechanical robustness of the catalytic structure, in accordance with certain embodiments. View A is a schematic illustration showing treatment-induced formation of chemical bonding between NPs and the matrix material resulting in the formation of a new compound at the proximal interface in accordance with certain embodiments. View B is a schematic illustration showing treatment-induced phase alterations of the matrix material at the proximal interface, including the degree of crystallinity, polymorphs, domain sizes, in accordance with certain embodiments. View C is a schematic illustration showing treatment-induced formation of catalytically relevant ionic species at proximal interface, in accordance with certain embodiments. View D is a schematic illustration showing treatment-induced roughening of the proximal interface, in accordance with certain embodiments.

In some embodiments, the final material is characterized by additional mechanical reinforcement or strengthening due to treatment-induced formation of chemical bonding between the NP and the matrix, for example, as schematically presented in FIG. 3. As non-limiting examples, for metallic catalytic NPs embedded into various matrix materials, thermal treatment described herein can result in the formation of metal oxide, metal silicate, metal aluminate or, more generally, the proximal portions of nanopatricles become chemically bound at the interface with the matrix material by covalent interaction, ionic bonding, through formation of oxides, mixed oxides, oxometallates, aluminates, mixed aluminates, silicates, mixed silicates, alumosilicates, titanates, mixed titanates, stannates, mixed stannates, stannites, mixed stannites, rare earth oxides, mixed oxides of rare earths, carbides, metal alloys, intermetallic compounds, organometallic compounds, coordination compounds, organic compounds, inorganic compounds, or combinations thereof).

In some embodiments, the final material is characterized by formation of catalytically relevant species, either neutral or ionic predominantly at the NP-matrix and NP-pore interfaces (see, e.g., FIGS. 3-6) As non-limiting examples, for metallic catalytic NPs embedded into various matrix materials, treatment-induced changes described herein can result in the formation of e.g., ions and radicals, such as, Ag(II), Au(III), Pd(II, IV), Pt(II, IV), Rh(I, II, III), Ru(II, III), each of which can contribute additional, enhanced catalytic advantages to the performance of catalytic NPs.

Figure 6A:
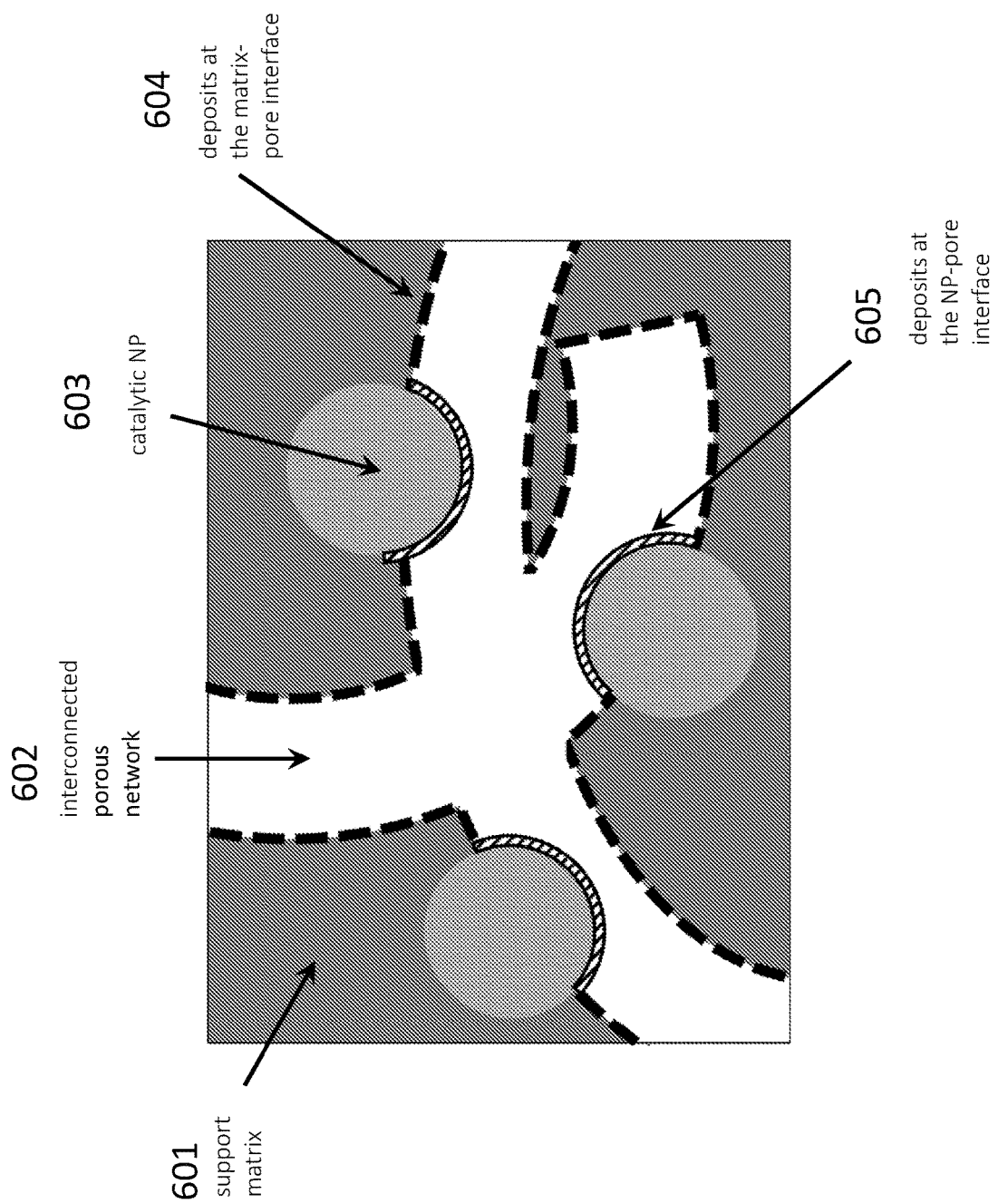
FIG. 6A is a schematic illustration showing an example of the treatment-induced deposition of additional catalytically relevant species at the matrix-channel and NP-channel (distal) interfaces, in accordance with certain embodiments.

In some embodiments, the final material is characterized by treatment-induced deposition of catalytically (or co-catalytically) active species arising from the incomplete removal or chemical transformation of the interconnected templating component, which will be deposited predominantly at the matrix-pore interface, as schematically shown in FIG. 6 and FIG. 2B. As non-limiting examples, incomplete thermal removal of an organic sacrificial template will result in the deposition of carbon or polycyclic/polycondensed carbon-rich species that will contribute to the catalytic activity of the NPs. Likewise, thermal of chemical removal of composite templating materials containing organometallic species or impregnated with metal or metal oxide phase will result in the deposition of metal or metal oxide NP or thin films on the matrix-pore interface.

In some embodiments, the final material is characterized by redistribution of the NP's content or composition resulting from the anisotropy in the environment of embedded NPs, such that the difference between the chemical environment at the matrix and template side produces, upon thermal or chemical treatment, chemical gradients in the composition and leads to accumulation of different species at distal and proximal interfaces, with active species drawn to the distal interface, and/or temperature gradients promoting such transformations. As a non-limiting example, FIG. 5 views A and C show treatment-induced inhomogeneous distribution of different metal atoms within the NP in the case of bimetallic or multimetallic NPs.

Figure 4:
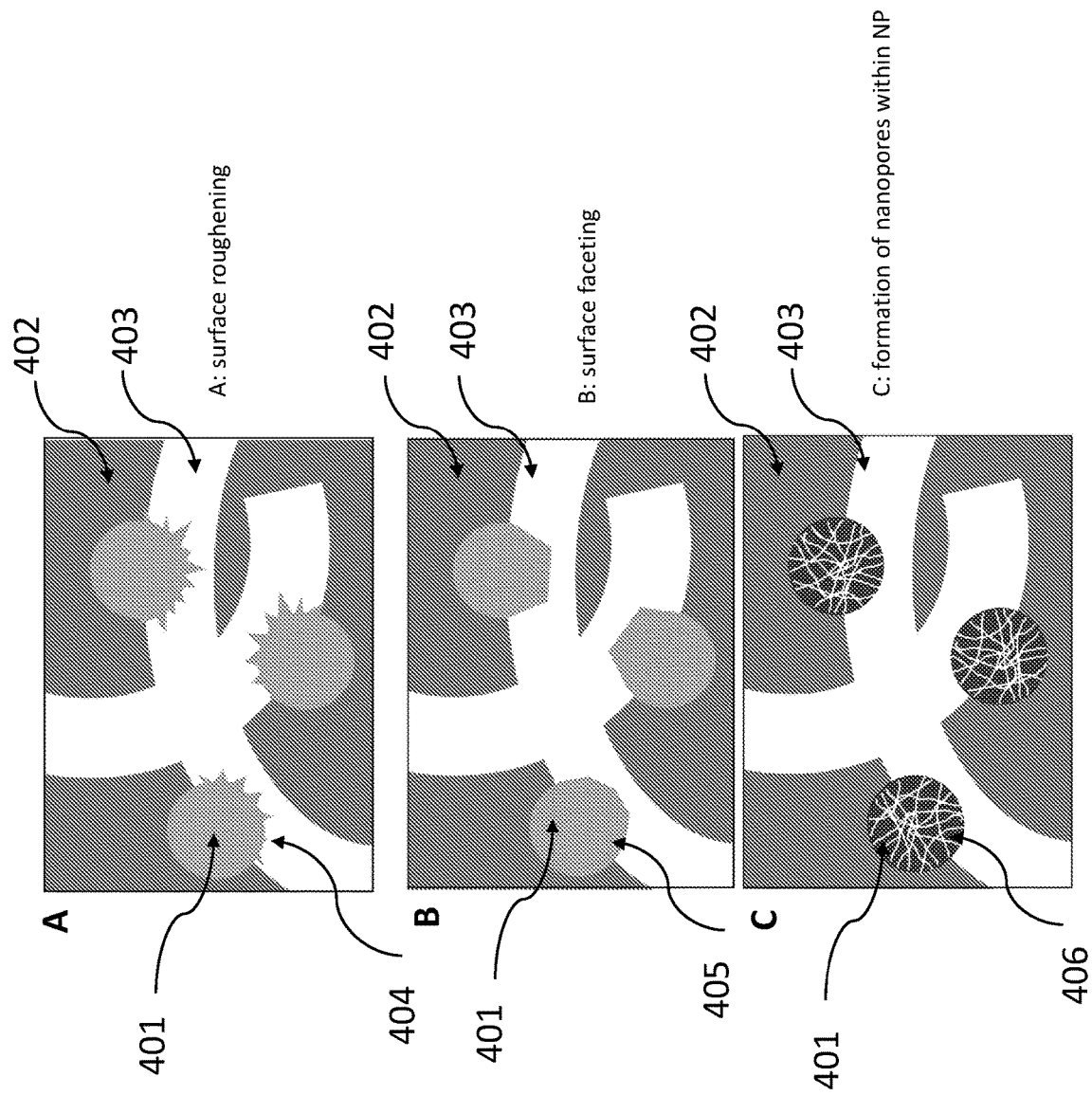
FIG. 4 is a schematic illustration showing examples of the treatment-induced changes at the distal interfaces, i.e. between NP and interconnected network of channels, in accordance with certain embodiments. View A is a schematic illustration showing treatment-induced roughening of the distal surface, in accordance with certain embodiments. View B is a schematic illustration showing treatment-induced faceting of the distal surface, in accordance with certain embodiments. View C is a schematic illustration showing treatment-induced porosity generation within NPs, in accordance with certain embodiments.

In some embodiments, the final material is characterized by porosity, cracks, or channels within NPs as shown schematically in FIG. 4 view C. Such porosity leads to enhanced catalytic activity due to the local reduction in the effective NP size. Another consequence of generation or modification of such porosity of catalytic NPs is the accessibility of the proximal NP-matrix material interface to the reactants and therefore additional emergent catalytic activity.

In some embodiments, the final material is characterized by treatment-induced modification of the shape of the supported NPs (e.g., formation of facets, roughening, and elongation; exemplary systems are shown in FIG. 4) due to specific and asymmetric chemical conditions, thermal gradients, etc. experienced by distal and proximal interfaces of the NPs during formation of the catalytic material.

Figure 5:
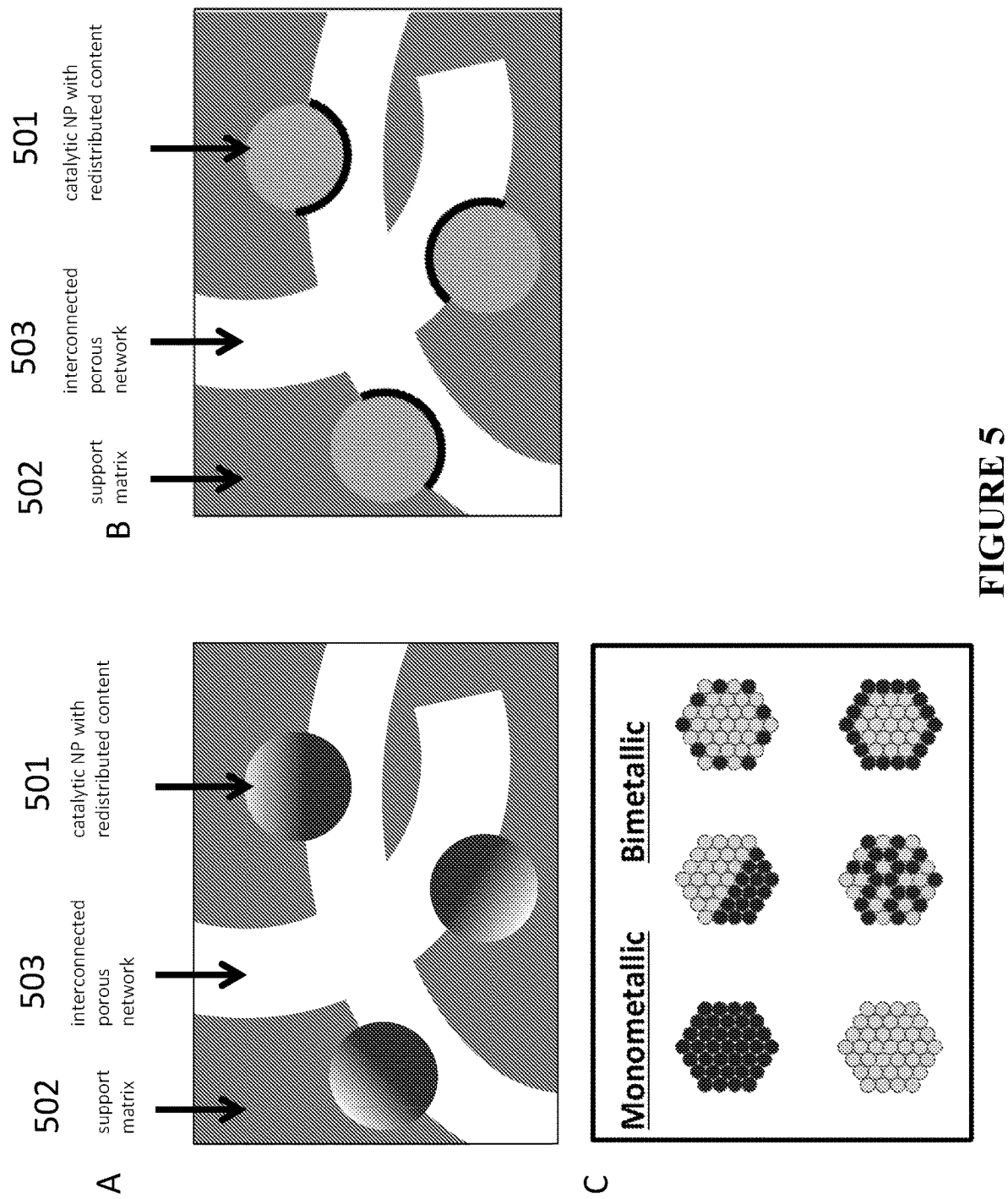
FIG. 5 is a schematic illustration showing examples of the treatment-induced rearrangement and/or redistribution of the NP content, which alters its catalytic activity, in accordance with certain embodiments. View A is a schematic illustration showing treatment-induced atomic redistribution of the NP content, in accordance with certain embodiments. View B is a schematic illustration showing treatment-induced reconstruction of the distal surface, e.g. formation of a shell or crust, in accordance with certain embodiments. View C is a schematic illustration showing examples of atomic rearrangement with NP, in accordance with certain embodiments.

In some embodiments, the final material is characterized by treatment-induced formation of crust or shell at the distal (NP-pore) interface (FIG. 5 view B). In certain embodiments, this shell consists of one type of metal different from the rest of NP composition. In certain embodiments, this shell consists of different types of metals forming mixed shell (e.g. metal alloy) different from the rest of NP composition. In certain embodiments, this crust or shell provides improved mechanical stability (e.g toward sinterring or material evaporation, chemical stability (e.g. toward poisoning), catalytic activity and selectivity.

In some embodiments, the final material is characterized by formation of different catalytically relevant phase changes within the matrix material at the proximal (NP-matrix) interface (see, e.g., FIG. 3 views AB).

Figure 9:
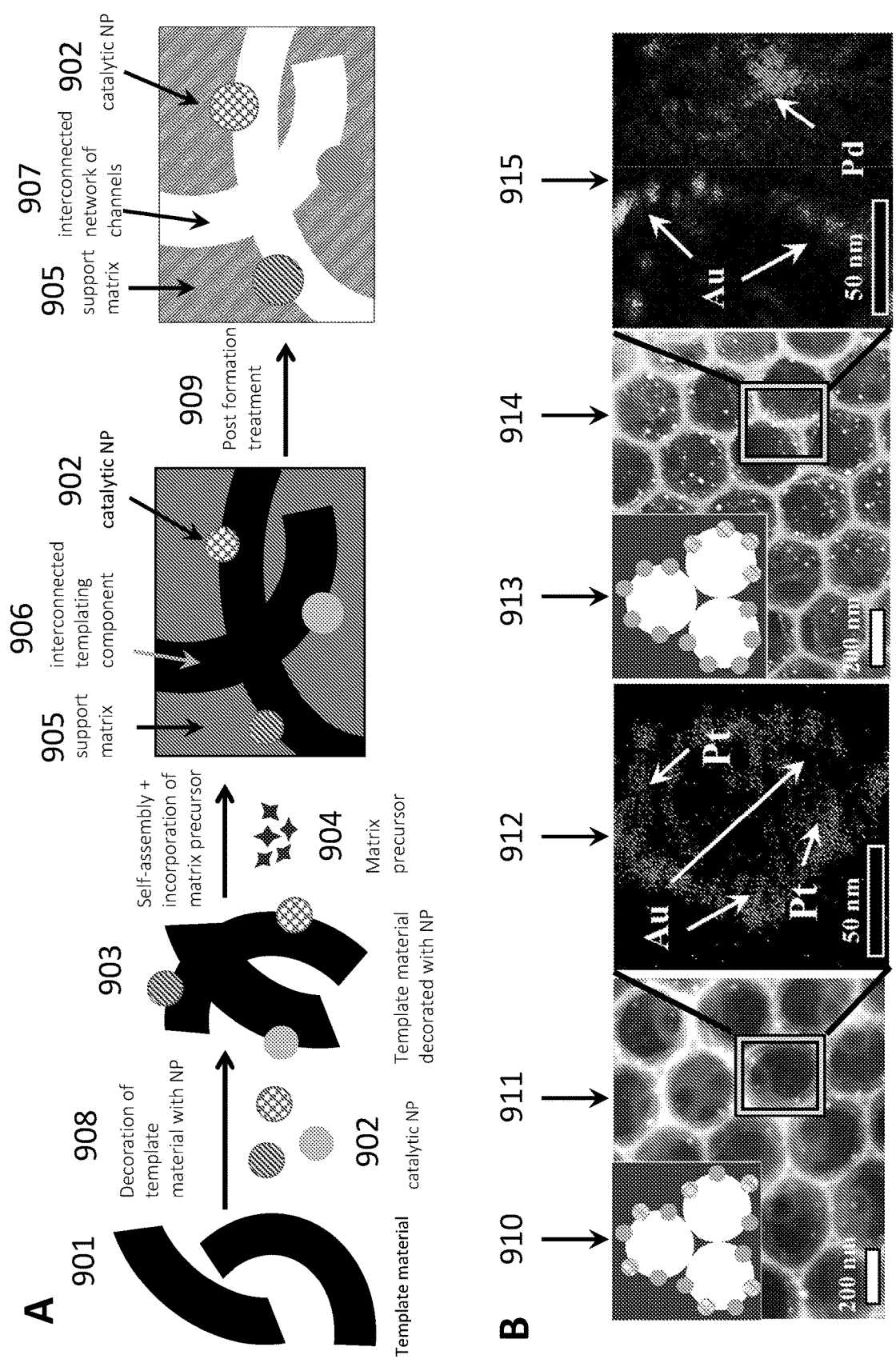
FIG. 9 is a schematic illustration and representative images of an exemplary templating approach to produce catalytic materials with different functional NPs positioned at the matrix-channel interface, in accordance with certain embodiments. View A is a schematic illustration of a generalized templating approach to produce porous materials with different functional NPs positioned at the matrix-channel interface, in accordance with certain embodiments. View B is schematic and pictorial representation of two examples of this approach, in which NP decorated colloidal particles are used as a templating material, showing two sets of figures, each set containing schematics, representative scanning electron microscopy (SEM) image, and scanning transmission electron microscopy-energy-dispersive X-ray spectroscopy (STEM-EDS) elemental composition mapping zoom-ins of the resulting catalytic materials with multiple type of pores, e.g. containing different functional NPs in different pores (left) or multiple types of NPs located in each pore (right) at the matrix-pore interface, in accordance with certain embodiments.

In certain embodiments, for example as shown in FIG. 9, different nanoparticles can be used to provide various catalytic functionality. For example, FIG. 9 view A shows a process of decorating 908 templating material 901 with different types of catalytic NP 902 (as shown in the different patterning in the figure) to create decorated templating material 903. The decorated templating material 903 is self-assembled and incorporated with matrix precursor 904 to form an interconnected support matrix material 905, interconnected templating component 906 with catalytic NP 902 embedded in the matrix material 905. A post formation treatment 909 is conducted to remove the interconnected templating component 906 yielding catalytic nanoparticles 902 embedded in support matrix 905 at an interface between the support matrix 905 and the interconnected network of channels 907 left behind by the removed interconnected templating material 906. View B shows two specific examples of this approach, in which NP decorated colloidal particles are used as a templating material. 911 is a representative scanning electron microscopy (SEM) image showing Au and Pt NPs embedded in the silica matrix material, as represented by schematic 910, according to certain embodiments. Au and Pt NPs are uniformly dispersed throughout the matrix material and included on the same pore/matrix interface as shown on 912, which is a scanning transmission electron microscopy-energy-dispersive X-ray spectroscopy (STEM-EDS) elemental composition mapping. That is, multiple species of nanoparticles are included in localized areas. 914 is a representative scanning electron microscopy (SEM) image showing Au and Pd NPs decorated on separate templating materials, as schematically represented in 913, according to certain embodiments. Because the Au and Pd NPs are included on separate templating material, they are incorporated into different pores and localized in different areas as shown in STEM-EDS image 915. This approach allows a variety of NP configurations and combinations within the porous architecture, which is particularly relevant for coupling and compartmentalizing reactions catalyzed by different metals. For example, IOs can be produced with different metal NPs in different pores or multiple metal NPs within a single pore as shown in FIG. 9A-B. NP-decorated templating particles, and ultimately pores of an IO, bearing more than one type of NP on their surface (FIG. 9B, 910-912) allow multiple reactions to be performed in sequence within a single pore. These configurations are particularly well suited for multistep reactions as different catalysts can be distributed within the matrix at predesigned concentrations and distances from one another. In certain embodiments, using a mixture of populations of NP-decorated templating particles each coated with one type of monometallic NP, yields IOs in which each individual pore contains one or the other type of NP, allowing different chemical processes to be conducted simultaneously in adjacent pores (FIG. 9B, 913-915). In certain embodiments, the geometry of the pores and the openings between them are highly regular, then the diffusion characteristics of the reactive species in this system can be predicted and used to design reaction sequences.

In some embodiments, treatment provides a porous structure wherein the matrix, metal composition(s), macroscopic patterns, and gradients in reactivity and fluidic properties are modified.

II. Methods

Figure 2:
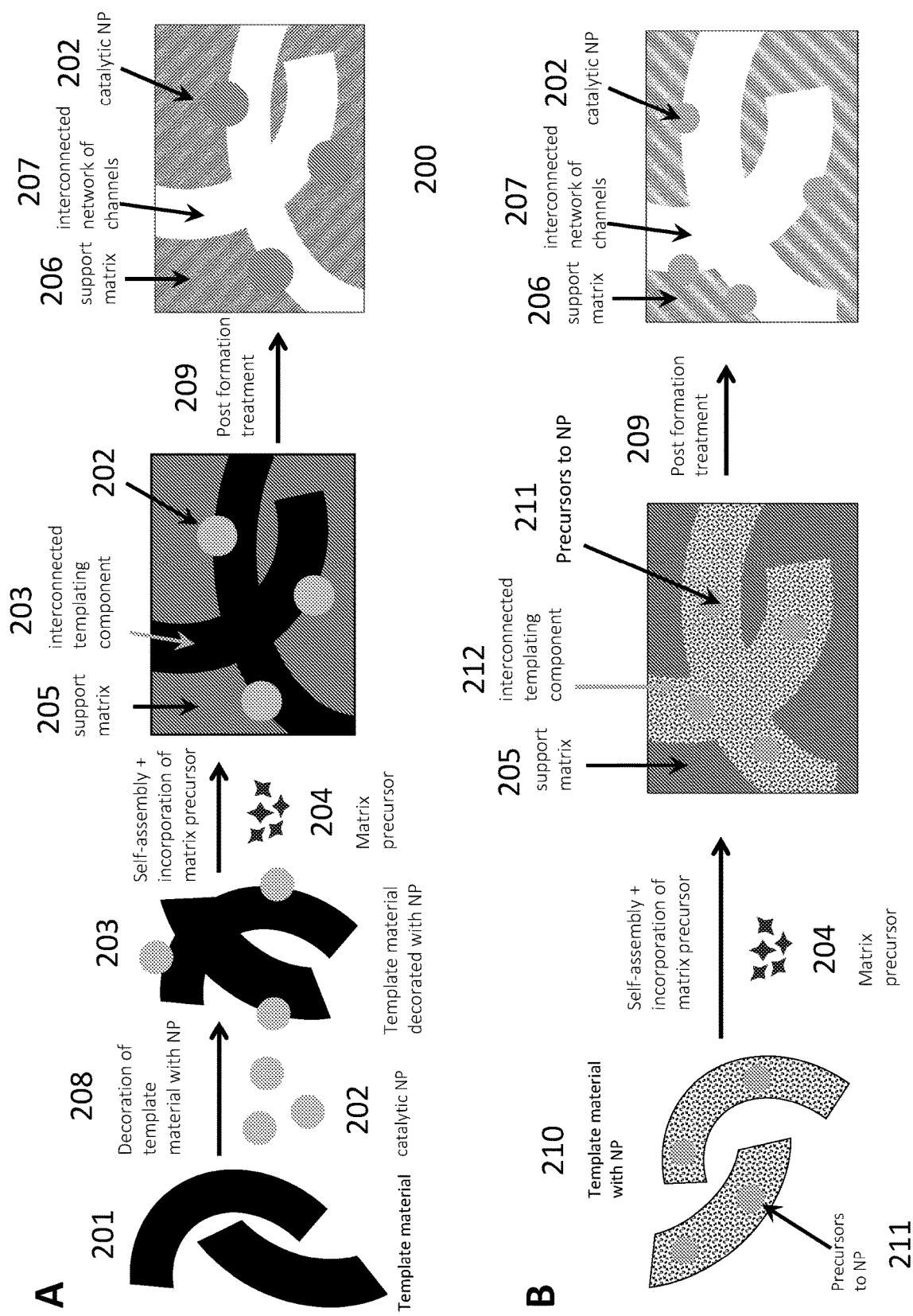
FIG. 2 is a schematic illustration showing examples of the methods for producing complex catalytic materials in accordance with certain embodiments. View A is a schematic illustration showing an example of the method for producing a complex catalytic material using templating approach featuring multiple partially embedded catalytic NPs of the same type, in accordance with certain embodiments. View B is a schematic illustration showing an example of the method for producing a complex catalytic material using templating approach featuring multiple partially embedded catalytic NPs of different types, in accordance with certain embodiments.

FIG. 2 view A shows a schematic illustration of a method for formation of a complex catalytic material featuring multiple catalytic nanoparticles (labeled "catalytic NP") 202 located predominantly at the interface between two interconnected structures (labeled "support matrix" 205 and "interconnected templating component" 203 in accordance with certain embodiments. A formation process 209 can, for example, remove the interconnected templating component 203 to form the interconnected porous network 207, according to certain embodiments. This process is similar to that described with respect to FIG. 9, above and in certain embodiments includes one or more species of nanoparticles. FIG. 2 view B shows another example of an alternative method to produce catalytic material, similar process as FIG. 2 view A, in accordance with certain embodiments. In case B, precursors 211 to future catalytic nanoparticles 202 are embedded within the template material 210 or are a part of the templating material 210, which upon treatment decomposes to form catalytic NP 202. The template material 210 is self-assembled and the matrix precursor 204 is incorporated to produce a support matrix 205 an interconnected templating component 212 having precursors to nanoparticles 211 disposed therein. During a post formation treatment 209, the interconnected templating component 212 is removed leaving catalytic nanoparticles 202 partially embedded in the support matrix 202.

As shown in FIG. 3 views A and D, in accordance with certain embodiments the templated porous structure shown in FIG. 1A can be treated to provide desirable modifications at or near the proximal interface region between the catalytic nanoparticles 303 and the "support matrix" 301, as shown as modified NP-matrix interface 304. For example, treatment induced formation of chemical bonding between NPs and matrix 304 can strengthen the thermal and mechanical robustness of the catalytic NP in accordance with certain embodiments. In some embodiments, chemical bonding can form between NPs 303 and the matrix 301. In certain embodiments, the treatment can lead to the roughening of the proximal interface and corresponding increase in the contact area between a NP and the matrix 308. In some embodiments, a high concentration of hydroxyl groups in a sol-gel matrix can promote the formation of a large number of metal-oxide (M-O) bonds with the catalytic NPs (e.g. 304). For example, Ag NPs in $SiO_2$ matrix—upon calcination Ag can undergo oxidation and form Si—O—Ag linkage. As an outcome of the increased contact area and formation of chemical bonds (of covalent and/or ionic character), a system can be obtained which is highly stable (thermally, mechanically, and chemically) towards various deactivation mechanisms (including disintegration, sintering of NPs, and poisoning) and with the NPs highly accessible towards reactants.

In some embodiments, the chemical bonding between NPs and matrix is covalent. In some embodiments, the chemical bonding between NPs and matrix is ionic.

FIG. 3 view C shows treatment-induced formation of catalytic NPs 303 having charged (e.g., ionic) species 305 and attractive charged interactions between the catalytic NP 303 and the matrix 301 in accordance with certain embodiments. Local control (at the (sub)nanoscale) over the generation of oxidized and reduced species within the catalytic NP 303 can be carried out by varying physical (temperature and its ramping) or chemical (combustion atmosphere, dissolving media) conditions of removal of the sacrificial material (such templating component, e.g., 203). In some embodiments, different charged species can form on a given NP 303 (or within the matrix close to the proximal interface with the NP 106) due to the unique asymmetric "sandwich" environment that the NP 303 is in (i.e., the NP 303 is "sandwiched" between the support matrix 301 and the templating component, e.g., templating component 203). For example, if the catalytic NPs 303 are formed of metal, cations can be generated predominantly at the matrix-NP interface due to local oxidation of the metal due to the formation of complex or mixed oxides or salts (e.g., silicates, titanates, aluminates) and the retention of a reduced metallic state can be maintained predominantly at the NP-pore interface due to the presence of reducing (organic sacrificial) species predominantly at NP-templating component interface. In addition to providing attractive Coulomb interactions resulting from the generation of charged species, certain ions can have an advantage of providing co-catalytic function. As non-limiting example, for catalysis performed with metallic gold NPs entrenched into metal oxide matrix material, thermal treatment and chemical interaction with the matrix can create $Au^{3+}$ oxometalates with the generation of ionic gold species that are known to be active in most chemical reactions catalyzed by metallic Au NPs, thus improving the overall catalytic activity of the system.

Figure 6B:
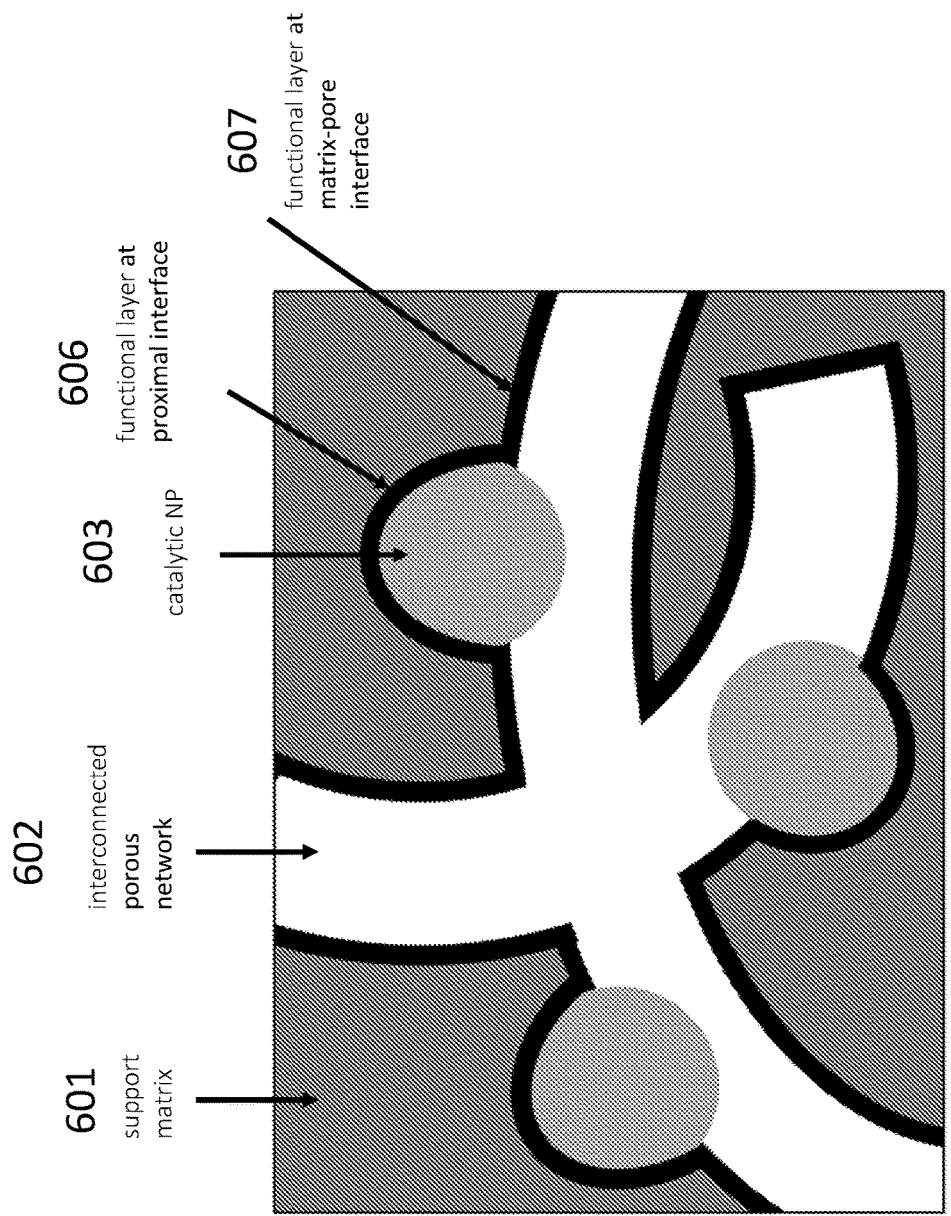
FIG. 6B is a schematic illustration showing an example of the treatment-induced deposition of additional catalytically relevant species at the matrix-channel and NP-matrix (proximal) interfaces, in accordance with certain embodiments.

FIG. 6 view A shows deposition of catalytically relevant species 604 and 605 predominantly at the matrix-pore and/or distal NP-pore interfaces in accordance with certain embodiments. In some embodiments, deposition can occur by incomplete combustion of the interconnected templating component (such templating component 203) leading to the formation of catalytically relevant species 605 predominantly at the matrix-pore and/or NP-pore interfaces. For example, the interconnected templating component (e.g., templating component 203) can be made partially or fully of such materials as organic polymers, biomaterials, and inorganic compounds (e.g., metals and metal oxides or nanoparticles). As one illustrative example, carbon can be deposited at matrix-pore and/or NP-pore interfaces to perform catalytic or co-catalytic functions. In some embodiments, the deposit can form a continuous layer or discrete islands. In some embodiments, the deposits can change the matrix's 601 and/or NP's 603 surface energy (e.g., carbon deposition makes surface hydrophobic), in addition to (co)catalytic activity. In some embodiments, atoms originating from the templating component can diffuse and form substitutional defects within the matrix 601 and/or the NP 603, thus producing additional (co)catalytic centers. In certain embodiments, the catalytically relevant species 605 can only coat the interface between the matrix 601 and the interconnected porous network 602. In certain embodiments, the catalytically relevant species 605 can only coat the interface between the pore 602 and the NP 603. Likewise, the combination of both coating modes can take place in the same catalytic material, resulting in the modified and/or enhanced catalytic activity In certain embodiments, sacrificial template material (e.g., 203) decorated with nanoparticles can further undergo coating with a second material before the assembly and matrix infiltration (e.g., 204) takes place. Such additional coating results in the formation of a continuous or non-continuous layer covering the matrix channel interfaces and the proximal NP-matrix interface, leaving the distal interface unchanged (as shown, for example, in FIG. 6B). As a non-limiting example, template material decorated with NPs can be coated with titania and then assembled and infiltrated with a sol-gel matrix precursor to form silica matrix. In such a case, the reactants will be exposed to catalytic NPs and titania, taking advantage of this bi-catalytic system, but catalytically inactive silica will provide the advantages of a non-expensive and easy-to-fabricate bulk substrate.

FIG. 5 shows treatment-induced redistribution of the NP content 503 that alters its catalytic activity in accordance with certain embodiments. In some embodiments, the materials interfaced with the different sides of a NP can induce redistribution of its content. For example, bi- or multimetallic particles can undergo different restructuring processes such as homogeneous atomic mixing (e.g., alloy formation) and/or preferential relocation of a certain type of metal to the NP's surface. Examples of atomic redistributions are shown on FIG. 5 view C. The degree of mixing or phase segregation can depend on the chemical potential of the surrounding environment, i.e., the matrix 501 and/or the interconnected templating component. Additionally, a partial chemical change can affect one or more of the bi- or multimetallic components of the NPs leading to the formation at the distal NP-pore interface of a "crust" made of, e.g., a metal oxide or oxides. In some embodiments, a change in composition of the NP can occur. For example, in bimetallic AuAg NP, Ag atoms can diffuse to the surface of NP and become atomically distributed inside Au. This behaviour dramatically increases the activity of gold in catalytic selective oxidation reactions.

Figure 11:
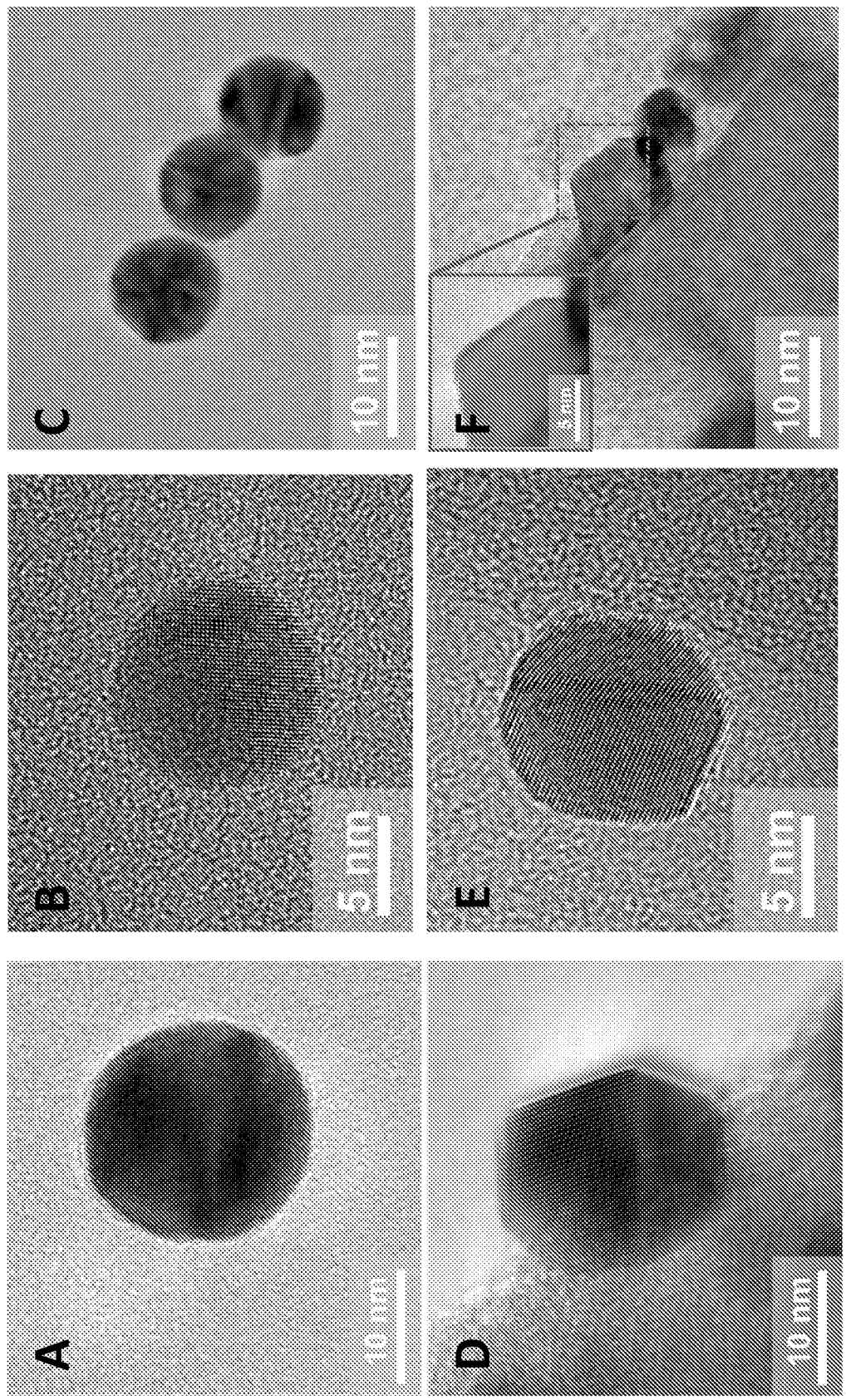
FIG. 11 shows TEM images of free-standing, as prepared NPs (views A-C) and the same NPs incorporated into the porous structures and experiencing shape changes (e.g. faceting) at the distal portion (views D-F), in accordance with certain embodiments.

FIG. 4 and FIG. 11 show schematic and experimentally observed treatment-induced modifications of the NP's 401 shape and/or morphology in accordance with certain embodiments. In some embodiments, the asymmetric chemical environment can generate changes in the NP's 401 surface morphology, for example by roughening 404 the surface, as shown in FIG. 4 view A. For example, adsorbate-induced surface reconstructions (wherein the adsorbate species can originate from the templating component during the treatment process) in combination with interfacial strains between the NP's 401 and matrix's 402 lattices can cause intraparticle mass transfer leading to such alterations in surface topography as the appearances of roughening 404 (FIG. 4 view A) and new 405 facets (as shown in FIG. 4 view B). An example of such transition is shown on FIG. 11. The effect of asymmetric chemical environment can be clearly seen on FIG. 11 views D, E and F, in which NPs remain spherical at proximal interfaces and develop well defined facets at distal interfaces, when compared to as synthesized nanoparticles shown in views A, B, and C respectively. In certain embodiments, the faceting creates catalytically more active edges that improve catalytic performance.

FIGS. 3A and 3B show treatment-induced alterations of the matrix material 301 in accordance with certain embodiments. In some embodiments, NPs 303 can induce phase changes in the support matrix 301. For example, the NP 303 can cause changes in the crystallization of the matrix 307, or cause other phase transitions in the proximal interface 306.

Accordingly, the present disclosure provides embodiments for complex catalytic materials comprising partially embedded NPs predominantly at the interface of a supporting matrix and an interconnected porous network with enhanced properties resulting from treatment-induced formation of functionally (e.g., catalytic or co-catalytic) relevant chemical and structural/morphological species or features at the NP-matrix, NP-pore, and matrix-pore interfaces. The present disclosure also provides for methods of forming said complex catalytic materials. Such methods allow for the decoupling of requirements of the assembly process of the catalytic material (prior to treatment) from the final composition and geometrical features of the treated catalytic material.

Figure 12:
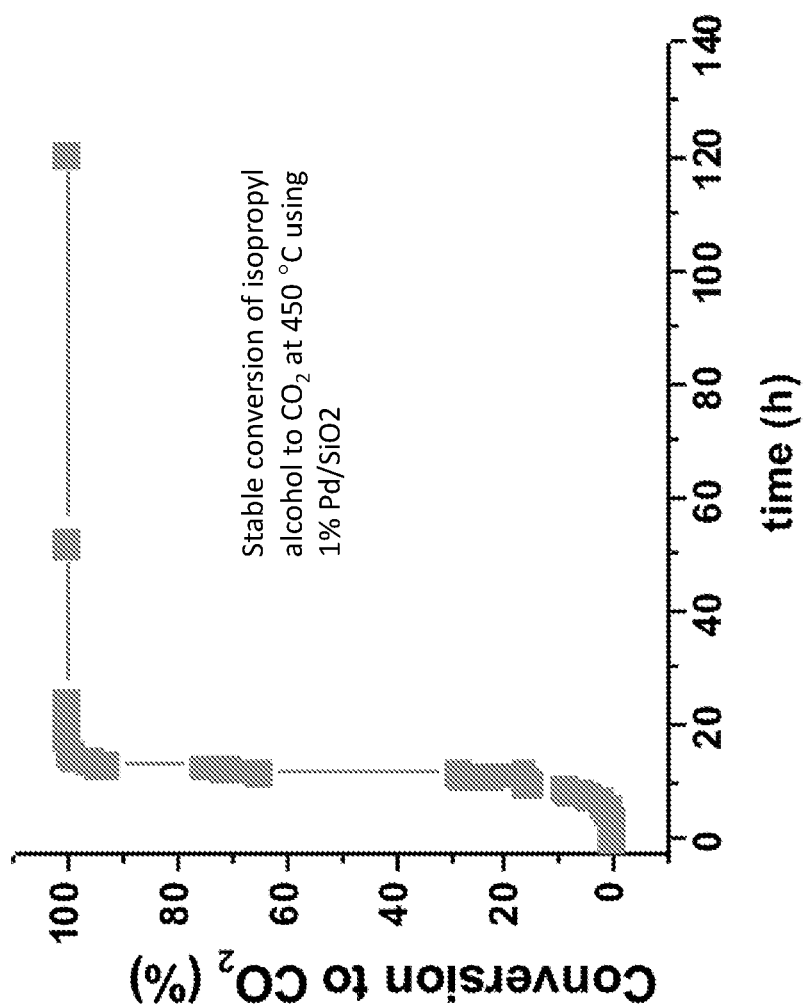
FIG. 12 is a graph showing long-term stability of a 1% Pd/SiO$_2$ catalyst prepared using colloidal templating approach depicted on FIG. 7 (view B, bottom row) in conversion of isopropanol to carbon dioxide under continuous flow of reactants at high temperature, in accordance with certain embodiments. Experiments to produce the results were performed under reaction conditions: 3 mol % isopropanol and 22 mol % O$_2$ in He at flow rate 50 ml/min at 450 C.

In certain embodiments, and as at least partially discussed above, enhanced catalytic properties result from unique arrangement of three interfaces in which NPs are sandwiched between matrix and template. The resulting porous catalytic materials are characterized by a number of advantageous properties and catalytic performance. Non-limiting examples of enhanced catalytic properties include one or a combination of the following:

1. Stability. Partial embodiment of NP into matrix results in their improved mechanical stability and chemical stability toward sintering. This stabilization results in improved longevity of the catalysts, stable activity and selectivity in long-term operation, as shown in practical examples in FIGS. 8, 10, 12, 13.
2. Thermal stability under reaction condition. Diffusion and deactivation of the catalysts at high temperatures is a serious problem that is overcome by the catalyst design disclosed herein. See for example FIG. 12 showing stable conversion of isopropyl alcohol to $CO_2$ at 450° C. using 1% $Pd/SiO_2$.
3. Efficient use of PGM. Controlled/predesigned/rational placement of NP at the matrix/pore interface result in materials with uniform distribution and accessibility of NPs, as demonstrated in exemplary systems shown in FIGS. 7, 9B, 10, 24B, 27. This in turn will optimize the utilization of precious metals toward more cost-efficient catalyst. Homogeneous distribution of NP is a very important requirement for the uniform heat distribution and resulting uniform catalytic performance, and is hard to achieve. Exemplary systems shown in FIGS. 17, 18, 19, 20 demonstrate that our approach results in the formation of catalysts with reduced amount of PGMs without compromising, and in certain embodiments even improving, their performance.

4. Improved diffusion of reactants and products. The presented approach produces porous materials with control over pore geometry, size, shape, interconnectivity and arrangement, as shown in certain embodiments and demonstrated in FIGS. 29, 30. In certain embodiments, the control over these parameters is highly important for catalytic performance as it affects the mass diffusion of reactants, thermal, and photonic properties in catalytic and photocatalytic systems. For example, bimetallic AuAg NP supported on colloid templated porous silica with fully interconnected network of pores demonstrated an absence of mass transport limitations in selective oxidation of methanol to methyl formate under applied reaction conditions. The catalytic performance of this sample is demonstrated on FIG. 13. In certain embodiments, the rational design of porous material can lead to the creation of well-defined porous networks with highly regular pathways for diffusion (for e.g. modeling and rational design of catalyst) or to the increase of tortuosity for higher residence times of reactants within the catalytic material. In addition, in certain embodiments, the pore arrangement/structure gives a catalyst specific mechanical properties. For example, materials with randomly distributed pores can have greater mechanical stability compared to brittle crystalline arrangements, where lattice planes lend themselves to facile cleavage.

5. Lower light-off temperature. In certain embodiments the formation of complex catalytic materials with multiple catalytic species described above can increase catalytic activity resulting in lower light-off temperatures. FIGS. 14-20 show non-limiting examples of such unprecedented reduction in reaction temperature, where the catalyst performance achieved using the catalysts disclosed herein is compared to those of the corresponding commercially available catalysts.

6. Increase in catalyst activity. Enhanced catalytic properties result from unique arrangement of three interfaces in which NPs are sandwiched between matrix and template. As demonstrated in exemplary systems shown in FIGS. 21-24, only the catalyst prepared with NP positioned between the matrix and templated material and then undergoing the thermal removal of the sacrificial substrate created an enhanced catalyst arrangement that demonstrated both high selectivity and activity.

Figure 27:
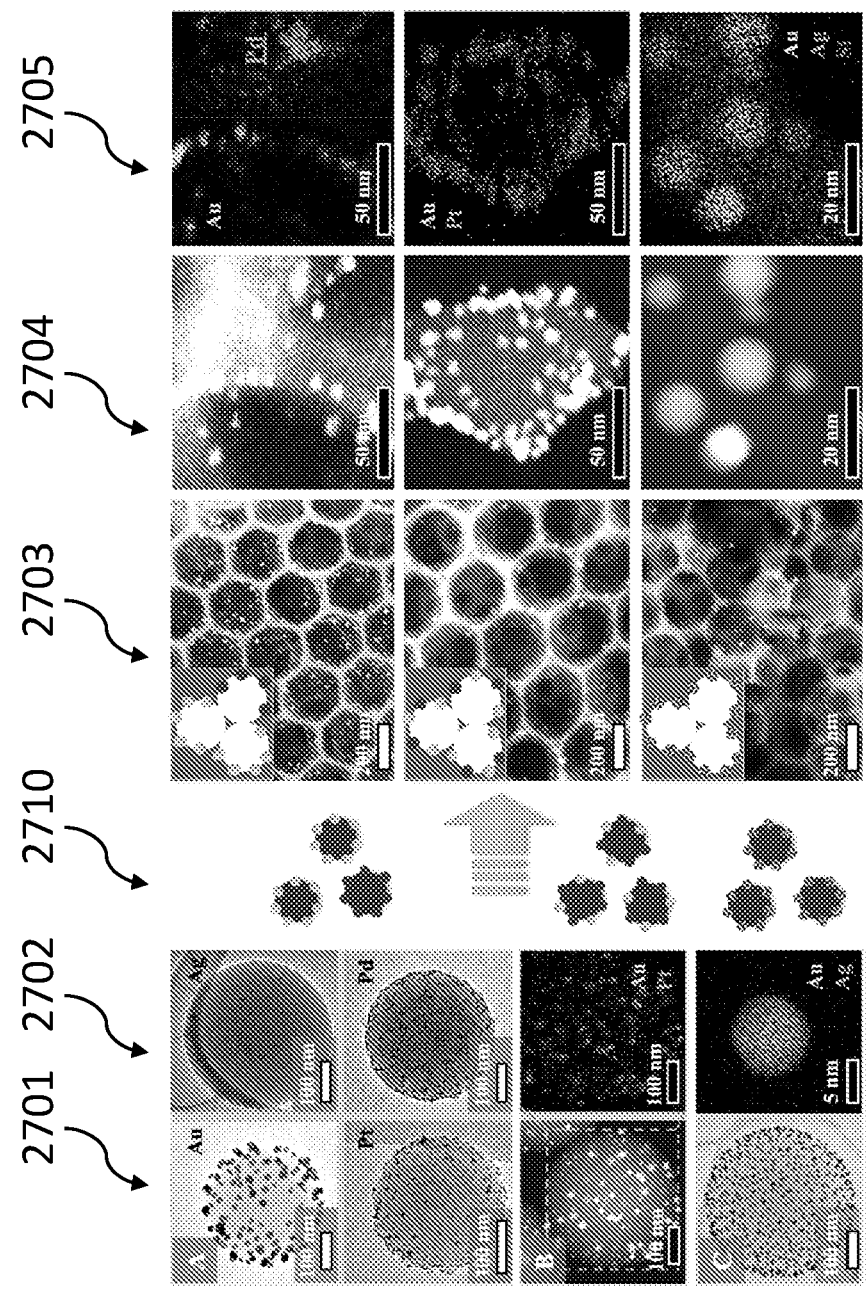
FIG. 27 is SEM, TEM and elemental composition mapping images and schematic illustrations of interconnected porous catalytic microstructures using different types of decorated colloids as templates, in accordance with certain embodiments.

7. Multifunctional catalyst. In certain embodiments, the templating approach combined with control over NP placement allows a variety of NP configurations and combinations within the porous architecture, which is particularly relevant for coupling and compartmentalizing reactions catalyzed by different metals (FIGS. 9 and 27). In certain embodiments, the rational catalyst design allows to place different NP in different compartments, or place different NPs in all compartments, as exemplified in FIGS. 9 and 27.

In certain embodiments, the above mentioned benefits can be achieved in combination by combining various features. By means of non-limiting example, multifunctional catalysts can be combined with approaches to increase stability or to control pore geometry and tortuosity of the network of channels.

FIG. 12 shows long-term stability of a 1% Pd/SiO$_2$ catalyst in conversion of isopropanol to carbon dioxide under continuous flow of reactants at high temperature (450° C.), in accordance with certain embodiments. Catalytic activity was measured using a conventional fixed-bed reactor. The samples were loaded into the quartz reactor tube and pretreated by heating at 150° C. for 30 min under 25 ml/min He flow to remove any water and air, then cooled to ~30° C. The reactor temperature was ramped back to 450° C. at 10 deg/min rate in a 50 ml/min flow of 22 mol % O$_2$ and 3 mol % of isopropyl alcohol in He, then held at 450° C. for 120 h. The conversion of isopropyl alcohol to CO$_2$ was detected with GC-MS. Consistent with this stable catalytic performance, there were no morphological (e.g size and distribution of NP) or compositional changes detected by SEM, TEM and ICP-MS after catalysis.

Figure 13:
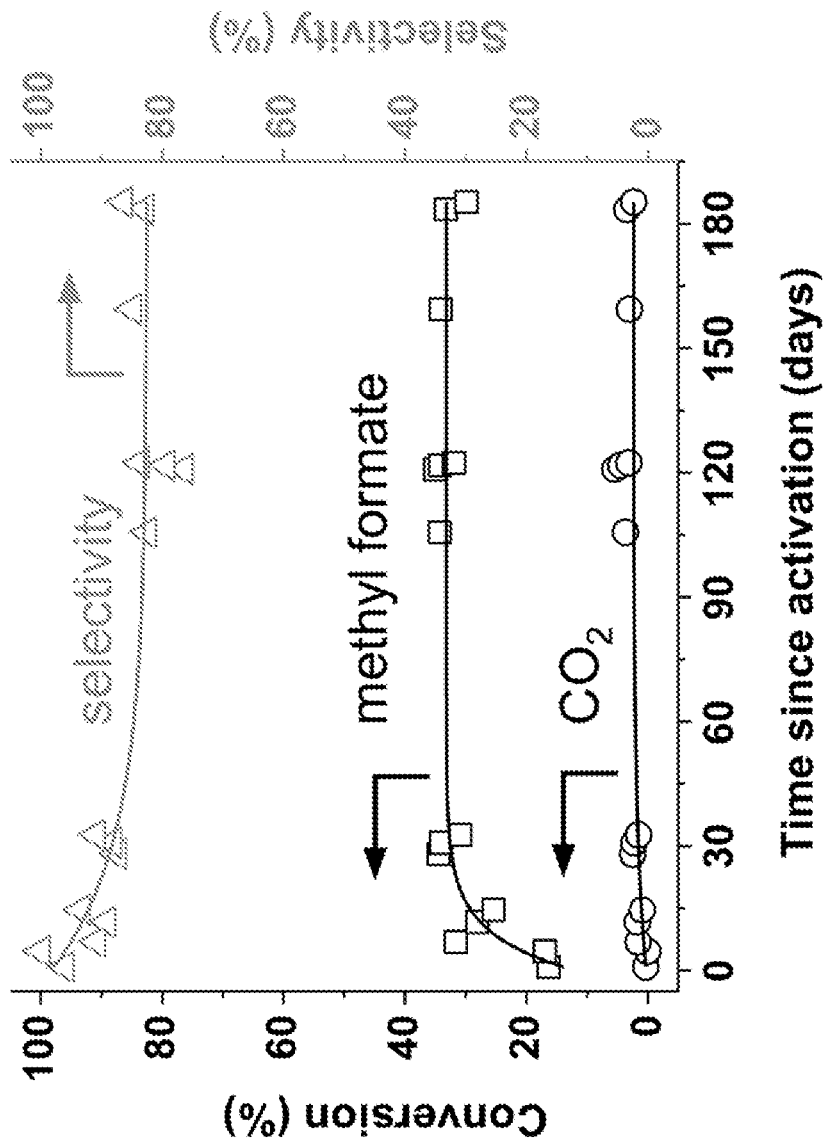
FIG. 13 is a graph showing long-term stability in steady-state conversion of methanol to methyl formate (MF, squares) and carbon dioxide (CO$_2$, circles) and selectivity to methyl formate (triangles) using colloid-templated SiO$_2$—AgAu. Experiments to produce the results were performed under reaction conditions: 6 mol % methanol and 20 mol % O$_2$ in He at flow rate 50 ml/min at 150 C.

FIG. 13 shows long-term stability in steady-state conversion of methanol to methyl formate (MF, squares) and carbon dioxide (CO$_2$, circles) and selectivity to methyl formate (triangles) using colloid-templated SiO$_2$—AgAu. The sample was tested for ~½ year and didn't show degradation in its performance. Catalytic activity was measured using a conventional fixed-bed reactor. The samples were loaded into the quartz reactor tube and pretreated by heating at 150° C. for 30 min under 25 ml/min He flow to remove any water and air, then cooled to ~30° C. The reactor temperature was ramped back to 150° C. at 10 deg/min in a 50 ml/min flow of 22 mol % O$_2$ and 6 mol % methanol in He, then held at 150° C. until the reaction reached steady-state conversion. Catalyst sample was kept in reaction conditions for at least 24 h. The long-term stability was demonstrated by assessing its activity by repeated measurements over a period of 6 months. Although the sample was occasionally removed from the reactor and exposed to ambient conditions, after reintroduction into the reactor, same selectivity and activity was recovered under reaction conditions. The conversion of isopropyl alcohol to CO$_2$ was detected with GC-MS. Consistent with this stable catalytic performance, there were no morphological (e.g size and distribution of NP) or compositional changes detected by SEM, TEM and ICP-MS after catalysis.

Reduction in light-off temperature of a catalytic reaction results in corresponding energy savings. The catalysts described herein are non-limiting examples of the systems providing significant reductions in light-off temperatures. For different chemical reactions and different catalysts such reduction can have different magnitude. The reduction in light-off temperatures for enhanced catalytic materials disclosed herein can reach 1-2° C., 2-5° C., 5-10° C., 10-20° C., 20-40° C., 40-60° C., 60-80° C., 80-100° C., and more than 100° C., according to certain embodiments. As non-limiting examples, the catalytic materials disclosed herein, whose performance is shown in exemplary FIGS. 14-20, demonstrate reduction in light-off temperature of oxidation reactions, especially important in emission control and air purification, for use in catalytic converters, air purifiers, and catalytic paints. The achieved non-limiting reduction in light-off temperature in certain embodiments allows one to operate the air purification devices at lower temperatures, down to room temperature.

Figure 14:
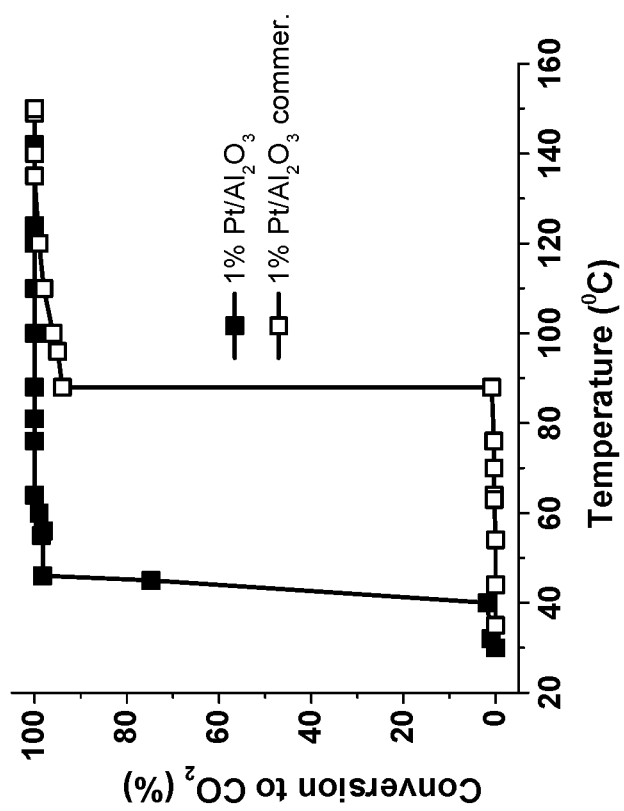
FIG. 14 is a graph comparing a complete combustion of methanol to CO$_2$ using commercial 1 w % Pt/Al$_2$O$_3$ catalyst and the enhanced catalyst with the same loading of NP—1 w % Pt, prepared in accordance with certain embodiments, showing ~55° C. reduction in the reaction temperature. Experiments to produce the results were performed under reaction conditions: 7.5 mol % methanol and 22 mol % O$_2$ in He at flow rate 50 ml/min.

FIG. 14 compares a complete combustion of methanol to CO$_2$ using commercial Pt/Al$_2$O$_3$ catalyst and the enhanced catalyst with the same loading of platinum NP—1 w % Pt, prepared in accordance with certain embodiments, showing ~55° C. reduction in the reaction temperature. Catalytic activity was measured using a conventional fixed-bed reactor. The samples were loaded into the quartz reactor tube and pretreated by heating at 150° C. for 30 min under 25 ml/min He flow to remove any water and air, then cooled to ~25° C.

The reactor temperature was ramped back to 150 C at 10° C./min rate in a 50 ml/min flow of 22 mol % O2 and 7.5 mol % methanol in He. After each increment by 10° C., the reaction conditions were held constant for one hour to allow the catalyst to reach stable conversion. The conversion of methanol to $CO_2$ as function of temperature was detected with GC-MS. Consistent with this stable catalytic performance, there were no morphological (e.g size and distribution of NPs) or compositional changes detected by SEM, TEM and ICP-MS after catalysis. The decrease in light-off temperature, that is the temperature, at which the conversion sharply increases, is substantial and it demonstrates that the complete conversion of methanol to carbon dioxide can be achieved at much lower temperatures than one would normally expect for such a process, making room temperature operation feasible. Such performance opens a whole range of possible applications in low-temperature air purification, and emission control, which are impossible with the commercial catalysts that reach comparable activity at substantially higher temperature. A non-limiting description of such applications is presented Section III and in FIGS. 36, 37.

Figure 15:
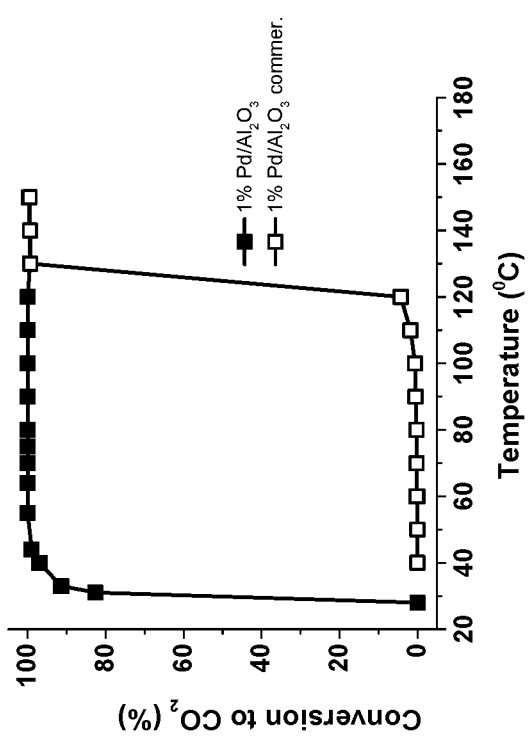
FIG. 15 is a graph comparing a complete combustion of methanol to CO$_2$ using commercial Pd/Al$_2$O$_3$ catalyst and the enhanced catalyst with the same loading of NP—1 w % Pd, prepared in accordance with certain embodiments, showing ~90° C. reduction in the reaction temperature and ability to perform it at room temperature. Experiments to produce the results were performed under reaction conditions: 7.5 mol % methanol and 22 mol % O$_2$ in He at flow rate 50 ml/min.

FIG. 15 compares a complete combustion of methanol to $CO_2$ using commercial $Pd/Al_2O_3$ catalyst and the enhanced catalyst with the same loading of NP—1 w % Pd, prepared in accordance with certain embodiments, showing ~90° C. reduction in the reaction temperature and ability to perform it at room temperature. Catalytic activity was measured using a conventional fixed-bed reactor. The samples were loaded into the quartz reactor tube and pretreated by heating at 150° C. for 30 min under 25 ml/min He flow to remove any water and air, then cooled to ~25° C. The reactor temperature was ramped back to 150 C at 10° C./min rate in a 50 ml/min flow of 22 mol % O2 and 7.5 mol % methanol in He. After each increment by 10° C., the reaction conditions were held constant for one hour to allow the catalyst to reach stable conversion. The conversion of methanol to $CO_2$ as function of temperature was detected with GC-MS. Consistent with this stable catalytic performance, there were no morphological (e.g size and distribution of NPs) or compositional changes detected by SEM, TEM and ICP-MS after catalysis. As follows from the comparison of FIG. 14 and FIG. 15, the decrease in light-off temperature demonstrated for 1 w % $Pd/Al_2O_3$ catalyst in FIG. 15 is even bigger than the one shown for 1 w % $Pt/Al_2O_3$, and the absolute value of the light-off temperature achievable by utilizing $Pd/Al_2O_3$ catalyst prepared in accordance with some of embodiments closely approaches room temperature. This clearly demonstrates a qualitative, rather than incremental, improvement in catalytic performance when catalysts are prepared according to some of the embodiments disclosed herein.

Figure 16:
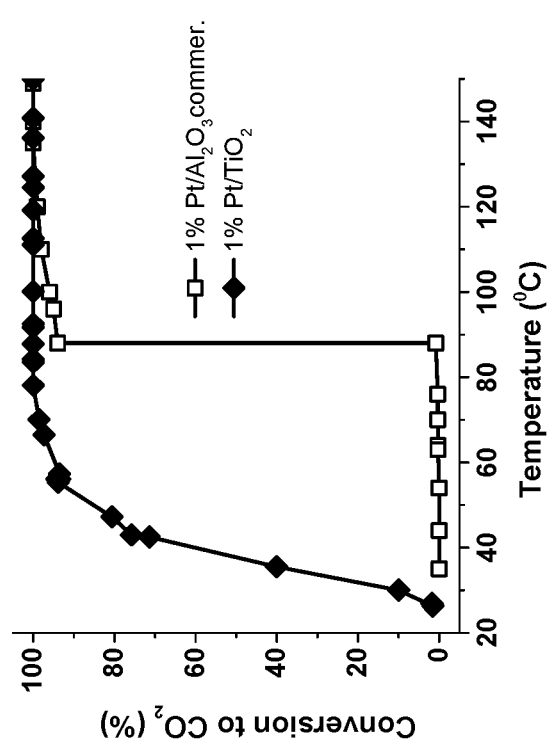
FIG. 16 compares a complete combustion of methanol to CO$_2$ using commercial Pt/Al$_2$O$_3$ catalyst and the enhanced catalyst Pt/TiO$_2$ with the same loading of NP—1 w % Pt, prepared in accordance with certain embodiments, showing ~55° C. reduction in the reaction temperature. Experiments to produce the results were performed under reaction conditions: 7.5 mol % methanol and 22 mol % O$_2$ in He at flow rate 50 ml/min.

FIG. 16 compares a complete combustion of methanol to $CO_2$ using commercial $Pt/Al_2O_3$ catalyst and the enhanced catalyst $Pt/TiO_2$ with the same loading of NP—1 w % Pt, prepared in accordance with certain embodiments, showing ~55° C. reduction in the reaction temperature. Catalytic activity was measured using a conventional fixed-bed reactor. The samples were loaded into the quartz reactor tube and pretreated by heating at 150° C. for 30 min under 25 ml/min He flow to remove any water and air, then cooled to ~25° C. The reactor temperature was ramped back to 150 C at 10° C./min rate in a 50 ml/min flow of 22 mol % O2 and 7.5 mol % methanol in He. After each increment by 10° C., the reaction conditions were held constant for one hour to allow the catalyst to reach stable conversion. The conversion of methanol to $CO_2$ as function of temperature was detected with GC-MS. Consistent with this stable catalytic performance, there were no morphological (e.g size and distribution of NPs) or compositional changes detected by SEM, TEM and ICP-MS after catalysis. The improved catalytic performance demonstrated in this and above examples additionally demonstrates high modularity of the catalyst material preparation methodology disclosed in the embodiments presented herein, which provides significant degrees of freedom and allows one to achieve enhanced catalytic performance, compared to that of conventional catalysts.

Reduction in precious metal loading of a catalyst results in substantial cost savings. Moreover, precious metals are a limited resource, which makes not only high cost, but also availability a serious consideration. The catalysts described herein are non-limiting examples of the systems providing comparable or better performance, including lower light-off temperature at significantly reduced precious metal loadings. The reduction in precious metal loadings for enhanced catalytic materials disclosed herein can reach 1-2%, 2-5%, 5-10%, 10-20%, 20-40%, 40-60%, 60-80%, 80-90%, 90-99%, 99-99.9%, according to certain embodiments. As non-limiting examples, the catalytic materials disclosed herein, whose performance is shown in exemplary FIGS. 17-20, demonstrate reduction in catalyst loading in oxidation reactions up to 95% when compared to conventional commercially available catalysts comprising the same matrix material and the same precious metal.

Figure 17:
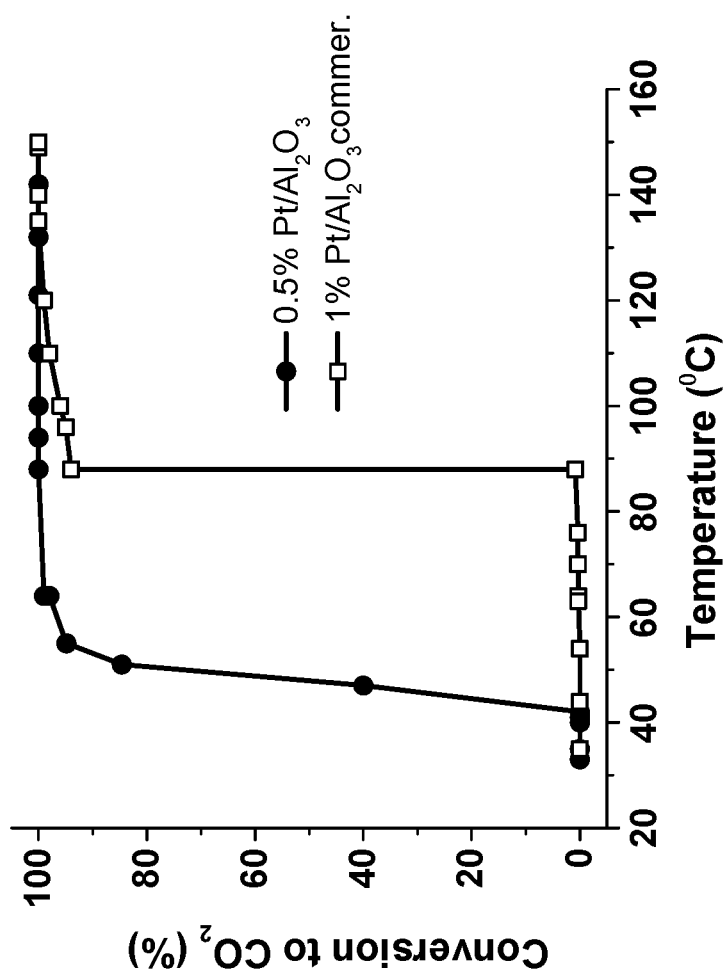
FIG. 17 is a graph comparing a complete combustion of methanol to CO$_2$ using commercial 1 w % Pt/Al$_2$O$_3$ catalyst and the enhanced catalyst with reduced amount of Pt—0.5% Pt/Al$_2$O$_3$, prepared in accordance with certain embodiments, showing ~50° C. reduction in the reaction temperature even at a half the NP loading. Experiments to produce the results were performed under reaction conditions: 7.5 mol % methanol and 22 mol % O$_2$ in He at flow rate 50 ml/min.

FIG. 17 compares a complete combustion of methanol to $CO_2$ using commercial 1 w % $Pt/Al_2O_3$ catalyst and the enhanced catalyst with reduced amount of Pt—0.5% $Pt/Al_2O_3$, prepared in accordance with certain embodiments, showing ~50° C. reduction in the reaction temperature even at a half the NP loading. Catalytic activity was measured using a conventional fixed-bed reactor. The samples were loaded into the quartz reactor tube and pretreated by heating at 150° C. for 30 min under 25 ml/min He flow to remove any water and air, then cooled to ~25° C. The reactor temperature was ramped back to 150 C at 10° C./min rate in a 50 ml/min flow of 22 mol % $O_2$ and 7.5 mol % methanol in He. After each increment by 10° C., the reaction conditions were held constant for one hour to allow the catalyst to reach stable conversion. The conversion of methanol to $CO_2$ as function of temperature was detected with GC-MS. Consistent with this stable catalytic performance, there were no morphological (e.g size and distribution of NPs) or compositional changes detected by SEM, TEM and ICP-MS after catalysis.

Figure 18:
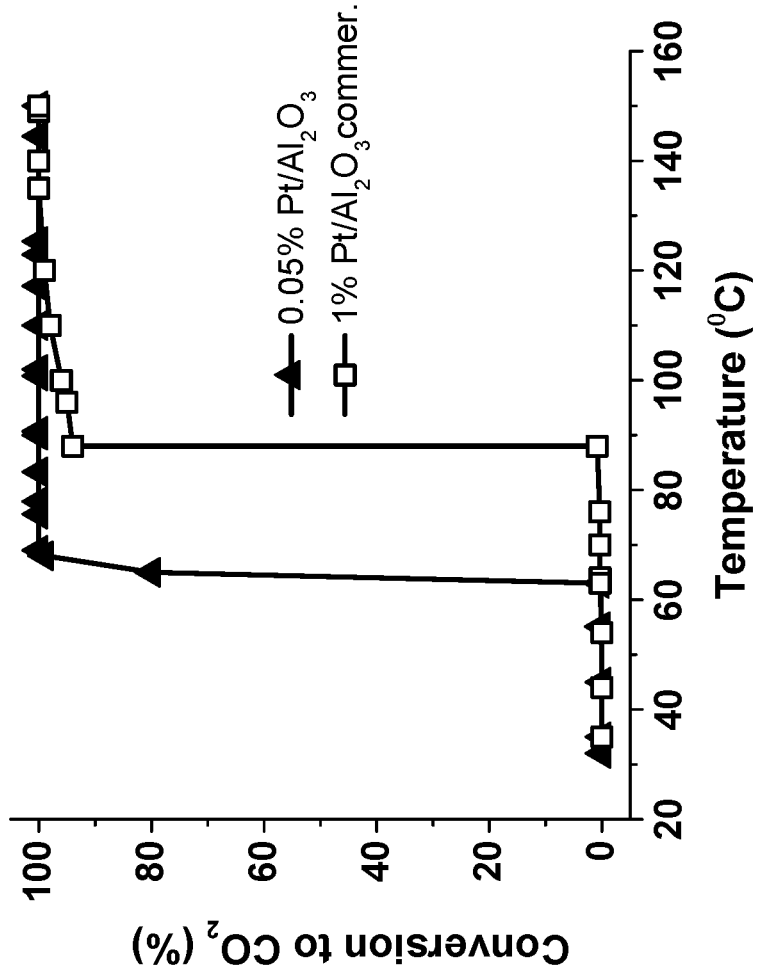
FIG. 18 is a graph comparing a complete combustion of methanol to CO$_2$ using commercial 1 w % Pt/Al$_2$O$_3$ catalyst and the enhanced catalyst with reduced amount of Pt—0.05% Pt/Al$_2$O$_3$, prepared in accordance with certain embodiments, showing ~25° C. reduction in the reaction temperature at a NP loading reduced by 95%. Experiments to produce the results were performed under reaction conditions: 7.5 mol % methanol and 22 mol % O$_2$ in He at flow rate 50 ml/min.

FIG. 18 compares a complete combustion of methanol to $CO_2$ using commercial 1 w % $Pt/Al_2O_3$ catalyst and the enhanced catalyst with reduced amount of Pt—0.05% $Pt/Al_2O_3$, prepared in accordance with certain embodiments, showing ~25° C. reduction in the reaction temperature at a NP loading reduced by 95%. Catalytic activity was measured using a conventional fixed-bed reactor. The samples were loaded into the quartz reactor tube and pretreated by heating at 150° C. for 30 min under 25 ml/min He flow to remove any water and air, then cooled to ~25° C. The reactor temperature was ramped back to 150° C. at 10° C./min rate in a 50 ml/min flow of 22 mol % $O_2$ and 7.5 mol % methanol in He. After each increment by 10° C., the reaction conditions were held constant for one hour to allow the catalyst to reach stable conversion. The conversion of methanol to $CO_2$ as function of temperature was detected with GC-MS. Consistent with this stable catalytic performance, there were no morphological (e.g size and distribution of NPs) or compositional changes detected by SEM, TEM and ICP-MS after catalysis.

Figure 19:
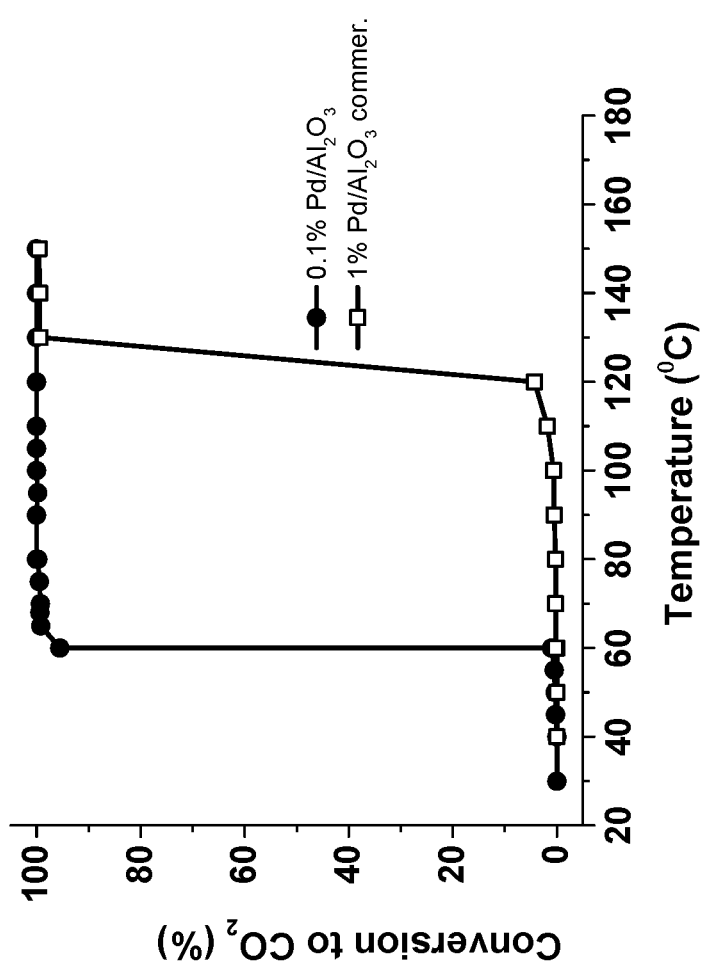
FIG. 19 is a graph comparing a complete combustion of methanol to CO$_2$ using commercial 1 w % Pd/Al$_2$O$_3$ catalyst and the enhanced catalyst with reduced amount of Pd—0.1% Pd/Al$_2$O$_3$, prepared in accordance with certain embodiments, showing ~60° C. reduction in the reaction temperature at a NP loading reduced by 90%. Experiments to produce the results were performed under reaction conditions: 7.5 mol % methanol and 22 mol % O$_2$ in He at flow rate 50 ml/min.

FIG. 19 compares a complete combustion of methanol to $CO_2$ using commercial 1 w % $Pd/Al_2O_3$ catalyst and the enhanced catalyst with reduced amount of Pd—0.1% Ptd/$Al_2O_3$, prepared in accordance with certain embodiments, showing ~60° C. reduction in the reaction temperature at a NP loading reduced by 90%. Catalytic activity was measured using a conventional fixed-bed reactor. The samples were loaded into the quartz reactor tube and pretreated by heating at 150° C. for 30 min under 25 ml/min He flow to remove any water and air, then cooled to ~25° C. The reactor temperature was ramped back to 150 C at 10° C./min rate in a 50 ml/min flow of 22 mol % $O_2$ and 7.5 mol % methanol in He. After each increment by 10° C., the reaction conditions were held constant for one hour to allow the catalyst to reach stable conversion. The conversion of methanol to $CO_2$ as function of temperature was detected with GC-MS. Consistent with this stable catalytic performance, there were no morphological (e.g size and distribution of NPs) or compositional changes detected by SEM, TEM and ICP-MS after catalysis.

Figure 20:
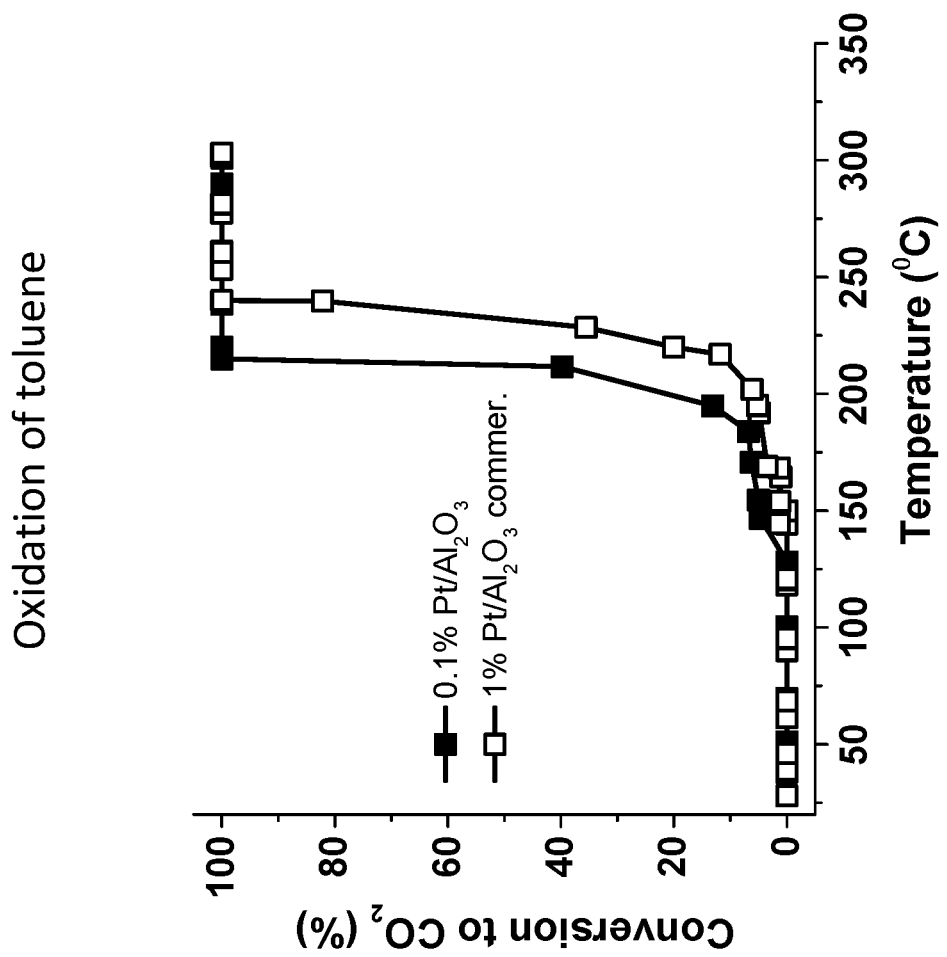
FIG. 20 is a graph comparing a complete combustion of toluene to CO$_2$ using commercial 1 w % Pt/Al$_2$O$_3$ catalyst and the enhanced catalyst with reduced amount of Pt—0.1 W % Pt/Al$_2$O$_3$, prepared in accordance with certain embodiments, showing ~30° C. reduction in the reaction temperature at a NP loading reduced by 90%. Experiments to produce the results were performed under reaction conditions: 0.35 mol % toluene and 22 mol % O$_2$ in He at flow rate 50 ml/min.

FIG. 20 compares a complete combustion of toluene to $CO_2$ using commercial 1 w % $Pt/Al_2O_3$ catalyst and the enhanced catalyst with reduced amount of Pt—0.1 W % $Pt/Al_2O_3$, prepared in accordance with certain embodiments, showing ~40° C. reduction in the reaction temperature at a NP loading reduced by 90%. Catalytic activity was measured using a conventional fixed-bed reactor. The samples were loaded into the quartz reactor tube and pretreated by heating at 150° C. for 30 min under 25 ml/min He flow to remove any water and air, then cooled to ~25° C. The reactor temperature was ramped back to 325° C. at 10° C./min rate in a 50 ml/min flow of 22 mol % $O_2$ and 0.35 mol % toluene in He. After each increment by 10° C., the reaction conditions were held constant for one hour to allow the catalyst to reach stable conversion. The conversion of methanol to $CO_2$ as function of temperature was detected with GC-MS. Consistent with this stable catalytic performance, there were no morphological (e.g size and distribution of NPs) or compositional changes detected by SEM, TEM and ICP-MS after catalysis.

Figure 21:
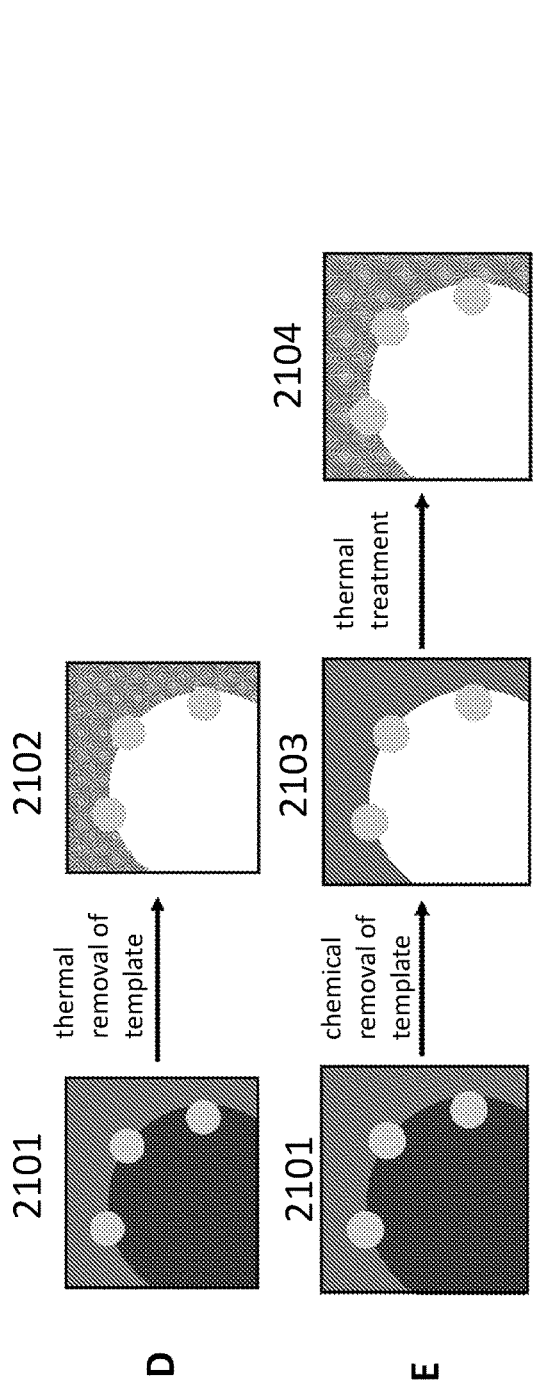
FIG. 21 is schematics and graphs comparing the catalytic performance of the colloid-templated porous silica with bimetallic AuAg nanoparticles, when the templated colloids are removed by thermal treatment (view D) vs. chemical dissolution (view E), in accordance with certain embodiments. View A depicts conversion of methanol to methyl formate (MF, squares) and carbon dioxide (CO$_2$, circles) and selectivity for methyl formate (diamonds) using thermally removed templating colloids, in accordance with certain embodiments; View B corresponds to the sample prepared using chemical dissolution of the templating colloids, in accordance with certain embodiments; View C corresponds to the sample prepared using chemical dissolution of the templating colloids followed by the thermal treatment of the material, in accordance with certain embodiments. Experiments to produce the results depicted in views A-C were performed under reaction conditions: 6 mol % methanol and 20 mol % O$_2$ in He at flow rate 50 ml/min at 423 K. All samples contain 10 w % of metal NP.
Figure 21:
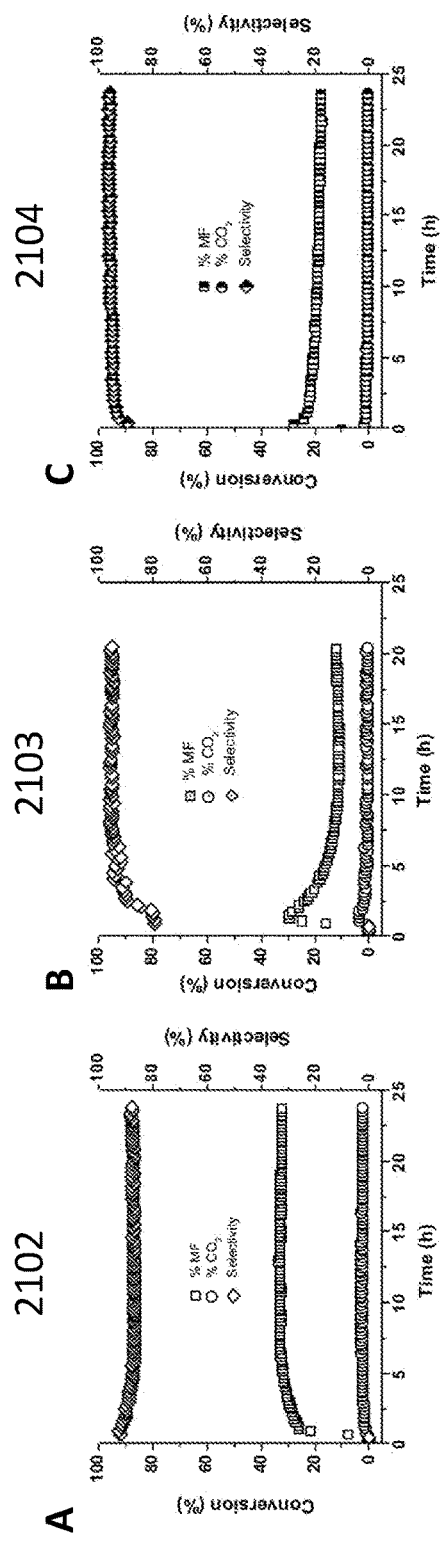
Figure 22:
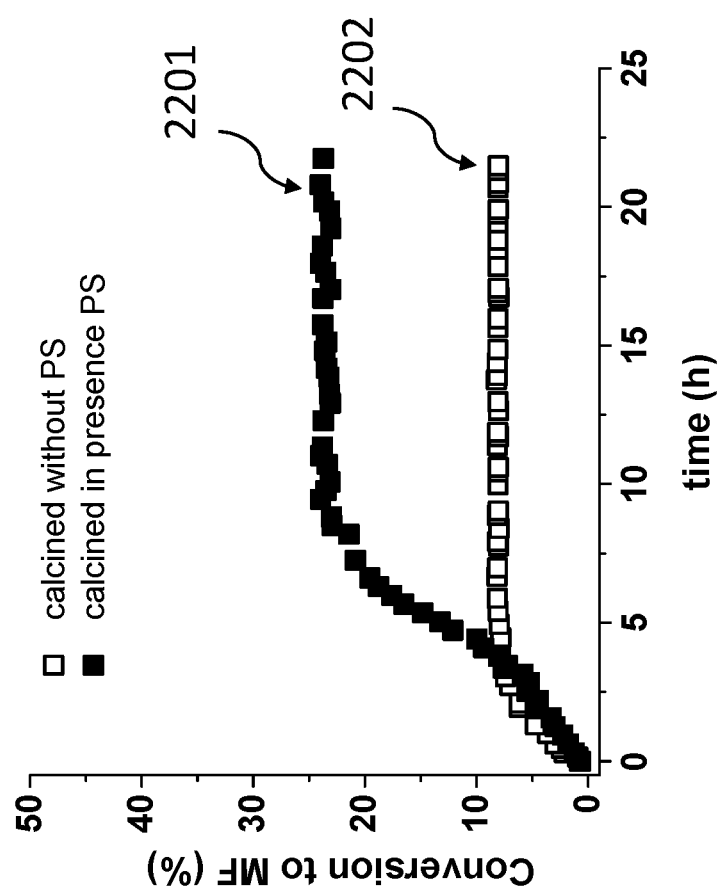
FIG. 22 is a graph comparing conversion of methanol to methyl formate using a catalyst comprising porous silica decorated with bimetallic AuPd nanoparticles prepared in accordance with certain embodiments. Filled squares correspond to the sample prepared using thermal treatment in presence of template colloids (FIG. 21, view D), and empty squares correspond to a sample prepared using chemical dissolution of the templating colloids followed by thermal treatment of the catalytic material Experiments to produce the results were performed under reaction conditions: 6 mol % methanol and 20 mol % $O_2$ in He at flow rate 50 ml/min at 150° C.

FIG. 21 compares the catalytic activity of three exemplary catalysts consisting of silica supported bimetallic AuAg NP prepared through colloidal templating approach, when the templated colloids are removed by thermal treatment vs. dissolution (view D vs. view E) in accordance with certain embodiments. FIG. 21 view A depicts conversion of methanol to methyl formate (MF, squares) and carbon dioxide ($CO_2$, circles) and selectivity for methyl formate (diamonds) using thermally removed templating colloids (view D, from 2101 to 2102). FIG. 21 view B corresponds to the sample prepared using chemical dissolution of the templating colloids (view D, from 2101 to 2103). FIG. 21 view C corresponds to the sample prepared using chemical dissolution of the templating colloids followed by the thermal treatment of the material (view D, from 2101 to 2103b to 2104). The catalyst prepared through thermal removal of templating colloids demonstrates higher efficiency of conversion (~32%) to methyl formate and high selectivity (FIG. 21 view A). In contrast, both catalysts prepared through dissolution of templating colloids demonstrate reduced efficiency in methanol conversion to MF, as shown on FIG. 21, view B (corresponds to 2103) and FIG. 21, view C (corresponds to 2104). Additional example of improved catalytic activity toward selective methanol oxidation is shown on FIG. 22. AuPd-silica catalyst prepared through thermal removal of templating colloids (2201) demonstrates higher activity to methyl formate formation (~21%) than the same catalyst prepared through dissolution of colloids and then thermal treatment (2202). All samples described in FIGS. 21-22 were measured under the same experimental conditions and contained same amount of NPs (~5 w %). Catalytic activity was measured using a conventional fixed-bed reactor. The samples were loaded into the quartz reactor tube and pretreated by heating at 150° C. for 30 min under 25 ml/min He flow to remove any water and air, then cooled to ~30° C. The reactor temperature was ramped back to 150° C. at 10° C./min rate in a 50 ml/min flow of 22 mol % $O_2$ and 6 mol % methanol in He, then held at 150° C. until the reaction reached steady-state conversion. Catalyst sample was kept in reaction conditions for at least 24 h. These results demonstrate enhancement in catalytic activity when NPs are sandwiched between templating material and matrix precursor prior to thermal pretreatment, in accordance with certain embodiments.

Figure 23:
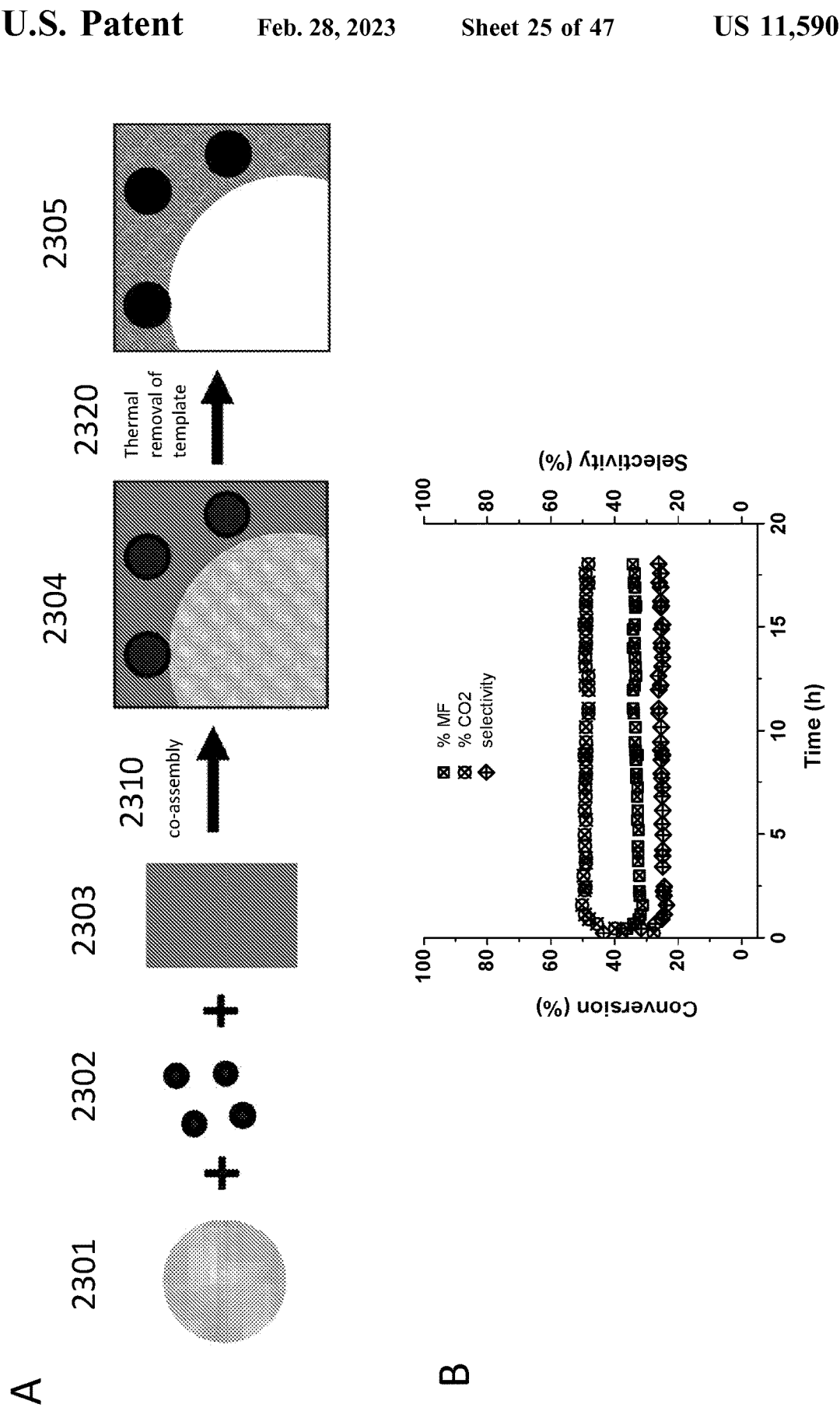
FIG. 23 is a schematic and graphic illustration of catalytic material and results, in accordance with certain embodiments. View A is a schematic illustration showing formation of catalytic materials using co-assembly approach that results in large population of NPs fully embedded into the matrix and unavailable for catalytic reactions, in accordance with certain embodiments. View B shows conversion of methanol to methyl formate (MF, crossed squares) and carbon dioxide ($CO_2$, crossed circles) and selectivity for methyl formate (crossed diamonds) using catalyst comprising porous silica with bimetallic AuAg nanoparticles prepared using the embodiment shown in View A. Experiments to produce the results were performed under reaction conditions: 6 mol % methanol and 20 mol % $O_2$ in He at flow rate 50 ml/min at 150° C.

FIG. 23 view A is a schematic illustration showing formation of catalytic materials using co-assembly 2310 approach that results in large population of NPs 2302 fully embedded into the matrix (formed from precursor 2303) and unavailable for catalytic reactions after the templating material 2301 is removed (as shown from 2304 to 2305, e.g., by thermal removal 2320). FIG. 23 view B shows conversion of methanol to methyl formate (MF, crossed squares) and carbon dioxide ($CO_2$, crossed circles) and selectivity for methyl formate (crossed diamonds) using catalyst comprising porous silica with bimetallic AuAg nanoparticles prepared using approach shown in FIG. 23 view A. The sample was measured under the same experimental conditions and contained same amount of NPs (~5 w %) as described in FIGS. 21-22. Catalytic activity was measured using a conventional fixed-bed reactor. The samples were loaded into the quartz reactor tube and pretreated by heating at 150° C. for 30 min under 25 ml/min He flow to remove any water and air, then cooled to ~30° C. The reactor temperature was ramped back to 150° C. at 10° C./min rate in a 50 ml/min flow of 22 mol % O2 and 6 mol % methanol in He, then held at 150° C. until the reaction reached steady-state conversion. Catalyst sample was kept in reaction conditions for at least 24 h. Random distribution of NPs throughout the matrix and the lack of accessibility significantly reduce the selectivity of the catalyst toward MF formation.

Figure 24:
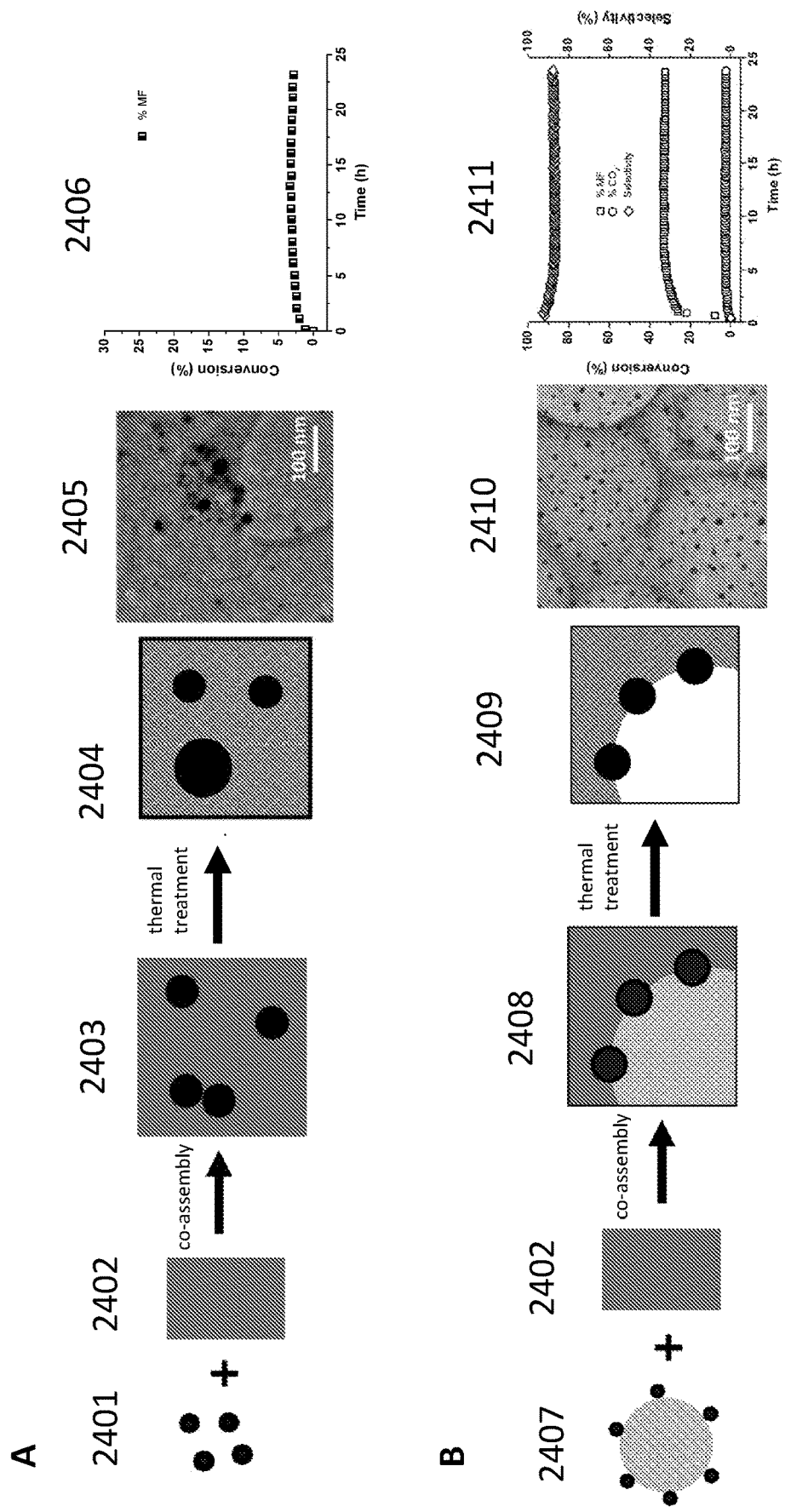
FIG. 24 is a schematic illustrations, images, and graphs of catalytic material and results, in accordance with certain embodiments. View A is a schematic illustration, images, and graph showing formation of catalytic materials using non-templated approach in which NPs are not uniformly distributed and the material has reduced catalytic activity in accordance with certain embodiments. View B is a schematic illustration, images, and graph showing formation of catalytic materials using templating approach shown in FIG. 2 in which NPs are uniformly distributed and the material demonstrates significantly enhanced catalytic activity compared to results shown in view A, in accordance with certain embodiments.

FIG. 24 view A is a schematic illustration and images showing formation of catalytic materials using non-templated approach in which NPs 2401 are combined with matrix precursor 2402 without templating colloids. The material 2403 is then thermally treated to give 2404 (imaged in 2405). NPs 2401 are not uniformly distributed after being combined with matrix precursor 2402 and the resulting material has reduced catalytic activity in accordance with certain embodiments (as show in graph 2406 of conversion of methanol to methyl formate). FIG. 24 view B is a schematic illustration and images showing formation of catalytic materials using templating approach shown in FIG. 2 in which NPs are uniformly distributed and the material demonstrates significantly enhanced catalytic activity (as shown in graph 2411) compared to results shown in FIG. 24 view A, in accordance with certain embodiments. The efficiency of conversion is significantly reduced in comparison with templated samples in FIG. 24 view B (~5% conversion vs. ~32%). Samples 2404 and 2409 were measured under the same experimental conditions (as described in FIGS. 21-23) and contained the same amount of NPs (~5 w %). Catalytic activity was measured using a conventional fixed-bed reactor. The samples were loaded into the quartz reactor tube and pretreated by heating at 150° C. for 30 min under 25 ml/min He flow to remove any water and air, then cooled to ~30° C. The reactor temperature was ramped back to 150° C. at 10° C./min rate in a 50 ml/min flow of 22 mol % O2 and 6 mol % methanol in He, then held at 150° C. until the reaction reached steady-state conversion. Catalyst sample was kept in reaction conditions for at least 24 h. The approach depicted in FIG. 24 view A does not allow control over NPs placement and yields material with large distribution of NPs sizes and their reduced accessibility. As can be seen from TEM images 2405, NPs show large variation in their sizes and randomly positioned inside the matrix. In contrast, NPs incorporated via templated approach (FIG. 24 view B) demonstrate large uniformity in their sizes and uniform distribution throughout the matrix (TEM image 2410).

The methods further provide embodiments for enhanced complex catalytic materials characterized by mechanical reinforcement or strengthening, formation of catalytically relevant ionic species at the NP-matrix and NP-pore interfaces, deposition of catalytically (or co-catalytically) active species at the matrix-pore interface, redistribution of the NP's content, modification of the shape of the supported NPs, and/or formation of different catalytically relevant phase changes within the matrix material at the NP-matrix interface and at the matrix-templating component interface.

III. Manufacturing Porous Structure with Functional Material

Catalysis is a sophisticated area of materials research and in certain embodiments, encompasses a diverse set of materials and phenomena occurring on multiple length and time scales. In certain embodiments, the development of universal frameworks for complex catalytic systems through independent (or quasi-independent) optimization of multiple structural and compositional features can result in catalysts that can be broadly applied toward, for example global energy and environmental challenges. Towards addressing this goal, in certain embodiments, a modular platform is disclosed herein in which sacrificial templating component bearing catalytic nanoparticles on their surfaces self-assemble with matrix precursors, simultaneously structuring the resulting porous networks, fine-tuning the locations of catalyst particles, as well as introduce a reactant capable to affect the chemical character of the catalytic site and its vicinity through subsequent modification steps. This strategy can allow combinatorial variations of the material building blocks and their organization, in turn providing numerous degrees of freedom for optimizing the material's functional properties, for example from the nanoscale to the macroscale. In certain embodiments, the platform disclosed herein enables systematic study and design of efficient and robust systems for a wide range of catalytic and photocatalytic reactions, as well as their integration into industrial and other real-life environments.

In certain embodiments, three dimensional porous structures can be synthesized from the removal of an interconnected templating component to provide a network of interconnected pores having a high surface area. Such structures can, in certain embodiments, be used in such applications as industrial catalysis, catalytic conversion, emission control, photocatalysis, sensing, separation and purification, protective coatings (possessing specific, often predesigned thermal, and/or mechanical, and/or chemical properties), as well as in creating multifunctional systems combining chemical, optical, electric, magnetic, and other input/output combinations.

Discussed below in sections III.1-III.6 are exemplary embodiments of various techniques to achieve the catalytic system design 3500 as depicted in FIG. 35. In certain embodiments, embodiments and techniques disclosed below can be combined to create catalytic system designs 3500.

1. Co-Assembly of Porous Architectures

Figure 7:
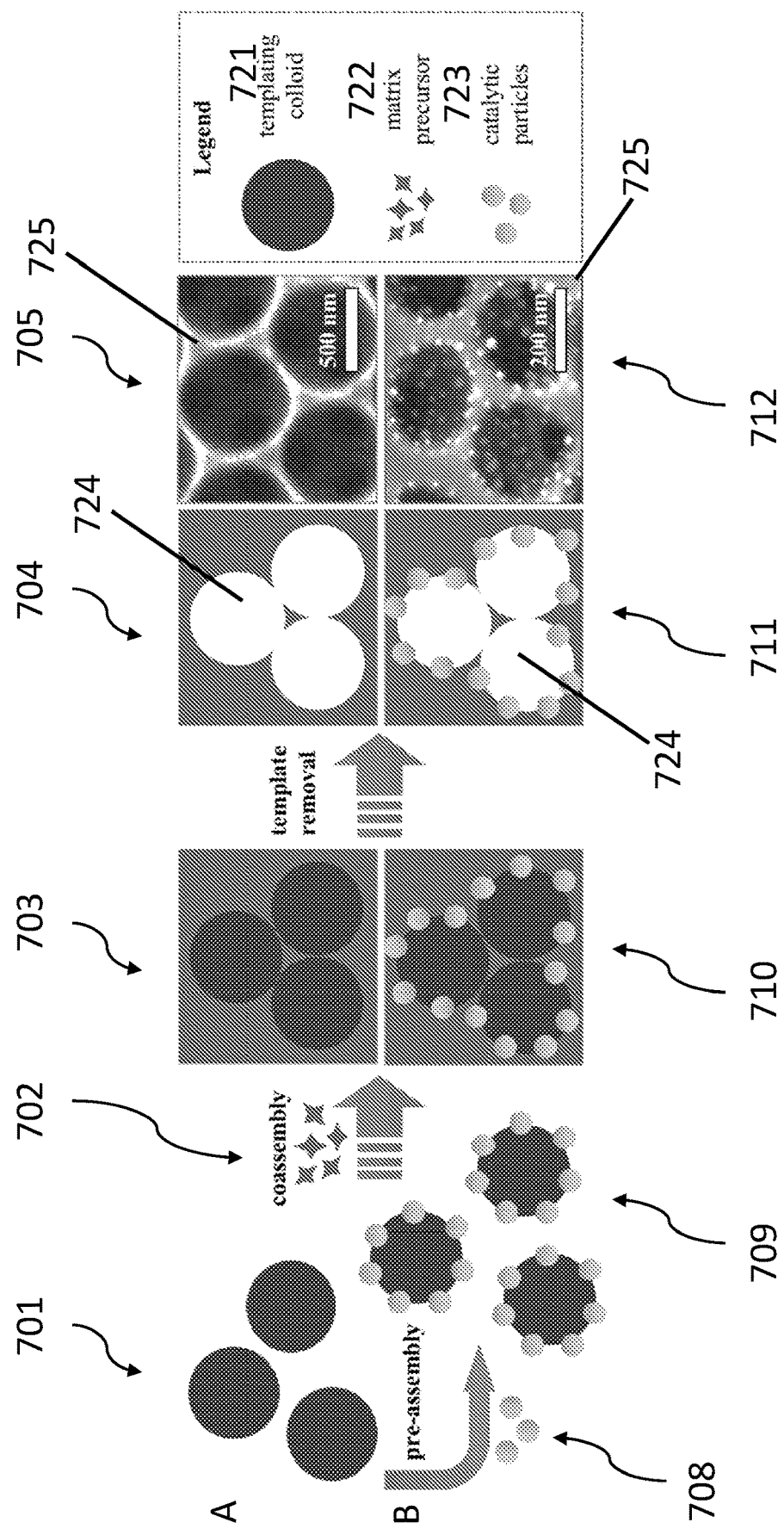
FIG. 7 is a schematic illustration and representative images of an exemplary templating approach to produce enhanced catalytic materials without (view A, top row) and with (view B, bottom row) functional NPs partially embedded at the matrix-channel interface, in accordance with certain embodiments.

As depicted schematically in FIG. 7, an embodiment described herein is one specific manifestation of a generalized method shown in FIG. 2, in which the templating material is polymeric colloidal particles of spherical shape. This embodiment describes a colloidal co-assembly process, in which templating colloidal particles of 20 nm to several microns in diameter self-assemble by evaporation-induced self-assembly (EISA) together with a sol-gel or nanoparticulate precursor for the background matrix. During EISA, evaporation of the solvent (generally water) leads to convective forces that drive particles to the air-water interface. In the case of co-assembly 702, for example as depicted in FIG. 7 view A, after providing colloids 721 at step 701 and mixing them with matrix precursor 722, as the colloids are pulled towards the substrate and each other by capillary and depletion forces during coassembly 702, they can template the formation of the background matrix within their interstices (as seen in 703). In certain embodiments, at the same time, the matrix precursor in the assembly mixture can serve as an amorphous viscoelastic medium that accommodates stresses and prevents cracking, so that long-range (millimeters) defect-free colloidal lattices can be obtained. Once the templating colloids are removed by, for example, calcination or dissolution, a highly interconnected porous network, so-called inverse opal (10) structure, remains (704-705).

FIG. 7 view B represents schematics and representative images of the templating approach to produce porous structures with catalytic NPs 723 partially embedded inside the walls of the matrix material, for example functional nanoparticles (NPs), positioned predominantly at the interface between the matrix and channels (or pores), in accordance with certain embodiments. The top row A represents the assembly of pure colloids and the bottom row B represents the assembly of templating colloids 721 decorated with catalytic particles 723 in preassembly step 708, for example NPs or ions. 701 depicts colloids 721 prior to the co-assembly. 703 and 710 depict assembled composite opal structures. 704 and 711 depict IO structures of pores resulting from the removal of the colloids 721 by, for example, calcination or dissolution. 705 and 712 depict SEMs of embodiments of IOs with pores 221 produced in this way using silica as a matrix material 725 and exemplary IO with pores 724 with gold NPs 723 incorporated predominantly at the pore interface with the silica matrix material.

As described herein, the forces involved in the co-assembly can create a highly versatile system both for controlling pore sizes and connectivity, and for incorporating catalysts into a wide range of matrix architectures and compositions, particularly when catalysts are associated with and introduced by the colloids (as depicted, for example, in FIG. 7 view B). In both cases—bare colloids 721 (as depicted, for example, in FIG. 7 view 701) and colloids pre-associated with functional particles 709—in some embodiments, the pore size is determined by the dimensions of the templating colloids 701, while the pore shape is controllable by the template removal conditions. In some embodiments, varying temperature can be used to modulate the pore size and shape, due to softening of the matrix material on heating leading to partial collapse of the pores. In some embodiments, the pore connectivity and short- and long-range order can be defined by the choice of assembling species and reaction conditions, and the size of the pore openings can be further optimized through post-modification methods such as etching, thermal treatment or atomic layer deposition (ALD). In some embodiments, tuning these parameters along with localizing catalysts is important for mass transport, photonic, thermal and mechanical control, and can also be used to shift product selectivity through size exclusion, for example, in electrocatalytic reduction of carbon dioxide as well as in photocatalytic processes with structured titania.

Figure 26:
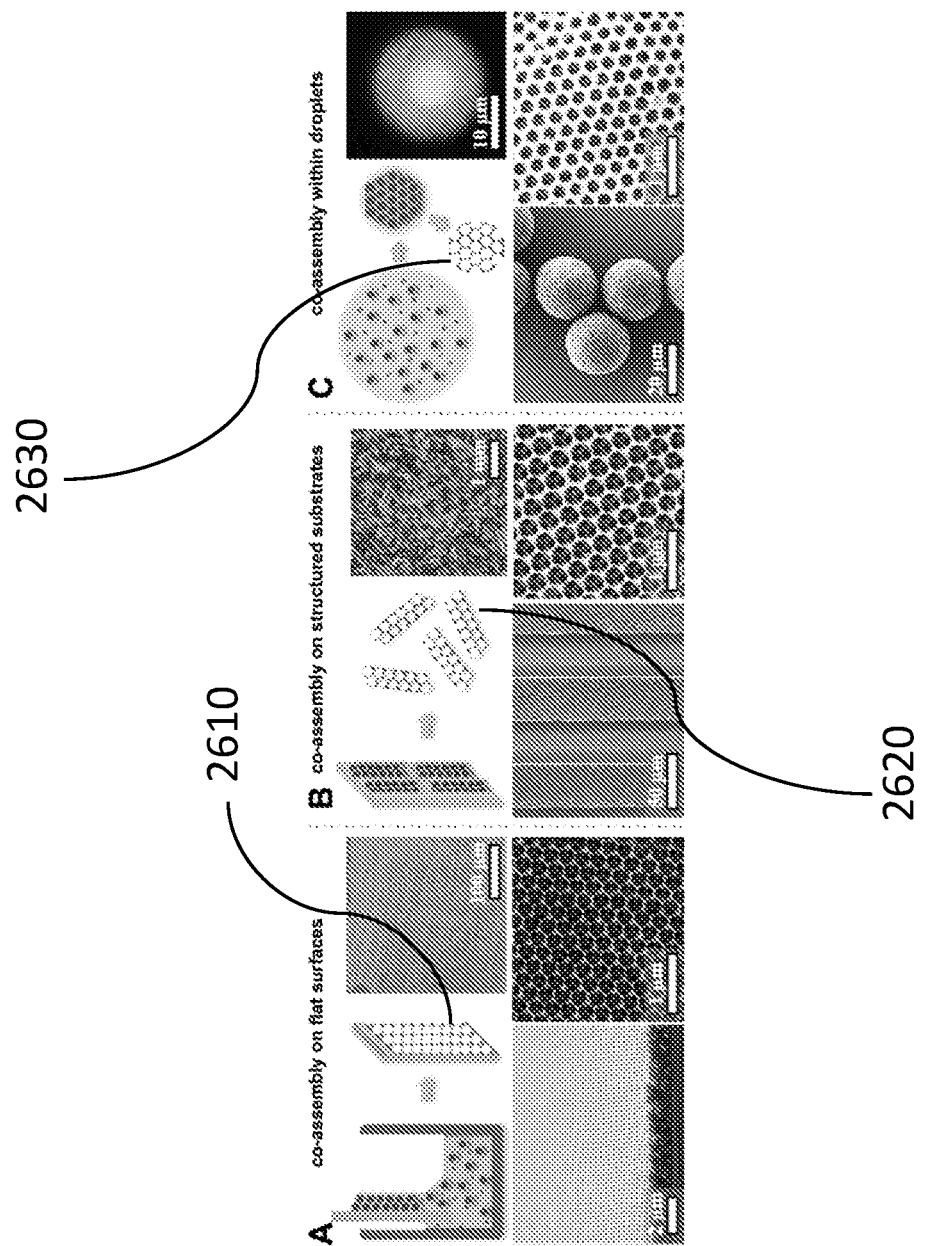
FIG. 26 presents schematics and corresponding SEMs of catalytic materials in different macroscopic formats, in accordance with certain embodiments.

The macroscopic shape of the colloid templated porous structure can be designed in certain embodiments by confining the co-assembly reaction to different geometries, as depicted in FIG. 26. For example, high-quality substrate-bound IO thin films, dispersible structurally hued and designed shapes (SHARDS), and dispersible photonic balls (PBs), can be prepared by performing EISA on flat or templated substrates, or inside droplets, respectively. For example, FIG. 26 depicts formation of IOs in different macroscopic formats, in accordance with certain embodiments. View A depicts films on smooth substrates/flat surfaces (e.g., film 2610) in accordance with certain embodiments, view B depicts dispersible IO cuboids (e.g., photonic bricks 2620) obtained, for example, using patterned sacrificial templates in accordance with certain embodiments, and view C depicts dispersible IO microspheres (e.g., photonic balls 2630, PBs) generated, for example, through droplet-confined co-assembly. Each view is presented schematically (top-left portion of views A-C) and contains representative optical (top-right portion of views A-C) and SEM (bottom portion of views A-C) images. Films 2610 can be formed, for example, by suspending a substrate vertically inside the assembly mixture, such as for co-assembly with silica precursors. High-quality IO PBs 2630 can be prepared, for example, through a microfluidic emulsification process using microfluidic device consisting of two inlet channels, which intersect to form a cross junction in order to emulsify an aqueous dispersion of polystyrene colloids and metal oxide precursor in a continuous fluorocarbon oil phase containing a surfactant as previously described. Shrinkage of the droplet during evaporation can produce spherical colloidal assemblies.

2. Controlled Localization of Catalytic Sites

Strategies for catalyst immobilization include attachment of preformed NPs, deposition of a metal precursor onto a substrate followed by a reduction step leading to formation of NPs, and one-pot concurrent synthesis of catalytic NPs and their supporting matrix. Control over one parameter frequently can come at the expense of control over others. Infusing catalyst particles into a pre-assembled porous substrate, for example by adsorption or deposition of metal NPs, can yield highly accessible catalytic sites; however, the NPs can be loosely bound and unstable leading to their sintering and fusion, especially in high-temperature catalytic reactions. Such methods can also suffer from complex synthetic procedures that can result in blocking or passivation of the NP surface. Both complications can result in the reduction of catalytic activity with time.

An alternative approach of certain embodiments based on template-free synthesis of catalysts from a mixture of NPs and substrate precursors can produce stably embedded metal NPs. However, using this approach a significant portion of the NPs is excluded from participating in catalytic processes due to poorly controlled pore sizes and connectivities as well as random distribution of the NPs throughout and within the background matrix that can make a large portion of them fully encapsulated and thus inaccessible to reactants. The non-uniformity in distribution and size of NPs resulting from these methods can, in certain embodiments, lead to the appearance of hotspots during catalysis and compromise the control over temperature and concentration profiles, which in turn can reduce the reaction efficiency and selectivity as well as the stability of the system.

The dynamic co-assembly strategy described in exemplary embodiments herein overcomes many of these issues by using sacrificial colloids to mediate the assembly of both catalysts and pores, leading to high control over nanoparticle position, composition, compartmentalization and overall architecture.

2.1 NP Decorated Colloids

As disclosed in embodiments herein, NP-decorated templating material—for example, mesoscale colloids with nanoparticles bound to their surface—introduce multiple hierarchical degrees of freedom for synthesizing and incorporating one or more types of catalytic NPs as depicted in FIG. 27. As disclosed herein, for the case when templating material is spherical colloidal particles, the resulting NP-decorated material is often referred to as "raspberry" particles. The terms "raspberry particles" and "NP-decorated particles" are used interchangeably throughout and meant to represent a specific case of NP-decorated colloids. Disclosed herein are designs and fabrications of these composite colloids with various morphologies and tailored physical and chemical properties. Additionally, these colloids can offer an effective route for the stabilization of inorganic nanoparticles in dispersions, in accordance with certain embodiments. NP-decorated templating material is suitable for a wide range of applications including stimuli-responsive materials and actuators, sensors and SERS substrates, hydrophobic and hydrophilic coatings, catalysis, biochemistry, and nanoengineering of optical and magnetic resonances. The utilization of NP-decorated templating material as nanocomposite templating species for fabrication of catalytically active porous functional structures is largely unrealized.

In certain embodiments, employing NP decorated colloids to form IOs provides independent control over NP composition, placement, and loading. Prior to co-assembly (preassembly step in FIG. 7), NPs are stably associated with the colloids, which have diameters tailored to achieve the desired pore size. This method is applicable, for example, for a broad choice of NPs including monometallic and multimetallic compositions, which can have a homogeneous or segregated (e.g., core-shell) structure. Co-assembling NP-decorated templating particles (or infiltrating assemblies of such particles) with matrix precursors then positions the NPs predominantly at the interface between colloids and matrix. Once the colloids are removed, the NPs appear partially embedded in the walls of the pores, optimizing their thermal and mechanical stability, while remaining mostly exposed to the pore interior, maximizing their availability for catalysis. For example, FIG. 27 depicts the results of this method using Au, Ag, Pd, and Pt, as well as bimetallic particles. The SEM images further show a very uniform distribution of the metal NPs along the IO inner pore surfaces, which can provide consistent catalytic performance enabled by the even distribution of temperature and chemical concentrations.

FIG. 27 depicts the formation of interconnected porous microstructures using different types of NP decorated templating particles. View A depicts templating particles each capped with a single type of NP (indicated on the images). If desired, multiple types of colloids can be used in various combinations to produce IOs incorporating different types of NPs exposed in different pores. That is, view A depicts use of NP-decorated templating colloidal particles having Au NPs formed thereon and NP-decorated templating colloidal particles having Pt NPs formed thereon to create IOs with some pores incorporating Au NPs, and other pores incorporating Pt NPs. View B depicts different types of NPs (e.g., Au and Pd) attached to the same colloids produce IOs containing more than one type of NP in each pore. View C depicts multimetallic particles (e.g., AgAu NPs) attached to the same or different colloids produce IOs incorporating multimetallic catalytic sites. In views A-C, the first two columns 2701 and 2702 of images on the left side contain TEM images 2701 and scanning transmission electron microscopy (STEM) elemental composition mappings 2702 of exemplary polystyrene colloids decorated with metal NPs that were used to assemble IO systems. The corresponding NP-capped colloids 2710 are shown schematically in between image columns 2702 and 2703, followed by the three columns 2703-2705 on the right, which contain (from left to right) SEM images and schematics (inset) 2703, TEM 2704, and STEM-EDX elemental mapping images of the resulting systems 2705.

Besides positioning NPs predominantly at the matrix-pore interface, in exemplary embodiments, the NP-decorated templating approach has the advantage of allowing a variety of NP configurations and combinations within the porous architecture, which is particularly relevant for coupling and compartmentalizing reactions catalyzed by different metals. For example, IOs can be produced with different metal NPs in different pores or multiple metal NPs within a single pore as shown in FIG. 27. In certain embodiments, using a mixture of populations of NP-decorated templating colloidal particles, each coated with one type of monometallic NP, yields IOs in which each individual pore contains one or the other type of NP (FIG. 27 view A), allowing different chemical processes to be conducted simultaneously in adjacent pores. In other embodiments, NP-decorated templating colloidal particles, and ultimately pores of an IO, bearing more than one type of NP on their surface (FIG. 27 view B) allow multiple reactions to be performed in sequence within a single pore. These configurations can, for example, be well-suited for multistep reactions as different catalysts can be distributed within the matrix at pre-designed concentrations and distances from one another. Since the geometry of the pores and the openings between them are highly regular, the diffusion characteristics of the reactive species in this system can be predicted and used to design reaction sequences. In certain embodiments, templating material can be provided with one or more ratios of different types of catalytic nanoparticles in order to provide enhanced functionality, for example 0.01 to 99.99% of one type of NPs, 0.01 to 99.99% of another type of NPs, and 0.01 to 99.99% of other types of NPs with the total sum of all NPs is 100%. As a non-limiting example, a first set of templating material could be decorated with 25% Au nanoparticles and 75% Pt nanoparticles, and a second templating material could be decorated with 75% Au particles and 25% Pt nanoparticles.

In addition to IOs with Au and Pd NPs exposed on the surfaces of the same or different pores (see, e.g., SEM images in FIG. 27 views A and B), IOs containing bimetallic NPs (AgAu, see FIG. 27 view C) are also disclosed in certain embodiments. Multimetallic catalysts can feature greatly enhanced catalytic properties compared to their constituents due to synergistic relations between the different metal components. As described herein, in certain embodiments, the approach to multimetallic catalytic materials enables the synthesis of a library of templating colloids decorated with different NPs and to use them on demand to form IOs specific to the target catalytic application. The NP-decorated templating colloidal methodology can reduce the complexity of designing a controlled IO synthetic process, especially compared to approaches comprising co-precipitation of multiple components (e.g., mixing bare colloids and NPs with the matrix precursor) that require careful considerations of the chemistries of all species involved and their interparticle interactions.

The enhanced efficiency of the modular approach described herein for the incorporation of multimetallic particles by using the NP-decorated templating colloidal particles to create, for example, a silica IO scaffold decorated with AgAu NPs and performing oxidative coupling of methanol to methyl formate as a model reaction is possible. In certain embodiments, the structures demonstrated a uniform distribution of AgAu NPs predominantly along the pore interfaces throughout the structure (FIG. 4 view C). The loading of the NPs predominantly at the matrix-pore interface can be determined by their density on the surface of the sacrificial colloids and is directly related to the catalytic activity. In some embodiments, the reactivity and selectivity of this system are comparable to those of an unsupported nanoporous AgAu catalyst—a free-standing structure that is highly selective and a robust catalyst for the coupling of, for example, alcohols to form esters—but with much lower precious metal use in the case described in embodiments herein. In some embodiments, the AgAu-silica structure exhibited high conversion efficiency, selectivity, and long-term stability as well as the absence of mass transport limitations under applied reaction conditions.

Another exemplary benefit of the NP-decorated templating colloidal approach of certain embodiments is that the resulting IO system is remarkably stable to heat treatment, which is important in industrial settings where it solves the common issues of NP diffusion and agglomeration under reaction conditions that generally occur in other systems. This stability is demonstrated, for example, for silica IOs containing Au NPs created using the NP-decorated particle templating by comparing the NPs before and after heat treatment at 600° C. vs. those incorporated via a more conventional approach according to which small (2 nm) Au NPs were deposited on the surface of preformed IOs and subsequently grown (FIG. 10). Silica IO systems with Au NPs introduced through deposition can suffer from poorly anchored NPs that are prone to travelling on the surface of the pore at elevated temperatures and coalescing with other particles. In the example shown, the NPs' mobility leads to a change in their sizes post heat treatment from ~9 to 28 nm (over 200% increase, FIG. 10 views 1001 to 1006). In contrast, silica IOs with Au NPs incorporated by NP-decorated templating according to certain embodiments retain the same NP size (~6 nm) and morphology before and after calcination at 600° C. due to partial embedding of the NPs in the silica matrix (FIG. 10, views 1007 to 1011).

For example, FIG. 10 depicts a comparison of thermal stabilities of Au NPs grown in a preformed pure IO (1001-1006) and those incorporated into silica IOs using the NP-decorated templating approach (1007-1012). 1001 shows an SEM image of a silica IO with Au NPs grown on the surface before heat treatment, along with a schematic representation 1002. 1003 shows a TEM image of a fragment of the IO shown in view 1001. The particle size at that stage is 9±3 nm. 1004 shows an SEM image of an IO shown in view 1001 after heat treatment at 600° C., along with a schematic illustration 1005. The average particle size at that stage is 28±9 nm (>200% increase), as shown in 1006 TEM image of a fragment of IO after thermal treatment. Since the increase in the size of catalytic particles significantly reduces their activity, the resulting (traditional) catalysts will show continuously reduced activity, as the particles diffuse and grow upon thermal treatment. On the contrary, according to certain embodiments, 1008 shows a TEM image of NP-decorated particles consisting of polystyrene colloids modified with Au NPs (5±1 nm) in accordance with certain embodiments, along with a schematic illustration 1009. 1010 shows an SEM image of an IO fabricated using the colloids shown in 1008, according to certain embodiments, along with a schematic illustration 1010. 1012 shows a TEM image of the IO shown in 1009 shows an insignificant change in the Au NPs diameter after calcination at 600° C. (6±1 nm, ~20% increase). The absence of NP growth will result in a highly enhanced thermal stability of the catalyst and its long-term function.

2.2 Proto-Raspberry Particles

Figure 28:
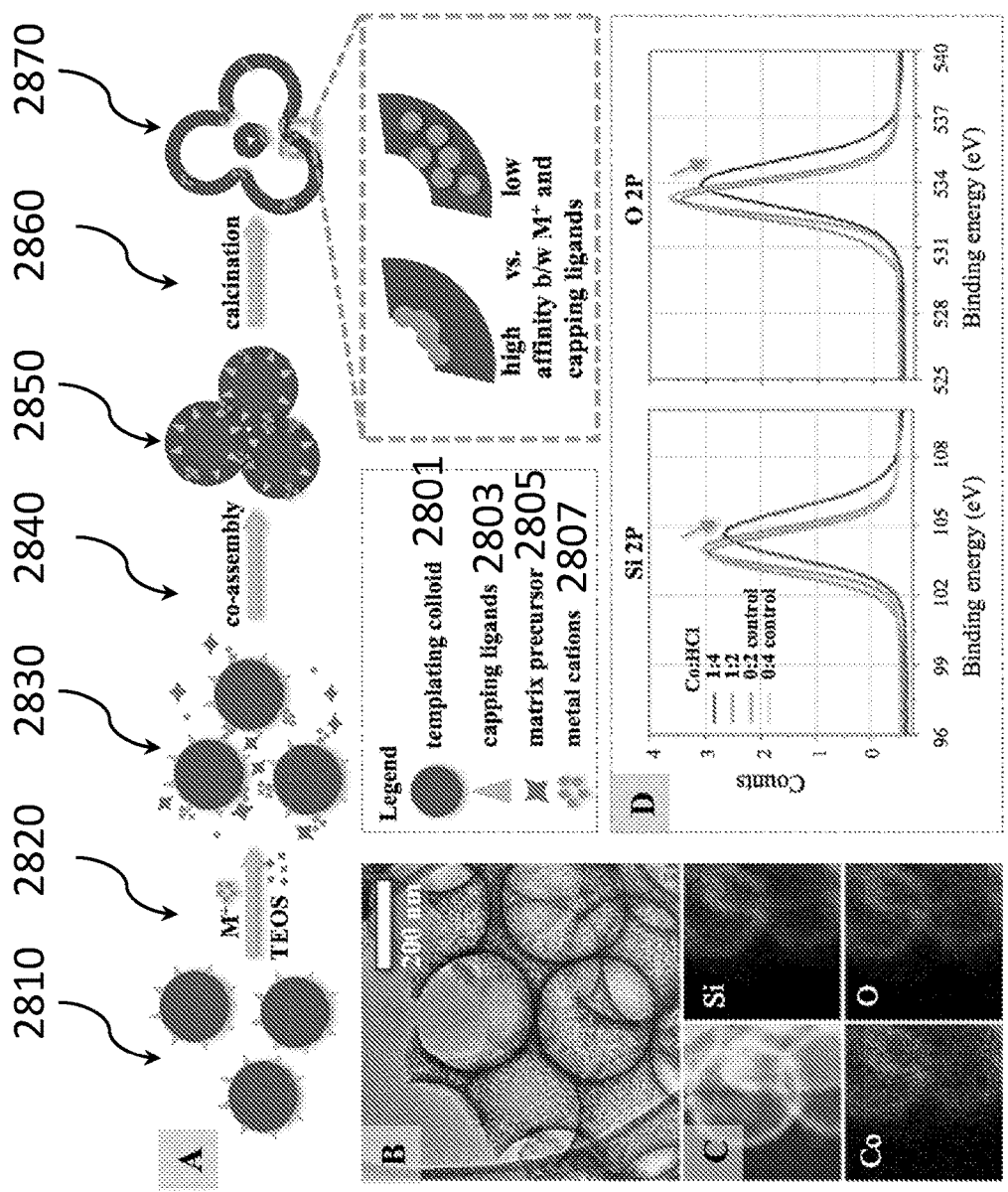
FIG. 28 is a schematic representation, images, and graphic results of incorporation of transition metal salts into the catalytic material through in-situ association of the ions with the capping ligands of the templating colloids, and their assembly, in accordance with certain embodiments.

In certain embodiments, the degrees of freedom for controlling catalyst distribution, as well as the functionality of the system, are further expanded through incorporation of ionic species in the assembly mixture, for example as illustrated schematically in FIG. 28. In certain embodiments, as an alternative to pre-synthesized metal NPs attached to colloids to form NP-decorated particles, ionic species can associate with and deposit onto the appropriately functionalized surfaces of colloids in situ. As an illustrate example, cobalt can be used, which is an intense blue coloring additive in glasses and a Fisher-Tropsch catalyst for the production of synthetic fuels. Silica-supported cobalt catalysts prepared using a sol-gel method and methods to increase the surface area of cobalt and other metal oxide catalysts are disclosed herein. Beyond Co, the formation of analogous systems with other salts including those of Ca, Mg, Ni, Cu, and Fe can also be used, in accordance with certain embodiments. In-situ formation of proto-raspberry particles can, in certain embodiments, require less synthetic steps as compared to the assembly of preformed NP-decorated particles which is practically a highly beneficial outcome. However, the presence of ions or other surface modifying agents in the assembly mixture can, in certain embodiments, complicate the process of self-organization and result in uncontrolled precipitation. Moreover, in certain embodiments, during the post-modification procedure the presence of charged species and metal ions can greatly affect the chemical nature of the interfaces in its vicinity, i.e. catalytic NPs and the supporting metal oxide, resulting in modified catalytic properties.

Varying the affinity between the metal cations and the colloids' capping ligands can in certain embodiments provide a way to tune the distribution of catalytic species within the TO structures (see, e.g., FIG. 28 view A). High affinity can result in the formation of raspberry-like colloids in situ, which can be referred to as 'proto-raspberry' particles. In certain embodiments, since the timescale of proto-raspberry formation is generally much shorter than colloid and matrix assembly, the ionic species are directed to and specifically accumulate at the colloid surface, and later end up predominantly at the pore interface after calcination, analogously to pre-synthesized NP-decorated particles. In certain embodiments, low affinity between the ions and ligands can result in ions uniformly dispersed throughout the matrix, both at the interface and in the bulk. This homogeneous distribution can be useful, for example, when salts offer additional, co-catalytic or non-catalytic functions as chemically isolated dopants buried within the matrix. For example, in photocatalytic reactions such dopants can assist in, or be primary for, light absorption and photoinduced energy or electron transfer, or they can increase the refractive index of the background matrix for additional photonic effects. In some embodiments, proto-raspberries are preferred when the dopants actively participate in catalysis, due to their accessibility towards reactants flowing within the pores, and when a short path distance is needed to minimize the probability of charge recombination of the light-generated electron/hole pairs. In some embodiments, the ability to specify the distributions of ions within the matrix allows the catalytic and photonic effects of a given species to be systematically tailored.

FIG. 28 schematically depicts incorporation of transition metal salts into IOs through in-situ association of the ions with the capping ligands of the templating colloids, and their assembly. View (A) is a schematic of the formation of IO structures using proto-raspberry templating and the influence of ion/ligand affinity on the final ion distribution, in accordance with certain embodiments. The templating colloids 2810 bearing ligands 2803 capable of coordinating to metal ions 2820 are exposed to the ions 2807 resulting in complexation and formation of the proto-raspberry templating particles 2830. Their co-assembly 2840 with metal oxide precursor 2805 yields a compound structure 2850 which upon calcination 2860 is transformed into an inverse structure 2870. View (C) depicts an STEM elemental mapping of the same sample as in view (B) showing the uniform distribution of the ions within silica matrix, according to certain embodiments. View (D) depicts an X-ray photoelectron spectroscopy (XPS) of the resulting IOs synthesized with different loadings of HCl in the co-assembly mixture, according to certain embodiments.

In certain embodiments, the association of the ionic species with the colloids can be achieved through specific or electrostatic interactions. As synthesized, polyethylene glycol (PEG) or polyvinylpyrrolidone (PVP) functionalized colloids are both sterically stabilized and also possess a substantial surface charge sometimes found to be comparable to that of carboxylate- or sulfonate-capped colloids, as measured by zeta potential (~40±10 mV). Due to steric repulsions, these colloids remain stable even at concentrations of ions above a millimolar level, at which the surface charge is substantially shielded or neutralized. In contrast, the purely electrostatically stabilized colloids with sulfonate or carboxylate ligands can become unstable even at lower concentrations of ions resulting in flocculation and uncontrolled formation of precipitates. As depicted in FIG. 28 views B-C, the use of PEG- and PVP-capped colloids allowed the formation of high-quality IOs featuring a uniform distribution of Co within the silica matrix, in accordance with certain embodiments. Additionally, as can be seen in FIG. 28 views B and C, the association of cobalt ions with ligands, such as PEG on the colloid's surface, locally promotes the kinetics of sol-gel processes leading to the formation of cobalt-containing silica shells around the templating colloids that results in the appearance of a closed-packed array of hollow spheres. In principle, such an array of rigid hollow spheres possesses isolated spherical compartments, which would hamper catalytic performance. However, as disclosed in exemplary embodiments herein, the conditions and rate of the calcination step can promote the softening and fusion of the individual spheres and formation of openings between them, leading to an interconnected porous network due to the flowable nature of the silica sol-gel matrix prior to its complete condensation. In certain embodiments, catalysts of different compositions (metal NPs and metal oxides matrix) will lead to specific considerations with respect to the heat treatment sequence, which will also vary for a catalyst with the same composition but made for a specific purpose. In general, heat treatment sequences can contain multiple steps of heating (at a specific rate), maintaining the same temperature, and cooling down (also at a specific rate). In order to optimize the fusion process for certain embodiments, it is important to allow sufficient time for a softened material to flow and reconfigure prior to cooling down or transitioning to annealing temperature. In certain embodiments, it is also important to have sufficiently slow rates of heating and cooling in order to avoid thermal-shock-induced defects. The term annealing refers to treatment processes (e.g. by means of heating, drying, or exposing to specific redox conditions) used to alter material's microstructure (e.g. crystallinity, roughness, and redox state).

In some embodiments, the assembly mixture should be tailored to produce ions with specific coordination number since the ion size and immediate environment will affect its final distribution in the IO. In the example of Co, excess HCl can favor the tetrahedrally rather than octahedrally coordinated form of Co(II), while moderately acidic conditions (e.g., 0.03M HCl) can lead to an uneven IO film containing blackened cobalt oxide within the silica matrix. At elevated concentrations of HCl (e.g., 0.63M), a uniform blue cobalt silicate matrix can be obtained, likely due to the formation of tetrahedral cobalt chloride, which facilitates its incorporation into the tetrahedral silica matrix during condensation of tetraethyl orthosilicate (TEOS). In some embodiments, X-ray photo-electron spectroscopy (XPS) surface analysis (FIG. 28 view D) shows a shift to higher binding energy for the silicon and oxygen peaks when the atomic cobalt to HCl ratio was 1:4, showing a direct interaction between the cobalt and silica and the importance of HCl in this synthesis.

3. Control of Pore Connectivity and Disorder with NP-Decorated Particles and Ionic Additives In certain embodiments, beyond or in addition to controlling the catalyst placement, the colloidal co-assembly system can offer additional degrees of freedom due to the catalytic particles' ability to tailor the matrix architecture. Each of the formats discussed above—raspberry (i.e. NP-decorated templating colloids) and proto-raspberry particles, and ionic species in solution—can provide a mechanism to modulate colloid-colloid and colloid-matrix interactions, in accordance with certain embodiments, leading to fine-tunability of the self-assembly process and the resulting crystallinity of the IO structure. The order of the assembled IO determines the organization, connectivity, and tortuosity of the porous network, and hence the catalytic material's optical, mechanical, and transport properties, for example. Since self-assembly into a crystalline lattice relies on a delicate balance of forces, the inclusion of metal NPs and ions can influence the course of EISA, with the potential to disrupt the organization of the colloids, leading to polycrystalline or amorphous structures. Disclosed in embodiments herein are techniques to avoid or produce formation of polycrystalline or amorphous structures. In certain embodiments, fcc can be used as the crystalline lattice.

In the context of catalytic performance, the microstructure of IOs (including the periodicity, distribution, and connectivity between the pores) is important as it can affect the mass transport, thermal, and photonic properties in catalytic and photocatalytic systems. Both high order and disorder can be beneficial in different scenarios, in accordance with certain embodiments. For example, the ability to produce crystalline IO assemblies is important for creating well-defined porous networks with highly regular pathways for diffusion, which can be quantitatively characterized and modeled for the design of catalytic architectures. Moreover, disorder can lead to the deterioration of certain beneficial properties, for example when it suppresses the slow light effect, which otherwise would enhance light absorption for photocatalytic applications. On the other hand, in certain embodiments a catalytic system can benefit from disorder, such as when increased tortuosity is desired for higher residence times of reactants within the catalytic material, or when multiple scattering in a disordered structure leads to light propagation transitioning from the ballistic to diffusive regimes, and even to light localization, enhancing light-matter interactions for improved photocatalysis. Additionally, disordered materials can have greater mechanical stability compared to brittle crystalline arrangements, where lattice planes lend themselves to facile cleavage.

3.1 Tuning Disorder with NP Decorated Templating Particles

Co-assembly of NP-decorated sacrificial templating material represents a unique strategy for achieving controlled crystallinity, according to certain embodiments. In certain embodiments, EISA of monodispersed spherical colloids (polydispersity index, PDI<5%) can produce highly ordered, crystalline fcc domains upon drying, while polydisperse or nonspherical colloids can introduce various levels of disorder into the structure. In certain embodiments different sizes of colloids or permanent and sacrificial colloids are combined to reduce the crystallinity of opals. This approach to disorder can lead to inhomogeneities or differently sized pores in addition to changes in their arrangements. In other embodiments, co-assembly of NP-decorated particles can systematically control the degree of disorder simply by varying the size of the NPs on the surface; since the overall size of all the templating particles is identical in this case, the resulting IOs do not suffer from inhomogeneous incorporation of NPs, large distribution of pore sizes, or phase separations. In certain embodiments, NPs on the colloid surface can introduce systematic deviations from order by interfering with electrostatic stabilization during self-assembly, and by controllably perturbing the spherical shape of the templating colloids.

Figure 29:
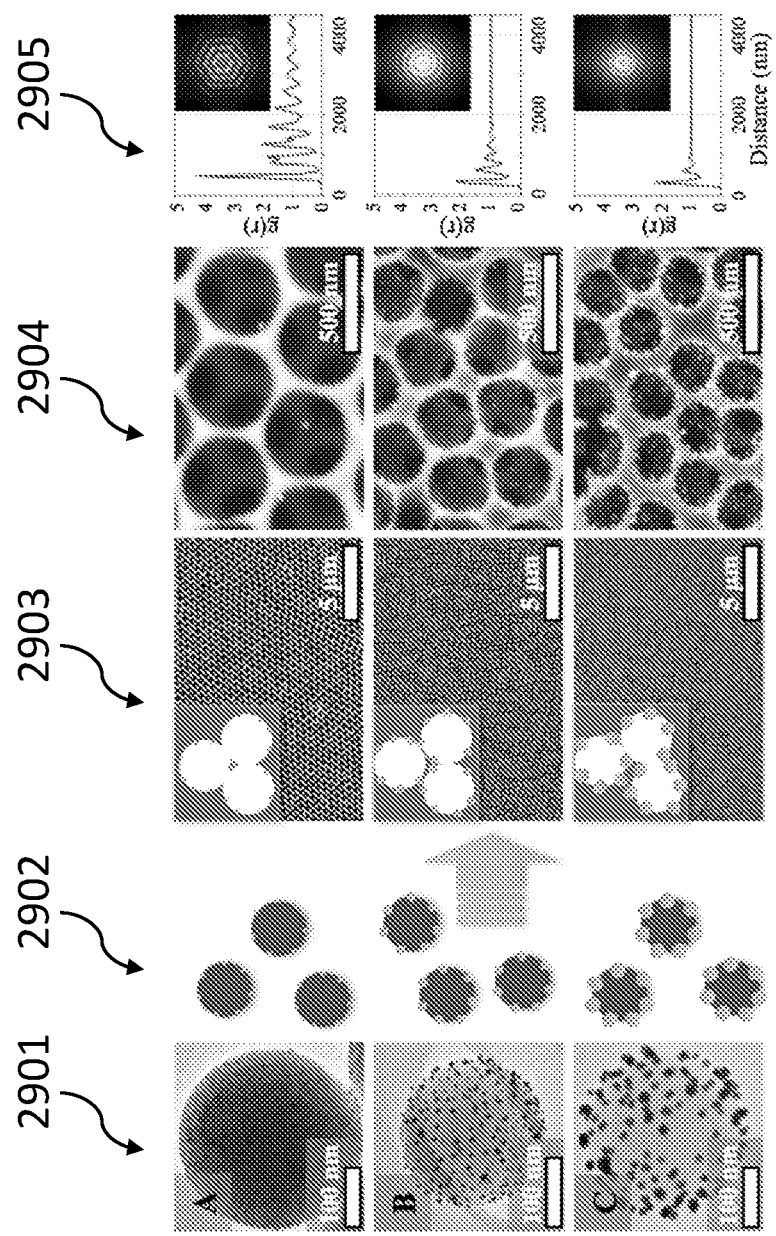
FIG. 29 is schematics and corresponding SEMs and FFT analysis of controlled disorder in the distribution of pores achieved by, for example, varying the size of NPs decorating the templating colloids, in accordance with certain embodiments.

FIG. 29 depicts controlled disorder achieved by varying the NP size on templating NP-decorated colloids, in accordance with certain embodiments. The templating particles are polystyrene colloids pre-assembled with gold seeds of (view A) 2 nm, (view B) 5 nm and (view C) 12 nm. The images in views A-C are, from left to right: TEM 2901 and schematic 2902 of templating particle, SEM 2903 of the resulting IO and a schematic version in the inset, zoom-in 704 to the SEM, and radial distribution function (RDF) 2905 calculated from the IO.

As depicted in FIG. 29, polystyrene colloids modified by 2 nm NPs (view A) result in highly ordered IOs, while increasing the NP size to 5 nm (view B) and 12 nm (view C) results in progressively increased disorder and deviation from the fcc lattice. The degree of disorder is quantified, for example, by the radial distribution function (RDF) 2905, which is a measure of the number of particles that lie in a spherical shell of infinitesimal thickness at a given distance from any single particle within the structure. For a perfect lattice, the RDF appears as delta functions at distances corresponding to its lattice spacings. For real systems with finite size, the delta functions become peaks with finite heights and widths. Likewise, as the system deviates from perfect periodicity, the peaks broaden and diminish in amplitude. Indeed, for NP seeds of 2 nm size, the IO has an fcc lattice and the RDF shows many well-defined peaks (view A). The first peak corresponds to the shortest repeating distance that is the pores' center-to-center interval or the size of a single pore. The second peak appears as a doublet as it corresponds to distances between two different lattice plane pairs of the fcc lattice, which are very close in magnitude. As the size of the Au seeds decorating the NP-decorated particles is increased to 5 nm (view B), approximately five peaks are still visible compared to the control, though their amplitude is significantly reduced, and the second doublet peak is no longer possible to resolve. For 12 nm seeds, only three clearly identifiable peaks remain (view C). The fact that the intensity of the peaks rapidly decays with distance indicates a reduction of the long-range order compared to the crystalline arrangement. In addition to the advantages of controlling the degree of disorder, in certain embodiments the homogeneity of the disordered structures produced by this approach facilitates a quantitative understanding of how deviations from order influence various aspects of catalysis and photocatalysis, in the absence of additional confounding factors. In certain embodiments, the templating colloid to NP size ratio defines the degree of order in the resulting system. When the size of the NP is at the level of ~0-2% of the templating colloids (typical size of the templating colloids used in the studied systems is in the 200-350 nm range) the system will preserve high degree of order (i.e. single domains with over 20 repeating units), 2-5% will result in intermediate degree of order (i.e. single domains of up to 10 repeating units), and for NPs with size larger than 5% will result in low degree of order (i.e typical single domains of five units and less).

3.2 Using Proto-Raspberry Particles to Control Disorder

Like metal NPs on the colloid surface, in certain embodiments, other species such as ions and surfactants present in the assembly solution can be used to perturb the self-organization process, providing a distinct or complementary route for controlling disorder. As described in Section 2.2, incorporating ions into the assembly solution can lead to rapid destabilization of the colloidal suspension due to changes in the ionic strength, while the use of sterically stabilized colloids allows for the formation of proto-raspberry particles and avoids this destabilization, in accordance with certain embodiments. Increased concentrations of such ions in the assembly mixture leads to a higher degree of disorder, the extent of which can be well controlled as described in embodiments herein.

Figure 30:
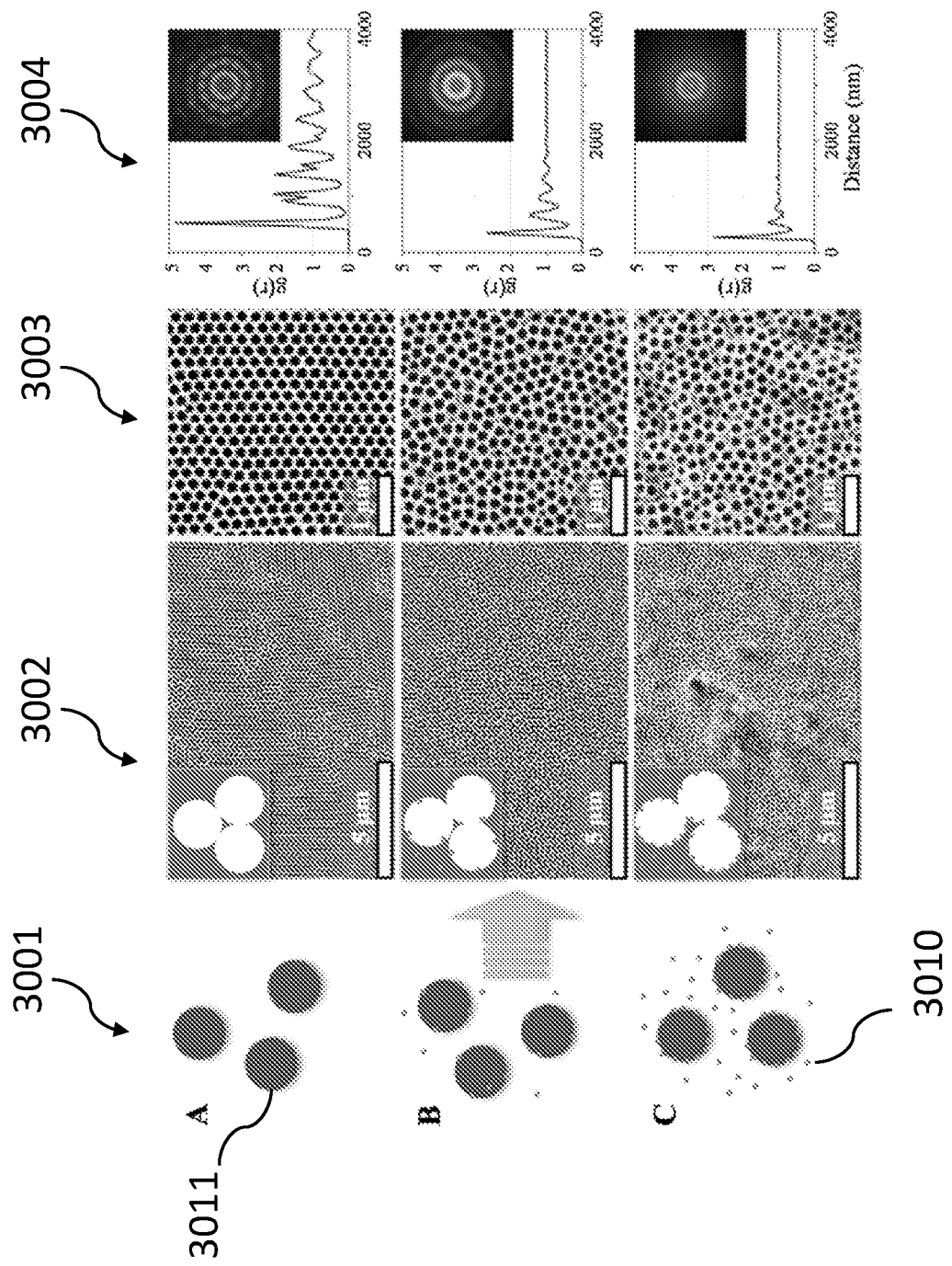
FIG. 30 is schematics and corresponding SEMs and FFT analysis of ion-induced controlled disorder in silica IOs using polyethylene glycol (PEG)-capped templating colloids and different concentrations of $Co(NO_3)_2$ in the assembly mixture, in accordance with certain embodiments.

FIG. 30 depicts ion-induced controlled disorder in silica IOs using polyethylene glycol (PEG)-capped templating colloids 3011 and different concentrations of $Co(NO_3)_2$ 3011 in the assembly mixture, according to certain embodiments. View (A) shows results for a concentration of 0 mM, view (B) shows results for a concentration of 0.64 mM (or 10 mol % with respect to the $SiO_2$ precursor in the assembly solution), and view (C) shows results for a concentration of 1.28 mM (or 20 mol % with respect to the $SiO_2$ precursor in the assembly solution), according to certain embodiments. For each of views A-C, the columns from left to right show a schematic of the assembly 3001, a large field of view SEM 3002 of the resulting IO with a schematic version in the inset, a zoom-in 803 to the SEM, and RDFs and fast Fourier transforms (FFTs, insets) 3004 calculated from the large field of view SEM images.

As shown in FIG. 30, when the concentration of $Co(NO_3)_2$ 3010 in the assembly mixture increases from 0 mol % with respect to the $SiO_2$ precursor in the assembly solution (FIG. 30 view A) to 10 mol % (FIG. 30 view B), and to 20 mol % (FIG. 30 view C), the degree of order is progressively reduced, as characterized by broadening and loss of intensity of the peaks in the RDF plots in 3004. This increase in disorder is attributed to the growth of negatively charged silica on the cationic clusters, leading to increased polydispersity of the colloids and reduced stabilization by the ligands, as well as to electrostatic screening and possible flocculation events resulting from the metal ions complexation with ligands exposed on different colloids. This behavior is demonstrated for PVP- and PEG-coated colloids, which are stabilized by both steric and electrostatic interactions. In contrast, while colloids capped with carboxylate, sulfonate, and amine groups can also produce disorder in certain embodiments, the degree of disorder is not dependent on the loading of metal ion and cannot be tailored. For such non-sterically stabilized colloids, in certain embodiments electrostatic shielding by the metal cations can induce an order/disorder dichotomy rather than a tunable gradient.

In some embodiments, the approach described herein allows decoupling between the structure and the composition of IOs in a modular fashion. In certain embodiments, The ions can be incorporated within the final IO, and in other embodiments they can be employed solely as structuring agents and removed prior to calcination. For example, polar organic solvents such as isopropanol can dissolve cobalt salts from the assembled structures prior to calcination, resulting in pure silica IOs with a desired degree of order. In certain embodiments, the dissolution is only partial resulting in a matrix with specific degree of "doping". In other embodiments, specific ions can be deposited (instead of removed) within the structure prior to calcination. All these affect the chemical nature of the matrix-pore and matrix-NP interfaces of the catalyst and therefore influence its properties.

In addition to the aspects already discussed, modular control over the material, size, and surface chemistry of NPs and colloids, as was shown for example in FIG. 9, can create higher-order compartmentalization of catalytic regions within the structure. In particular and for example, two populations of same-size colloids, modified with different NPs that have different association properties, for example due to specific interactions between the colloids, can lead to the formation of domains featuring distinct reactivities in accordance with certain embodiments. In certain embodiments, this provides an additional hierarchical level of control for specifying reaction coupling, mass transport, and heat transport and dissipation. In certain embodiments, choosing NP-decorated particles with differently sized colloids and different NPs can enable different reactions to occur in specifically designed pore sizes. As an example, a person skilled in the art can anticipate that, in analogy with size exclusion chromatography, selectivity can be achieved in e.g., oxidation, reduction (e.g., hydrogenation or hydrogenolysis), cracking reactions, among the components of a mixture of bigger and smaller size polymeric or oligomeric molecules—natural or synthetic—containing same or similar reactive groups. Additionally, the size of individual pores and interconnectivities influence the time interval during which the reactants reside in a specific chemical microenvironment and/or in proximity to catalytic centers. Therefore, in certain embodiments, the pore size and interconnectivities can be used to enhance selectivity toward specific products by the means of size exclusion/allowance or preferential residence in a predetermined microenvironment.

4. Co-Assembly of NP-Decorated Particles with Diverse Transition Metal Oxide Precursors In the examples of catalytic IO architectures presented above, the matrix material is, for example, amorphous silica, which can provide an inert, stable structural scaffold. In certain embodiments metal oxides (MOx) other than silica, in particular in combination with catalytic NPs and other techniques discussed above and below, can introduce capabilities to create composite architectures by performing such functions as adsorbing reacting species, participating directly in the redox chemistry, influencing the mechanical and thermal stabilities, and tuning their optical properties.

4.1 Synthesis of IOs Using Transition Metal Oxides

Figure 31:
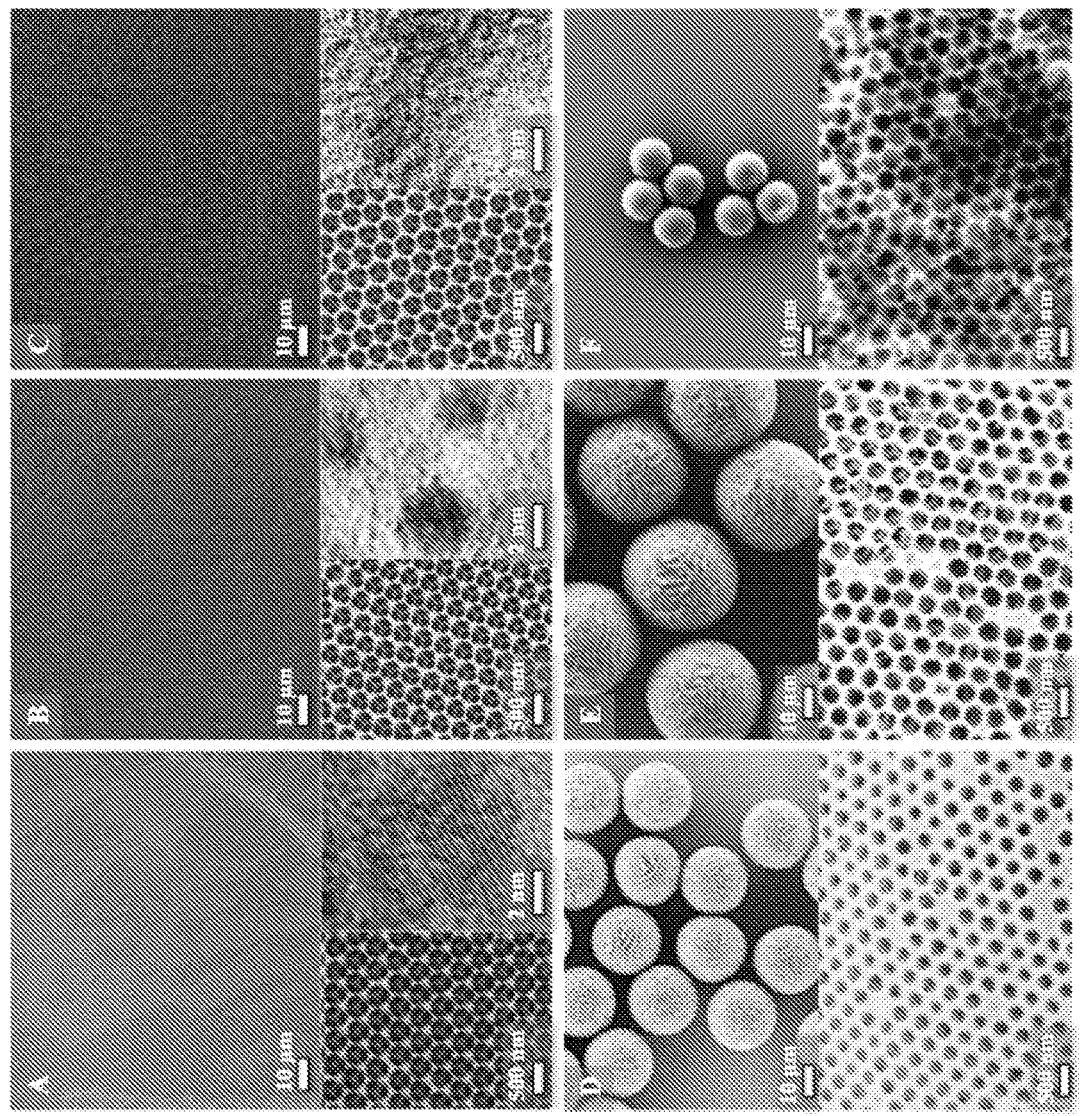
FIG. 31 is pictorial examples of materials prepared using the templating approach shown in FIG. 2 out of different metal oxides ($MO_x$) in the thin film and photonic ball (PB) formats, in accordance with certain embodiments.

The formation of high-quality IOs employing sol-gel-based transition MOx precursors can be challenging, as densification during hydrolysis, drying, and calcination can produce cracked structures. The synthetic approach described in certain embodiments herein uses precursors with both nanocrystalline and amorphous phases, which achieve a balance of viscoelastic forces and minimal volume shrinkage during EISA. Methods developed to assemble high-quality IO materials in both film and PB formats using a variety of transition metal oxides are discussed in certain embodiments herein. In certain embodiments, examples of such metal oxides include titania, alumina, and zirconia structures, as shown in FIG. 31. IO architectures with macroscopically crack-free, ordered domains are important for photocatalytic applications, especially those that rely on photonic enhancement provided by slow light. High-quality structures can also offer an excellent testbed to elucidate the roles of complex factors contributing to catalysis, such as diffusion and heat dissipation, as they allow the number of variables to be minimized and systematically compared between different systems with well-defined properties.

FIG. 31 shows IOs made of different metal oxide (MOx) materials in the thin film and photonic ball (PB) formats. Views A-C show electron microscopy images of the film IOs of titania (view A), alumina (view B), and zirconia (view C). The top row 3110 of views A-C shows SEM images in low-magnification, showing large-area, crack-free films in accordance with certain embodiments. The bottom images 3120 of views A-C show magnified SEMs of the pore structure on the left and TEM images of the respective nanocrystal precursors on the right. Views D-F show SEM images of a group of PBs (top row 3130) and the magnified view of their porous network (bottom row 3140) made of silica (view D), titania (view E), and alumina (view F).

Figure 32:
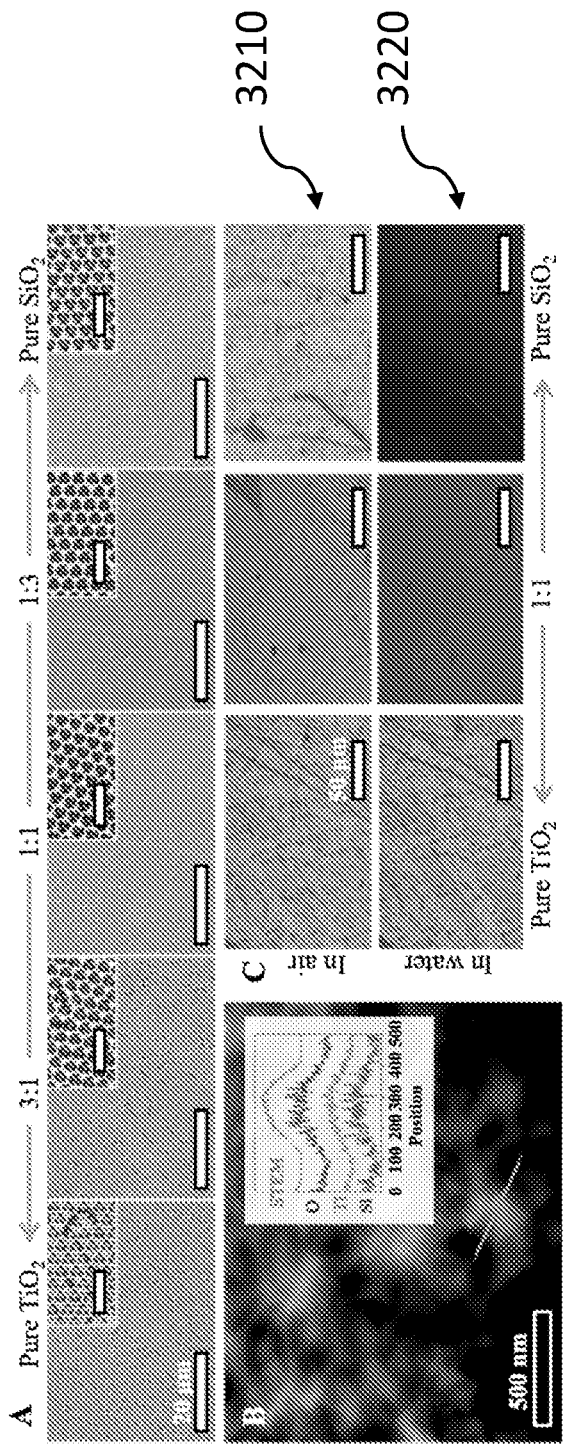
FIG. 32 is SEM, STEM and micrograph images of hybrid silica-titania inverse opals, in accordance with certain embodiments.

In addition to single MOx compositions, the physical and chemical properties of the architectures can be further tailored by incorporating multiple MOx materials simultaneously in certain embodiments. For example, in certain embodiments, hybrid silica-titania samples can be fabricated by pre-hydrolyzing silica and titania precursors individually before adding them to the colloids and performing co-assembly, allowing the relative kinetics of the matrix precursor sol-to-gel transition and EISA to be taken into account (FIG. 32). FIG. 32 shows hybrid silica-titania inverse opals. View (A) shows SEM images of different mixtures (ratio is the molar ratio of the titania to silica precursors), showing that increasing silica content leads to films with higher uniformity (scale bars 20 μm). Insets show higher magnification SEM images with scale bars of 500 nm. View (B) shows a STEM image (scale bar 500 nm) of a silica-titania hybrid 10. The inset shows X-ray spectroscopy EDS scans for different elements (0, Ti, Si) taken along the line indicated in the STEM image. View (C) shows optical micrographs (scale bars 50 μm) comparing the color of IOs of pure silica, titania, and silica-titania hybrid in air (top row 3210) and infiltrated with water (bottom row 3220). The titania and silica phases are dispersed uniformly throughout the matrix in nanodomains, as shown in the compositional analysis performed by energy dispersive X-ray spectroscopy (EDS) line scanning and scanning transmission electron microscopy (STEM) imaging (FIG. 32 view B). An advantage of the synthetic strategy described in certain embodiments herein for producing hybrid background matrices is that crack-free IOs are formed when the assembly contains at least 25 mol % of silica precursors that provide structural integrity to the assembled hybrid material, which is otherwise not achievable with sol-gel synthesis of titania alone, as the less reactive silica precursors temper the more reactive titania precursors.

In certain embodiments, different combinations of matrix materials and NPs enable the tuning of properties, including photo-induced charge separation and recombination, thermal expansion, heat transfer, and mechanical response in order to enhance a variety of catalyzed chemical reactions. For example, control over the refractive index (RI) in silica-titania hybrids in the range spanning from that of silica (RI~1.4) to that of titania in the anatase form (RI~2.4) is obtained in certain embodiments by varying the relative concentrations of the two materials in the IO (FIG. 32 view A). The RI can influence several optical properties of relevance to photocatalysis, such as the position of the photonic bandgap, which in turn can influence the efficiency of light absorption as discussed briefly in sections, below. Moreover, in certain embodiments, the increased RI of the silica-titania hybrid matrix can provide the ability to retain optical contrast when infiltrated with a liquid (FIG. 32 view C), which can in certain embodiments be crucial for solution-phase photocatalysis (note that due to the negligible RI contrast between the pure silica matrix and most liquids, no, or highly suppressed, photonic properties can be observed in liquid media. For example, as shown in view C, $TiO_2$-containing IOs preserve their color when infiltrated with water due to the high contrast in RI between the matrix and the pores, in contrast, the color of $SiO_2$ IO disappears upon infiltration with water. Additionally, in certain embodiments the evenly dispersed silica phase can be selectively etched from the titania matrix, resulting in a two-tiered porosity in the remaining titania phase.

In certain embodiments, these synthetic strategies make it possible to combinatorially incorporate a broad range of NPs into IOs composed of either single or hybrid MOx matrix materials, creating a library of catalytic structures comprising various combinations, in both film and PB formats. Examples of titania and alumina films containing Au and Pt NPs are shown in FIG. 33, and an example of titania PBs with Au NPs is discussed in the next section.

Figure 33:
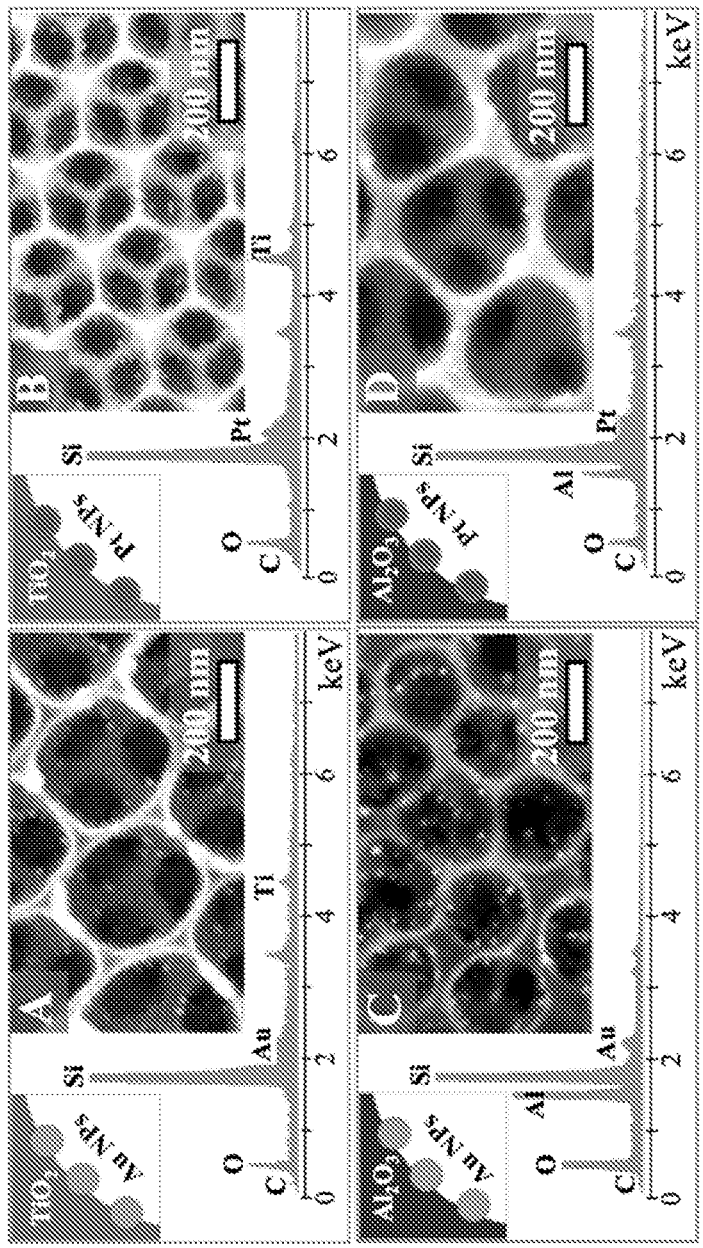
FIG. 33 is SEM images, EDS scans, and schematic illustrations of catalytic materials formed with different metal oxides, in accordance with certain embodiments.

FIG. 33 shows NP-decorated IO films formed with different metal oxides, in accordance with certain embodiments. Views A and B show titania films containing Au (view A) and Pt (view B) NPs. Views C and D show alumina films containing Au (view C) and Pt (view D) NPs. Each of views A-D, each contains a schematic of a pore section indicating the materials of the matrix and NPs (upper left corner of views A-D), an SEM of the films (upper right corner of views A-D), and EDS scans of the films (bottom of views A-D), to confirm the compositions of the different samples. In all cases, a strong silicon signal is observed in EDS due to the silicon substrate on which the IO was grown.

4.2 Modular Approach for the Design of NP Decorated Templating—Photocatalysts in the Form of Photonic Balls In certain embodiments, the many hierarchical degrees of freedom for customizing the catalytic material's architecture and composition disclosed herein can create a platform for the synthesis of highly sophisticated photocatalytic systems. At the macroscale, the spherical shape of PBs (FIG. 34 view A) for example is selected to make the photonic response independent of the illumination angle, which is important in certain embodiments for maintaining a continuous response when particles are, for example, free-floating, and therefore rotating, in solution. As discussed, in certain embodiments the pore shape and size, determined by the templating colloidal particles and calcination conditions, is selected to influence both the mass transport and the photonic effects. In certain embodiments, the composition of the background matrix can be selected to determine the photoactivity, catalytic properties, thermal and mechanical properties, as well as the RI and thus the strength and wavelength-dependence of the photonic effects. Indeed, FIG. 34 view B shows that an embodiment with PBs made with titania have greater photoactivity than the standard nanocrystalline titania photocatalyst P25 for a wide range of pore sizes. In certain embodiments the greater photoactivity can be attributed to an improved efficiency of light absorption through multiple scattering and the slow light effect as well as spatial confinement that prolongs the catalyst reactants interaction time. In certain embodiments, these parameters disclosed herein serve as a foundation for selecting various parameters that influence the catalytic activity.

Furthermore, these parameters provide a springboard for optimizing a wide range of photocatalytic reactions using customized photocatalytic IOs that contain functional metal NPs. In certain embodiments, incorporating metal NPs into photoactive materials is desirable, as they are able to provide numerous benefits in photocatalytic reactions. A motivation for their inclusion, for example, is to extend light absorption into the visible region. Many types of MOx, including titania, can be selected or avoided in certain embodiments because they are wide band gap semiconductors that can only absorb light in the UV region. Plasmonic metal NPs, such as gold or silver, can be selected in certain embodiments to circumvent this limitation as they are able to absorb visible light, generating "hot electrons" that can then be transferred to the MOx to promote oxidation/reduction reactions. This enhanced light absorption is particularly interesting for embodiments such as practical applications in which utilization of a large portion of the solar spectrum is crucial. A further advantage of metal NPs is that they themselves can be reactive, which can enhance photocatalysis occurring via the background matrix or allow new reactions to occur in conjunction with the background matrix in certain embodiments. In addition, plasmonic metal NPs are excellent light-to-heat converters and can be used in certain embodiments for processes requiring localized heating, effectively contributing thermal energy to the reaction. The NP-decorated templating method provides a natural route to incorporate such metal NPs into IOs with a photoactive background matrix, as shown for the case of titania in FIG. 34 views C and D. Any of these concepts can be chosen individually or in combination to achieve desired catalytic activity for particular applications.

Figure 34:
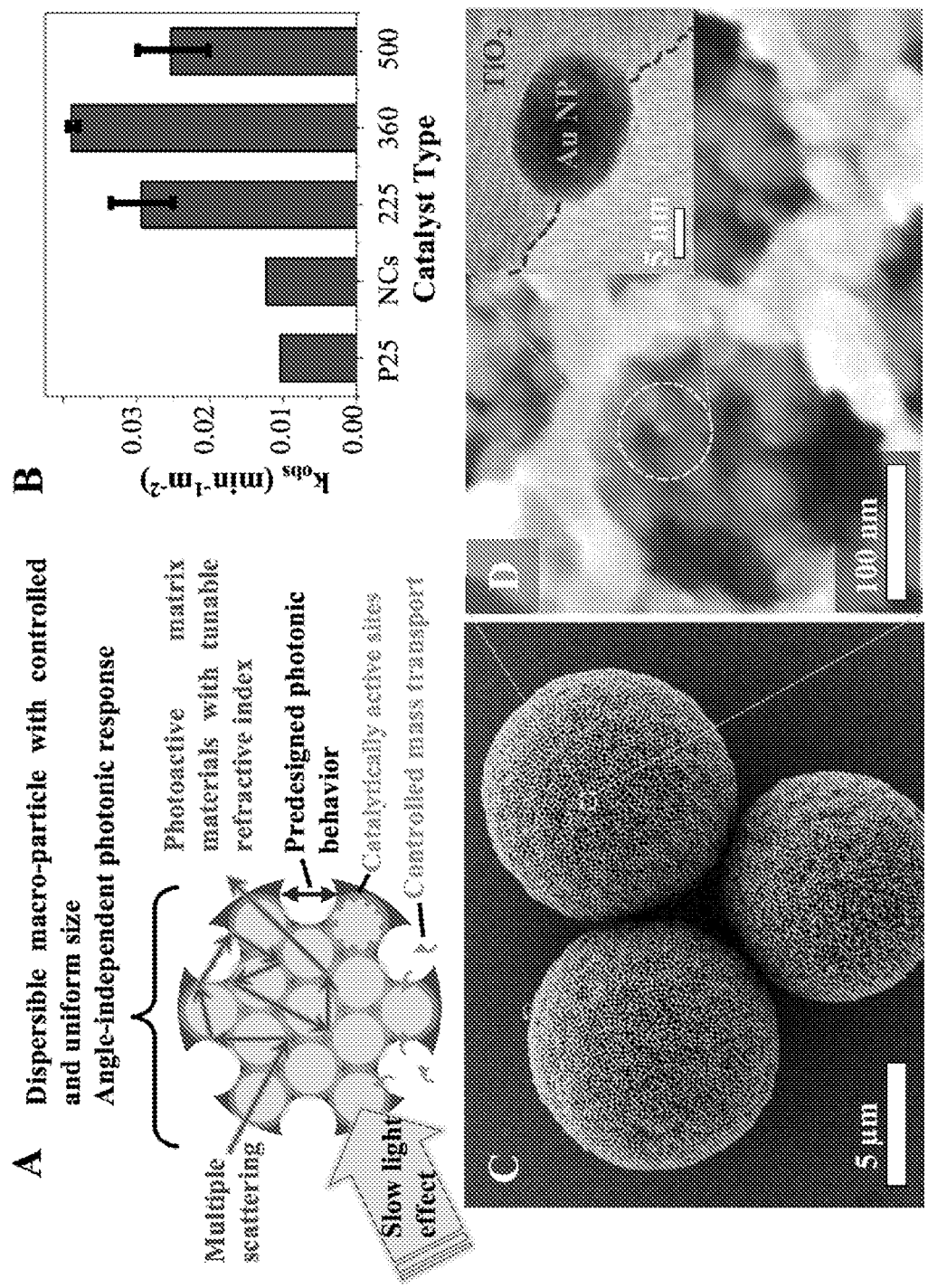
FIG. 34 is schematics (A), graph of surface area-standardized rate constants of decomposition of methylene blue (B), and SEM images (large field of view—C; high magnification view—D) of photocatalytic PBs prepared from titania and templated by platinum NP-decorated colloids, in accordance with certain embodiments. The inset of view D is a TEM image showing Pt NP partially embedded into titania wall in accordance with certain embodiments.

FIG. 34 shows photocatalysis with PBs templated by colloidal and NP-decorated particles. View (A) shows schematics indicating general principles and advantages of photocatalyst design using PBs, in accordance with certain embodiments. Uniformity in size of catalytic macro-particles leads to the efficient material use, uniform mass transport, and optical properties. In certain embodiments, the matrix can be chosen to be photoactive. In certain embodiments, the control over pore sizes and their periodicity results in the optimized fluid flow and optical properties such as the slow photon effect. In certain embodiments, the composition of metal nanoparticles and their placement dictate the efficiency of photocatalytic properties. View (B) shows experimentally measured and surface area-standardized rate constants of methylene blue degradation for titania PBs of different sizes (the pore diameter in nanometers as measured from SEM is indicated on the x-axis), as compared to commercial and synthesized titania nanocrystals, P25 and NCs, respectively. Errors are reported as standard deviations. The Y-axis is the observed rate constant extracted from the kinetic data. View (C) shows SEM images of titania PBs incorporating Au NPs. View (D) shows zoom-in SEM images to the indicated region showing a gold nanoparticle partially embedded predominantly in the titania matrix at the pore interface as demonstrated on the inset of the TEM image. As discussed above, partially entrenched particles are particularly stable, both structurally and thermally.

5. Post-Modification of the Catalytic Architectures

Figure 25:
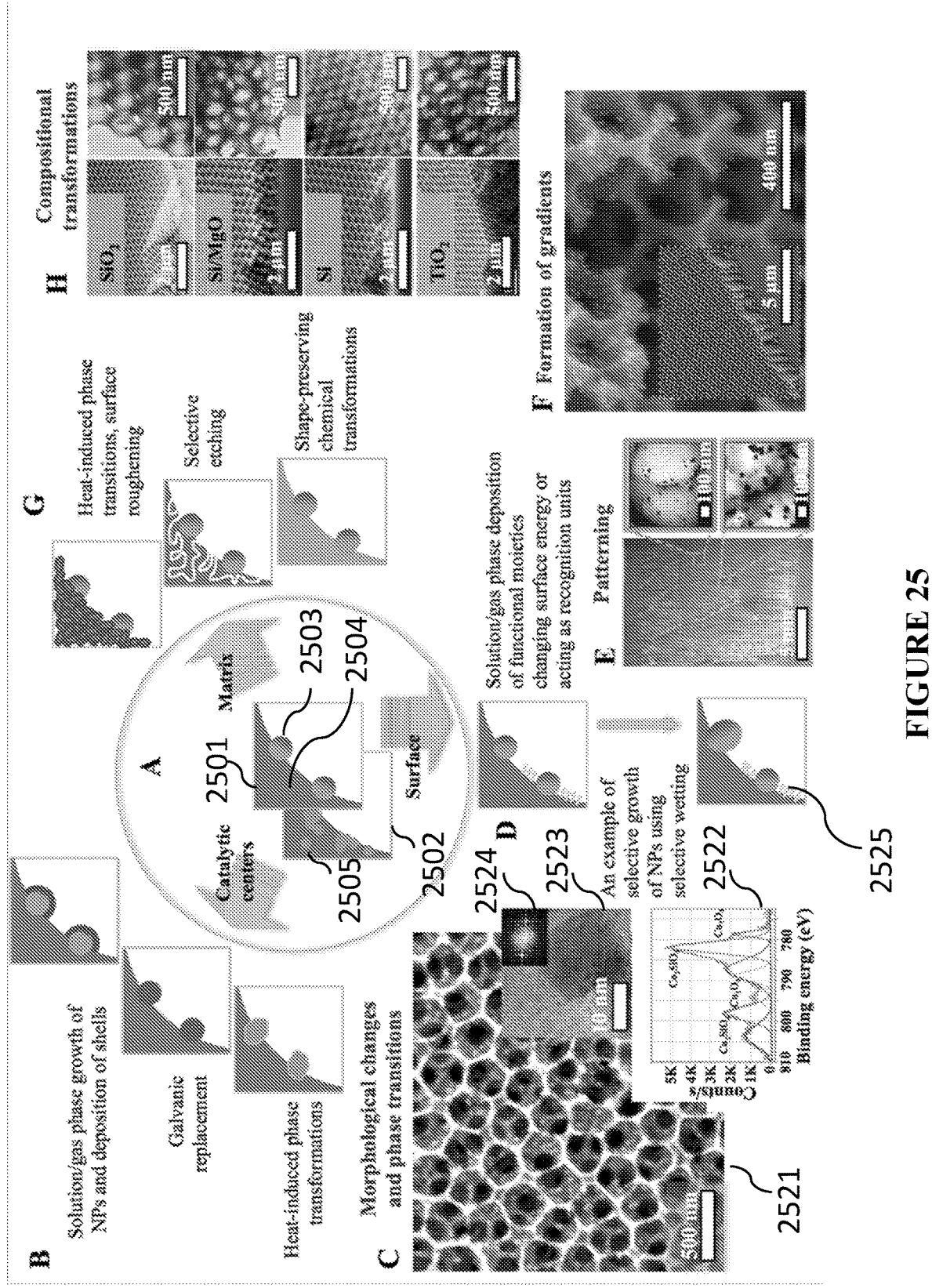
FIG. 25 shows a combination of various exemplary schematics and corresponding experimental data that depict different post-modification options for catalytic materials created by the templating approach shown in FIG. 2 in accordance with certain embodiments.

In certain embodiments, each of the designed templated catalytic structures can further serve as a basis for creating systematic libraries of catalytic materials by using post-modification strategies to introduce new matrix and metal compositions, as well as macroscopic patterns and gradients in reactivity and fluidic properties, as shown, for example, in FIG. 25. In certain embodiments, introducing post-modification strategies can enhance the degrees of freedom at all stages of fabrication by decoupling the requirements of the co-assembly process (i.e., choice of components used in the co-assembly process, the overall assembled architecture and positions of incorporated NPs) from the final composition and fine geometrical features of the templated catalytic structures.

FIG. 25 shows schematic and experimental data depicting different post-modification options for templated catalytic structures. View (A) schematically shows the matrix-pore interface formed by decorated templating particles (top right) 2501 and proto-raspberry (bottom left) 2502 templating. The circles 2503 in 2501 are metal nanoparticles, the circles in 2505 are ions, and the shaded upper left part (2504) in each of 2501 and 2502 is the background matrix. The arrows in view A point to examples of various post modification scenarios available for the catalytic systems. View (B) shows post-modification options for the NPs, according to certain embodiments, including solution/gas phase growth of NPs and deposition of shells, galvanic replacement, and heat-induced phase transformations. View (C) shows an experimental example of the heat-induced phase transformation schematically shown in view B (bottom image), according to certain embodiments, including an SEM 2521 of 20 mol % cobalt-silica IO after heat treatment at 900° C. and an XPS spectrum 2522 indicating formation of two cobalt species: $Co_3O_4$ and $Co_2SiO_4$. The inset shows a TEM 2523 of a $Co_3O_4$ nanocrystal embedded into the wall of the IO with a characteristic lattice spacing of ~0.246 nm (confirmed by FFT 2524). View (D) shows schematic depiction of patterned surface modifications, according to certain embodiments. The lines 2525 represent chemical functionalization of the pore surface in selected regions, allowing for localized wetting by the growth solution and patterned growth of NPs upon infiltration. View (E) shows experimental demonstration of selective particle growth schematically shown in view (D), showing an optical image of a patterned Au NP-containing silica IO with locally grown Au NP upon infiltration with Au growth solution (the area with additionally grown particles appears in a darker color compared to the unchanged areas that were post-functionalized with hydrophobic ligands), according to certain embodiments. The difference in NP sizes in the different regions is seen in the TEM images taken from the corresponding regions. View (F) shows SEM image of vertical gradients in particle size, with progressively smaller NPs going from top down due to a slow diffusion of the growth solution relative to the reduction kinetics. View (G) shows schematic depiction of post-modifications that are available to the matrix including heat-induced phase transition, selective etching, and shape preserving chemical transformation. View (H) shows experimental example of the shape-preserving chemical transformation shown in view (G). SEM (left column) and TEM (right column) images of the original silica IO (top) and the materials into which it is reactively transformed, according to certain embodiments.

5.1 Post-Modification of Catalytic Centers

In certain embodiments, the size, morphology, and composition of the incorporated NPs can be modified in a controlled way using post-modification techniques. In certain embodiments, the NPs can be further grown via liquid phase reactions, ALD, or CVD to produce larger particles of a monometallic or multimetallic composition with a core-shell or homogeneous structure (FIG. 25 view B). In certain embodiments, this is achieved when the growth conditions are chosen such that the rate of metal deposition on the NP exceeds its deposition on the background matrix material. The NPs can also be modified by subtractive or material exchange techniques such as oxidative etching and galvanic replacement, according to certain embodiments.

The size of the NPs on NP-decorated colloids can be selected to have a pronounced effect on the colloidal assembly, determining whether the final IO will have a highly ordered crystalline structure or random distribution of pores as discussed in Section 3. The ability to modify the size and composition of the NPs after the assembly step allows the formation of NPs with specific catalytic and structural properties to be decoupled from the co-assembly process, in accordance with certain embodiments. In certain embodiments, this can provide the opportunity to achieve a controlled degree of order by, for example, using templating colloidal particles decorated with small NPs, and subsequently growing the NPs to the desired size.

In the case of proto-raspberries, the incorporated ionic species can also be tailored after the co-assembly in certain embodiments, likewise decoupling their catalytic activity, distribution, crystallinity and particle size from their influence on the architecture. Specifically, in some embodiments heat treatment can induce phase transitions of the catalytic centers distributed at the pore surface. For example, calcination at 900° C. results in formation of crystalline cobalt oxide NPs embedded at the pore surface of the silica matrix as shown in view C. In certain embodiments, the ions preferentially diffuse to the pore interface where, upon contact with air, they are deposited as cobalt oxide nanocrystals. An SEM 2521 of the resulting IO post heat treatment is shown in view C, together with a TEM 2523, FFT 2524, and XPS 2522 of a representative nanocrystal. The lattice spacing, as observed directly and confirmed by FFT analysis, is 2.5 Å corresponding to $Co_3O_4$. XPS surface analysis indicated the presence of cobalt in two oxidation states (II and III, view C). The Co 2p peaks at 779 and 789 eV are evidence of Co', in agreement with measurements of a control sample of pure $Co_3O_4$. The strong peaks at 782 eV and 798 eV with their corresponding satellites confirm the presence of tetrahedral Co' in $Co_2SiO_4$ form.

5.2 Chemical Post-Modification of the Pore Surface

In certain embodiments, different chemical functional groups can be bound to the pore surface of an IO, leading to designed surface energetics or to specific binding of reactive species, tailoring the liquid infiltration and motion throughout the architecture, or the kinetics and specificity of the reactions, respectively (FIG. 25 view D). In certain embodiments, patterns of wettability and catalytic activity, both horizontally across the IO (FIG. 25 view E) and vertically through its depth (FIG. 25 view F), can be achieved by chemical functionalization, allowing the design of systems with controlled fluidics and prescribed region-dependent catalytic properties of the IOs. In certain embodiments, gradients in wettability can also enable patterned post-modification of the NPs by creating selective regions in which growth solutions can percolate into the porous network. Such gradients can be valuable for the creation of macroscopic catalytic systems with multiple reactions running in parallel or in series, as well as for microfluidic and lab-on-a-chip devices.

5.3 Post-Modifications of the Matrix Material

In certain embodiments, post-modifications of the background matrix composition, crystallinity, roughness, and porosity provide additional degrees of freedom for designing the functional scope of the IOs (FIG. 25 view G). These modifications can be realized using such methods as heat treatment, selective deposition, selective etching, and shape-preserving chemical transformations, according to certain embodiments. For example, thermal treatment of a titania IO can be used in certain embodiments to adjust the crystallite size and therefore surface roughness, as well as the material phase (including amorphous, anatase, or rutile). Selective etching of certain components within a multi-material background matrix of an IO can be used in certain embodiments to offer a route to designing IOs with hierarchical porosity, to removing impurities, or to simplifying the synthetic complexity wherein one material is used as a structuring agent while the other is of catalytic or another practical importance, such as in the case of the hybrid silica-titania IOs or ion incorporation into a silica matrix, as described above.

In certain embodiments, another opportunity for matrix modification is the use of shape-preserving chemical transformations from a material for which co-assembly is well established, to another for which the fabrication process is impractical (e.g., due to high cost) or elusive (e.g., due to lack of available precursors). Redox and ion exchange reactions can be employed in certain embodiments to transform 3D silica architectures with micron and sub-micron features into numerous other materials (FIG. 25 view H), including porous silicon, magnesium oxide (MgO), titania, titanium oxyfluoride ($TiOF_2$) among many others. For example, $TiOF_2$ replicas of biologically produced frustules of silica diatoms can be employed in certain embodiments for catalysis. Likewise, Si can be employed in certain embodiments as a photocathode either by itself or in conjunction with other materials. In this context, microscopic structuration of Si brings the Si surface close to the location of light absorption, minimizing the common issue of recombination of light-generated electron/hole pairs in bulk Si before they are able to reach the reactive surface.

6. Modification of Macroscopic Industrially Relevant Substrates

Porous materials are used in a wide variety of scientific and engineering applications. Specific combinations of pore size, geometry, interconnectivity, and chemical character of their surfaces define the unique properties of porous materials. According to the International Union of Pure and Applied Chemistry (IUPAC) classification, materials with pores smaller than 2 nm are defined as microporous; materials with pores between 2 and 50 nm are mesoporous; and materials with pores larger than 50 nm are macroporous. Micropores and mesopores can be used to obtain high surface area within a material, while mesopores and macropores can reduce tortuosity and facilitate mass transport within or through the material. Porous materials with both high surface area and facile diffusion are required for various applications. However, their fabrication remains challenging.

The design and fabrication of hierarchically organized porous materials that contain pores on multiple length scales, from sub-nanometer to millimeter, is of high interest for a wide range of applications including sorption, separation, energy conversion and storage, catalysis, sensing, electronics, construction, drug delivery, and tissue engineering. Such materials can include a wide range of pore sizes, for example nanometers, tens of nanometers, hundreds nanometers, micrometers, tens of micrometers, and/or hundreds of micrometers. Industrially important devices, such as catalytic converters and supports, filters, membranes, reactors, foams, and certain types of batteries, fuel cells, and photovoltaic cells frequently rely on macroscopic porous monolithic structures (also referred to herein as "monoliths"). Porous monoliths, for example used in flow-through catalytic or separation systems, demonstrate lower backpressure, higher permeability and better performance as compared to packed beds. In addition, porous monoliths exhibit high mechanical, chemical and thermal stability. Utilization of monoliths, in many cases, requires their modification.

To increase the surface area of, and/or incorporate functional materials (e.g. metal or metal-oxide nanoparticles) into a macroporous monolith, its surface is can be modified with nano-structured or micro-structured coatings. Such modified monoliths are often more efficient and cost-effective compared to other porous formats such as powders or pellets. Methods for modification of monolithic surfaces can include wash-coat, impregnation, deposition of metal oxide nanoparticles, and growth of carbon nanofibers. Methods for modifying monoliths suffer from substantial drawbacks, including: 1) poor ability to produce rationally designed systems with well-defined structural, compositional, and geometrical features, including porosity, homogeneity, and degree of order, and 2) poor control over incorporation of functional components, such as, e.g., metal nanoparticles, in terms of their placement, geometry, and composition.

In certain embodiments, the ability to rationally design complex porous functional materials, such as catalytic supports, through modeling and estimation of their physical properties and reactivity, is highly desirable for the development and optimization of practical systems. Despite their potential advantages, the fabrication of hierarchically structured macroscopic monolithic materials with simultaneous control over their composition and multimodal porosity is challenging.

In certain embodiments, colloid-based porous materials (CBPMs) present many advantages in terms of controllability over their composition and porosity (including, but not limited to, micro-pores, meso-pores, and macro-pores). In addition, in certain embodiments, fabrication of CBPMs allows to tailor the functional properties of the porous materials, through the choice of matrix materials (e.g., silica, titania, alumina, mixtures thereof, etc.) using sol-gel processes or nanocrystalline precursors, and through incorporation of additional components (e.g., functional nanoparticles).

According to certain embodiments of the current disclosure, the catalytically active species, and/or other functional components, can be independently chosen and controllably incorporated in the desired amount and location within the porous structure. Moreover, the modularity of the porous structures obtained using the method described in embodiments herein allows incorporation of multiple types of functional components, thus allowing rational design of complex catalytic (or other functional) systems.

In certain embodiments, formation of CBPMs is generally driven by self-organization of sub-micrometer polymeric colloids, filling the voids between the colloidal particles using a matrix precursor material, and subsequent removal of the particles results in the formation of interconnected porous structures. Formation of CBPM can be performed in a stepwise fashion, through backfilling of preassembled colloidal films, or through a co-assembly of colloids and a matrix precursor material in a single step. CBPMs are often produced in the form of thin films on flat substrates, bulk, or powders, which are of limited practical use in applications such as catalysis and filtration. Moreover, fabrication of CBPM-based materials on industrially relevant size-scales is often not practical since the process is time consuming and expensive, and the resulting structures are of moderate mechanical robustness.

Methods for the formation of CBPM films through a co-assembly approach allow fabrication of films on mainly flat and smooth substrates. In certain embodiments, these methods are not efficient for producing porous films within three-dimensional networks of macroscopically porous monoliths, due to the presence of such factors as geometrical constraints, surface tension of the colloidal dispersion, capillary forces, heterogeneity of surface energy, and roughness of the substrate. As a result, porous coatings either fail to grow, or "cap" the pore openings of the underlying porous substrate.

In accordance with certain embodiments, a method of preparing a hierarchically porous material involves providing a porous macroscopic monolithic substrate having a first porosity with a first average pore size. A co-assembly mixture comprising NP-decorated templated material colloidal particles and a matrix precursor material is applied to the pores of the porous monolithic substrate. The NP-decorated template material is removed, so as to form a catalytic-templated porous coating (CTPC) within the porous monolithic substrate. The CTPC can have a second porosity with a second average pore size that is smaller than the first average pore size. The removal of an interconnected templating component provides a network of interconnected pores. The removal of the templating colloidal particles can be performed via heat treatment, solvent dissolution and/or etching.

Embodiments of the present disclosure include fabrication of macroscopic hierarchically porous hybrid materials supported on macroscopic porous substrates, also referred to as monoliths, which contain a wide range of pore sizes from nanometers to millimeters, by modifying porous monoliths with templating sacrificial material, (also referred to herein as "colloids") to form catalytic-templated porous coatings (CTPCs) using a co-assembly approach. The resulting structures combine the benefits of large size (e.g., centimeter-scale and above) macroscopically porous materials with the advantages afforded by CBPMs. These include high surface area, interconnected porosity, well-defined architecture, controlled composition, facile fluid flow within the porous structure, and mechanical robustness of the overall hybrid architecture as compared to pure CBPM systems.

In certain embodiments, the porous monolithic substrate can be a ceramic, such as cordierite, and/or includes at least one of Mullite, zeolite, natural clay, and synthetic clay.

In certain embodiments, the porous monolithic substrate comprises at least one of a metal and a metal alloy, examples of which include stainless steel, ferritic steel (e.g., an iron-chromium alloy), austenitic steel (a chromium-nickel alloy), copper, nickel, brass, gold, silver, titanium, tungsten, aluminum, palladium, and platinum.

In certain embodiments, the porous monolithic substrate comprises at least one of a metal salt and a metal oxide, examples of which include silica, alumina, iron oxide, zinc oxide, tin oxide, alumina silicates, aluminum titanate, beryllia, noble metal oxide, platinum group metal oxide, titania, zirconia, hafnia, molybdenum oxide, tungsten oxide, rhenium oxide, tantalum oxide, niobium oxide, vanadium oxide, chromium oxide, scandium oxide, yttria, lanthanum oxide, ceria, thorium oxide, uranium oxide, and rare earth oxide.

In certain embodiments, the porous monolithic substrate comprises a combination of composite metal and metal oxide, such as cermet.

In certain embodiments, the porous monolithic substrate comprises a polymer, such as polyurethane, and/or comprises at least one of: polystyrene, poly(methyl methacrylate), polyacrylate, polyalkylacrylate, substituted polyalkylacrylate, polystyrene, poly(divinylbenzene), polyvinylpyrrolidone, poly(vinyl alcohol), polyacrylamide, poly(ethylene oxide), polyvinyl chloride, polyvinylidene fluoride, polytetrafluoroethylene, other halogenated polymers, hydrogels, organogels, chitin, chitosan, random and block copolymers, branched, star and dendritic polymers, and supramolecular polymer.

In certain embodiments, the porous monolithic substrate comprises a semiconductor, including at least one of: silicon carbide, silicon, germanium, tin, silicon doped with a group III element, silicon doped with a group V element, germanium doped with a group III element, germanium doped with a group V element, tin doped with a group III element, tin doped with a group V element, and a transition metal oxide.

In still other embodiments, the porous monolithic substrate is conducting.

In certain embodiments, the porous monolithic substrate comprises a natural material, for example including at least one of cellulose, natural rubber (e.g. latex), wool, cotton, silk, linen, hemp, flax, and feather fiber.

In certain embodiments, the CTPC includes at least one of: an oxide, a metal, a semiconductor, a metal sulfide, a metal chalcogenide, a metal nitride, a metal pnictide, an organometallic compound, an organic material, a natural material, a polymer, and a combination thereof.

In certain embodiments, the CTPC includes at least one of: silica, alumina, titania, zircoma, ceria, hafnia, vanadia, beryllia, noble metal oxides, platinum group metal oxides, titania, tin oxide, molybdenum oxide, tungsten oxide, rhenium oxide, tantalum oxide, niobium oxide, chromium oxide, scandium oxide, yttria, lanthanum oxide, thorium oxide, uranium oxide, and rare earth oxide.

In certain embodiments, the method also includes pretreating the porous monolithic substrate prior to the formation of the CTPC. The pretreating can comprise applying an adhesion-promoting agent to the porous monolithic substrate, and/or activating a surface of the porous monolithic substrate.

In certain embodiments, the co-assembly mixture further comprises a functional component. For example, the functional component can comprise at least one of: metal nanoparticles, metal alloy nanoparticles, semiconductor nanoparticles, metal oxide nanoparticles, mixed metal oxide nanoparticles, metal sulfide nanoparticles, and a combination thereof. In some embodiments, the functional component is a biologically derived material, such as an enzyme or a protein.

In certain embodiments, the co-assembly mixture further comprises nanoparticles, which can include, for example, at least one of: metal nanoparticles, metal alloy nanoparticles, semiconductor nanoparticles, metal oxide nanoparticles, mixed metal oxide nanoparticles, metal sulfide nanoparticles, and a combination thereof. In some embodiments, the nanoparticles are introduced by decorating templating materials with functional nanoparticles prior to applying the co-assembly mixture. In other embodiments, the nanoparticles are introduced during at least one of: the applying the co-assembly mixture; and a subsequent modification of the CTPC.

In certain embodiments, the co-assembly mixture further comprises a metal salt.

In certain embodiments, the co-assembly mixture further comprises a complex salt with at least one of: an alkali metal, an alkali-earth metal, a group (III) metal, and a transition metal salt.

In certain embodiments, the co-assembly mixture further comprises a biological material.

In certain embodiments, the matrix precursor material includes a sol-gel precursor.

In certain embodiments, the templating material is colloidal particles that include at least one of: a polymeric colloid, a biopolymer colloid, an organometallic compound, a supramolecular self-assembled colloid, and a combination thereof. In other embodiments, the colloidal particles include at least one of: a random copolymer, a block copolymer, a branched polymer, a star polymer, a dendritic polymer, a supramolecular polymer, and a combination thereof. In still other embodiments, the colloidal particles include at least one of: a metal organic framework, an inorganic polymer, an organometallic complex, and a combination thereof. In still other embodiments, the colloidal particles include at least one of: polymeric fiber, biopolymer fiber, fiber with organometallic composition, supramolecular self-assembled fiber, and a combination thereof. In still other embodiments, the colloidal particles include at least one of spherical particles, elongated particles, concave particles, amorphous particles, faceted particles, and a combination thereof.

In certain embodiments, the method further comprises modifying the CTPC with a functional component.

In certain embodiments, the hierarchically porous material can be useful in the context of sensors, photocatalysis, photocatalytic degradation of gas and liquid phase pollutants, coherent scattering media, light emitters, random lasing, or other optical applications, such as smart displays or other electrochromic materials, the preparation of cosmetic products, the preparation of pharmaceutical and edible products, drug delivery, fluidic devices, tissue engineering, membranes, filtration, sorption/desorption, support media, as a catalytic medium or support, catalytic reactions, such as oxidation, hydrogenation, dehydrogenation, hydration, dehydration, isomerization, oxidative coupling, dehydrogenative coupling, hydrosilylation, amination, hydroamination, C—H activation, insertion reactions, decomposition, redox reactions, or polymerization/depolymerization, selective catalytic reactions, energy storage, batteries, or fuel cells, acoustic devices, and/or the fabrication of patterned structures.

In certain embodiments, the hierarchically porous material can be utilized for multiple catalytic reactions within the same structures, such that activation of cascades or multistep catalytic reactions can be achieved.

In certain embodiments, a hierarchically porous material comprises a three-dimensional macroporous substrate having a first porosity of 10 micrometers to 1 centimeter, and comprising a network of interconnected pores that extends throughout the thickness; and a porous film deposited on at least 30% of the combined surface area of the pores of the macroporous substrate, the porous film having a thickness of between 50 nanometers and 500 micrometers, and a second porosity of between 0.5 nanometers and 2 micrometers. The macroporous substrate can comprise a ceramic, such as cordierite. In some embodiments, the macroporous substrate comprises at least one of: metal, metal alloy, metal salt, metal oxide, semiconductor, synthetic polymer, biopolymer, and natural material.

In certain embodiments, the porous film comprises one of an oxide, a metal, a semiconductor, a metal sulfide, a metal chalcogenide, a metal nitride, a metal pnictide, an organometallic compound, an organic material, a natural material, a polymer, and a combination thereof. In other embodiments, the porous film comprises one of silica, alumina, titania, zirconia, ceria, hafnia, vanadia, beryllia, noble metal oxides, platinum group metal oxides, titania, tin oxide, molybdenum oxide, tungsten oxide, rhenium oxide, tantalum oxide, niobium oxide, chromium oxide, scandium oxide, yttria, lanthanum oxide, thorium oxide, uranium oxide, other rare earth oxides, and a combination thereof.

In some embodiments, the hierarchically porous material further comprises a functional component, which may comprise one of: a metal cation, a metal salt, a metal oxide, and an organometallic complex. In some embodiments, the functional component is a nanoparticle. In some embodiments, the functional component is a biologically derived material, such as an enzyme or a protein.

In certain embodiments, the functional components are introduced by decorating templating materials with the nanoparticles prior to the applying the co-assembly mixture. In other embodiments, the functional components are introduced during at least one of: the applying the co-assembly mixture; and a subsequent modification of CTPC.

In certain embodiments, the hierarchically porous material exhibits catalytic activity. The catalytic activity can include the formation of one of: methanol and ammonia; the oxidation of at least one of: volatile organic compounds and carbon monoxide; redox reactions of nitrogen oxides; the oxidation of sulfur oxides; the decomposition of particulates and microbiological particles such as bacteria, viruses, dust mite allergens, mold, and fungus spores; and the decomposition of ozone.

In certain embodiments, a sensor comprises a hierarchically porous material. The hierarchically porous material can include: three-dimensional macroporous substrate with a first porosity of 10 micrometers to 1 centimeter, and comprising a network of interconnected pores that extends throughout the thickness; and a porous film deposited on at least 30% of the combined surface area of the pores of the macroporous substrate, the porous film having a thickness of between 50 nanometers and 500 micrometers, and a second porosity of between 0.5 nanometers and 2 micrometers.

In certain embodiments, the a filtration membrane comprises: hierarchically porous material that includes: a three-dimensional macroporous substrate having a first porosity of 10 micrometers to 1 centimeter, and comprising a network of interconnected pores that extends throughout the thickness; and a porous film deposited on at least 30% of the combined surface area of the pores of the macroporous substrate, the porous film having a thickness of between 50 nanometers and 500 micrometers, and a second porosity of between 0.5 nanometers and 2 micrometers.

6.1. Fabrication of Macroscopic Hierarchically Porous Hybrid Materials

According to methods described herein, the mixture for co-assembly of CTPC can combine a templating material (e.g., colloidal particles), matrix precursors, and additional ingredients as described in certain embodiments below.

According to methods described in certain embodiments herein, successful application of CTPCs onto macroscopically porous monoliths can be facilitated by one or more of: (1) surface activation of the porous substrate monolith (e.g., through exposure of the porous substrate monolith to high temperature, and/or etchants, and/or plasma); (2) surface modification with a binding agent; and (3) addition of a surfactant, and/or a dispersant, and/or a liquid miscible with the co-assembly mixture in order to effectively lower the surface tension of the mixture and/or enhance its stability towards specific ingredients and/or deposition conditions and result in CTPCs with improved homogeneity.

In certain embodiments, methods described herein include formation of coatings through co-assembly in solution, evaporation of the solvent, and/or passing a co-assembly mixture through the substrate.

In certain embodiments, methods described herein include pretreatment with such etchants as acids, bases, and oxidizers (e.g., hydrogen peroxide, ozone, plasma).

In certain embodiments, methods described herein include formation of coatings through co-assembly in solution assisted by electro-deposition and/or magnetic deposition.

In certain embodiments, a substrate that is being modified with CTPCs is immersed in a co-assembly mixture.

In certain embodiments, the co-assembly mixture is deposited by spraying.

In certain embodiments, the hierarchical porous structures are obtained upon removal of the templating particles. The processing methods can include calcination, dissolution, etching, evaporation, sublimation, phase-separation, and combinations thereof.

In certain embodiments, the porosity of a hierarchically porous material, prepared according to methods set forth herein, can be said to have a hierarchical porosity that transitions from the millimeter scale, via macropores, toward mesopores and/or micropores. In some such embodiments, the hierarchically porous material or structure comprises a layer or region having a first porosity corresponding to a first type (e.g., size and/or shape) of templating material and a layer or region having a second porosity corresponding to a second type (e.g., size and/or shape) of templating material. In certain embodiments, the first and second porosities can differ in size (e.g., pore diameter) and/or shape. In certain embodiments, the hierarchically porous material can also include one or more further layers or regions with additional porosity values (e.g., a third porosity, fourth porosity, etc.) that may also differ in size and/or shape from the first and second porosities. In certain embodiments, the different porosities (e.g. first porosity, second porosity, third porosity, fourth porosity, etc.) can be present in the same layers or regions of a hierarchically porous material. In certain embodiments, layers or regions of the hierarchically porous material have corresponding porosities that increase along a growth direction of the hierarchically porous material. In certain embodiments, the layers or regions of the hierarchically porous material have corresponding porosities that decrease along a growth direction of the hierarchically porous material and/or that have an intermixed porosity along a growth direction. In certain embodiments, a hierarchically porous material layer deposited onto a substrate with macroscopic pores can be two or more of macroporous, mesoporous, and microporous at the same time.

6.2. Monoliths

In certain embodiments, the porous monolith comprises, or defines therewithin, a material with macroscopic pores (e.g., "honeycomb" structures, meshes, foams, textiles, and papers) and coatings described herein are applied such that they coat at least 30% of the walls of the macroscopically porous material.

In certain embodiments, the monolith can be made from a ceramic material, such as cordierite, Mullite, zeolite, and natural or synthetic clay.

In certain embodiments, a monolithic material can be made from a metal salt or oxide, such as silica, alumina, iron oxide, zinc oxide, tin oxide, alumina silicates, aluminum titanate, beryllia, noble metal oxide, platinum group metal oxide, titania, zirconia, hafnia, molybdenum oxide, tungsten oxide, rhenium oxide, tantalum oxide, niobium oxide, vanadium oxide, chromium oxide, scandium oxide, yttria, lanthanum oxide, ceria, thorium oxide, uranium oxide, other rare earth oxides, and combinations thereof.

In certain embodiments, a monolithic material can be made from one or more metals and/or metal alloys, such as stainless steel, ferritic steel (e.g., an iron-chromium alloy), austenitic steel (a chromium-nickel alloy), copper, nickel, brass, gold, silver, titanium, tungsten, aluminum, palladium, platinum, and combinations thereof.

In certain embodiments, a monolithic material can be made from a semiconductor, such as silicon carbide, silicon, germanium, tin, silicon doped with group III or V elements, germanium doped with group III or V elements, tin doped with group III or V elements, a transition metal oxide, and combinations thereof.

In certain embodiments, a monolithic material can be made from a polymer, such as polyurethane, polystyrene, poly(methyl methacrylate), polyacrylate, poly(alkyl acrylate), substituted polyalkylacrylate, polystyrene, poly(divinylbenzene), polyvinylpyrrolidone, poly(vinylalcohol), polyacrylamide, poly(ethylene oxide), polyvinyl chloride, polyvinylidene fluoride, polytetrafluoroethylene, other halogenated polymers, hydrogels, organogels, and combinations thereof. Other polymers of different architectures can be utilized as well, such as random and block copolymers, branched, star and dendritic polymers, and supramolecular polymers.

In certain embodiments, the a monolithic material can be made from one or more natural materials, such as cellulose, natural rubber (e.g. latex), wool, cotton, silk, linen, hemp, flax, and feather fiber.

In certain embodiments, a monolithic material can be made from a combination of any of the above. For example, cermet, which is a composite of metals (e.g., nickel, molybdenum, cobalt, titanium, and tungsten) and their oxides, borides, and carbides, can be used to form a monolithic material.

6.3. Templating Materials

In certain embodiments, colloids discussed in section III.6 are defined as dispersed particles of any shape or form (for example, spherical or fibrous) or large molecules suspended in another substance, and may be alternatively referred to as a colloidal dispersion. As used herein, the dispersed substance or particles are referred to alternatively as 'colloids' or 'colloidal particles' or NP-decorated template material'. Many different types of colloidal particles can be utilized in performing the methods set forth herein. The colloids can be made from various materials or mixtures of materials. In certain embodiments, in order to serve as sacrificial templating material, at least part of the colloidal material should be combustible, dissolvable, sublimable, or meltable during the course of formation of CTPCs. Colloidal particles can have a size (particle size) on the order of micropores (<2 nm), mesopores (2-50 nm), and/or macropores (>50 nm).

In certain embodiments, the dispersed substance or particles includes polymeric colloids, biopolymer colloids, organometallic compounds, supramolecular self-assembled colloids, or a combination thereof.

In certain embodiments, the materials include polymeric fibers, biopolymer fibers, fibers with organometallic composition, supramolecular self-assembled fibers, or a combination thereof.

In certain embodiments, the material is polymeric, and includes one or more of poly(methyl methacrylate), polyacrylate, polyalkylacrylate, substituted polyalkylacrylate, polystyrene, poly(divinylbenzene), polyvinylpyrrolidone, poly(vinylalcohol), polyacrylamide, poly(ethylene oxide), polyvinylchloride, polyvinylidene fluoride, polytetrafluoroethylene, other halogenated polymers, hydrogels, organogels, or combinations thereof. Other polymers of different architectures can be utilized as well, such as random and block copolymers, branched, star and dendritic polymers, and supramolecular polymers.

In certain embodiments, the material is of natural origin (biopolymer colloid), such as a protein- or polysaccharide-based material, silk fibroin, chitin, shellac, cellulose, chitosan, alginate, gelatin, or a mixture thereof.

In certain embodiments, the materials include one or more organometallic compounds, such as a metal organic framework, an inorganic polymer (such as silicone), an organometallic complex, or a combination thereof.

In certain embodiments, sizes (e.g., diameters) of the templating particles can range from about 1 nm to several tens or hundreds of microns. Some exemplary sizes include about 1 nm to about 1000 nm to provide specific optical properties and/or improved assembly characteristics that are not largely affected by gravity. Some exemplary sizes include 200 nm to 50000 nm to obtain porosity for specific mass transport properties, and/or filtration and/or catalytic applications. Depending upon the application, many types of sacrificial particles can be utilized.

In certain embodiments, the templating particles include a colloidal dispersion of spherical, elongated, concave, amorphous, or facetted particles made from polymer, metal, metal oxides, supramolecular aggregates, crystals of organic, inorganic and organometallic compounds, or salts.

6.4. Matrix Material

In certain embodiments described herein, "matrix precursor materials" can be converted into "matrix material" through one or more of the fabrication processing steps set forth herein, for example high-temperature calcination, drying (e.g., for polymeric foams), light-induced polymerization, thermal polymerization, radical polymerization, supramolecular polymerization, other curing processes, and combinations thereof.

In certain embodiments, the matrix material can be made from various materials or mixtures of materials. The choice of the matrix material can be dictated by its intended application and the ability of its precursor to comply with CTPC processing conditions (e.g., its ability to form a stable mixture with other ingredients, exhibit particular self-assembly or polymerization kinetics, and/or withstand calcination or other template removal conditions). The matrix material can, for example, be catalytically active, stimuli-responsive, chemically robust, degradable, and/or exhibit specific thermal and mechanical properties.

In certain embodiments, the materials include one or more metals, such as gold, palladium, platinum, silver, copper, rhodium, ruthenium, rhenium, titanium, osmium, iridium, iron, cobalt, or nickel, or a combination thereof.

In certain embodiments, the materials include a semiconductor, such as silicon, germanium, tin, silicon doped with group III or V elements, germanium doped with group III or V elements, tin doped with group III or V elements, or a combination thereof. In certain embodiments, the materials include a conducting material.

In certain embodiments, the materials include one or more oxides, such as silica, alumina, beryllia, noble metal oxides, platinum group metal oxides, titania, tin oxide, zirconia, hafnia, molybdenum oxide, tungsten oxide, rhenium oxide, vanadium oxide, tantalum oxide, niobium oxide, chromium oxide, scandium oxide, yttria, lanthanum oxide, ceria, thorium oxide, uranium oxide, other rare earth oxides, or a combination thereof.

In certain embodiments, the materials include one or more metal sulfides, metal chalcogenides, metal nitrides, metal pnictides, or combinations thereof.

In certain embodiments, the materials include one or more organometallic compounds, such as metal organic frameworks, inorganic polymers (such as silicone), organometallic complexes, or combinations thereof.

In certain embodiments, the matrices can comprise one or more organic materials, such as polymers, natural materials, and mixtures thereof.

In certain embodiments, the material is polymeric, and includes one or more of polyurethane, poly(methyl methacrylate), polyacrylate, polyalkylacrylate, substituted polyalkylacrylate, polystyrene, poly(divinylbenzene), polyvinylpyrrolidone, poly(vinyl alcohol), polyacrylamide, poly(ethylene oxide), polyvinylchloride, polyvinylidene fluoride, polytetrafluoroethylene, other halogenated polymers, hydrogels, organogels, and combinations thereof. Other polymers of different architectures can be utilized as well, such as random and block copolymers, branched, star and dendritic polymers, and supramolecular polymers.

In certain embodiments, the material is of natural origin, and includes, for example, a protein- or polysaccharide-based material, silk fibroin, chitin, shellac, cellulose, chitosan, alginate, gelatin, or a mixture thereof.

In certain embodiments, the matrix precursor material is in the form of a sol-gel precursor, a nano-particulate precursor, or a combination of thereof.

In certain embodiments, the sol-gel matrix precursor material is a silica, alumina, titania, and/or zirconia sol-gel.

In certain embodiments, the nano-particulate precursor comprises a single or a mixture of nanoparticles of the matrix materials described above.

6.5. Catalytic Applications

In certain embodiments, the methods described herein facilitate formation of structures capable of catalyzing one or more reactions, such as oxidation, hydrogenation, dehydrogenation, hydration, dehydration, isomerization, oxidative coupling, dehydrogenative coupling, hydrosilylation, amination, hydroamination, C—H activation, insertion reactions, decomposition, redox reactions, or polymerization/depolymerization.

In certain embodiments, the methods described herein facilitate fabrication of structures exhibiting selective catalytic activity towards formation of specific products or when different functional groups are present in the same substrate molecule.

In certain embodiments, the methods described herein facilitate fabrication of structures exhibiting catalytic reactivity for the formation of methanol and ammonia.

In certain embodiments, the methods described herein facilitate incorporation of multiple catalytic functions within the same structures, such that activation of cascades or multistep catalytic reactions can be achieved.

In certain embodiments, the methods described herein facilitate fabrication of structures catalyzing chemical transformations of single- and poly-unsaturated carbon-carbon and carbon-heteroatom functional groups, including double, triple, and aromatic bonds, as well as saturated hydrocarbons of different skeletal structures (linear, branched and cyclic).

Figure 38:
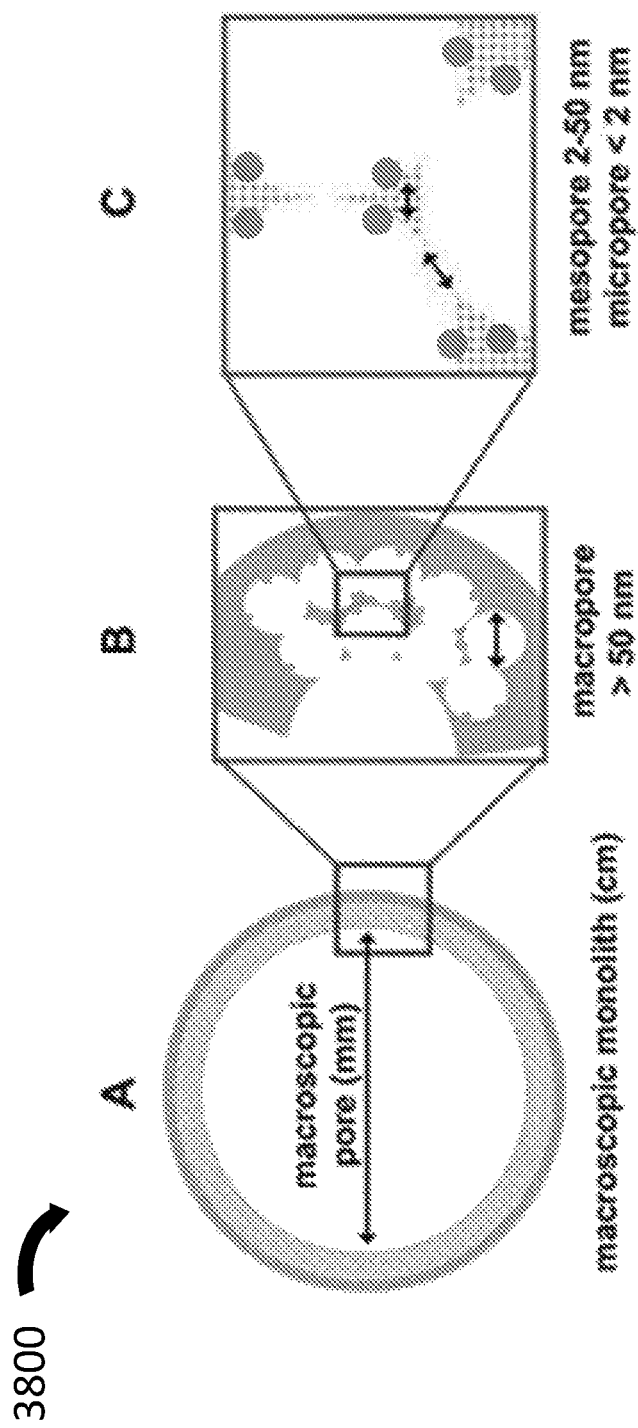
FIG. 38 views A-C are a series of schematic views of a hierarchically porous material obtained via coating of pre-existing porous macroscopic substrates with the catalytic porous templated materials, in accordance with certain embodiments.

FIG. 38 views A-C are a series of schematic views of a hierarchically porous material 3800, in accordance with certain embodiments. As shown in FIG. 38 view A, a hierarchically porous material 3800 can include a monolith having a size on the centimeter (cm) scale and defining therein a first plurality of pores of macroscopic scale (e.g., on the order of sub-millimeter to few millimeters (mm) along the smallest dimension thereof, for example a diameter). The walls of the monolith can include, defined therewithin, a second plurality of pores of macroscopic scale which may be of the same or different smallest dimension (e.g., diameter) than the first plurality of pores (for example, pores of the second plurality of pores can have a smallest dimension of >50 nm) (see FIG. 38 view B). The walls of the second plurality of pores can include, defined therewithin, a third plurality of pores, e.g., mesopores (2-50 nm) and/or micropores (<2 nm) (see FIG. 38 view C). As discussed above, the porosity of the hierarchically porous material 3800 can therefore be said to have a hierarchical porosity that transitions from millimeter scale pores, via macropores, toward mesopores and/or micropores.

Figure 39:
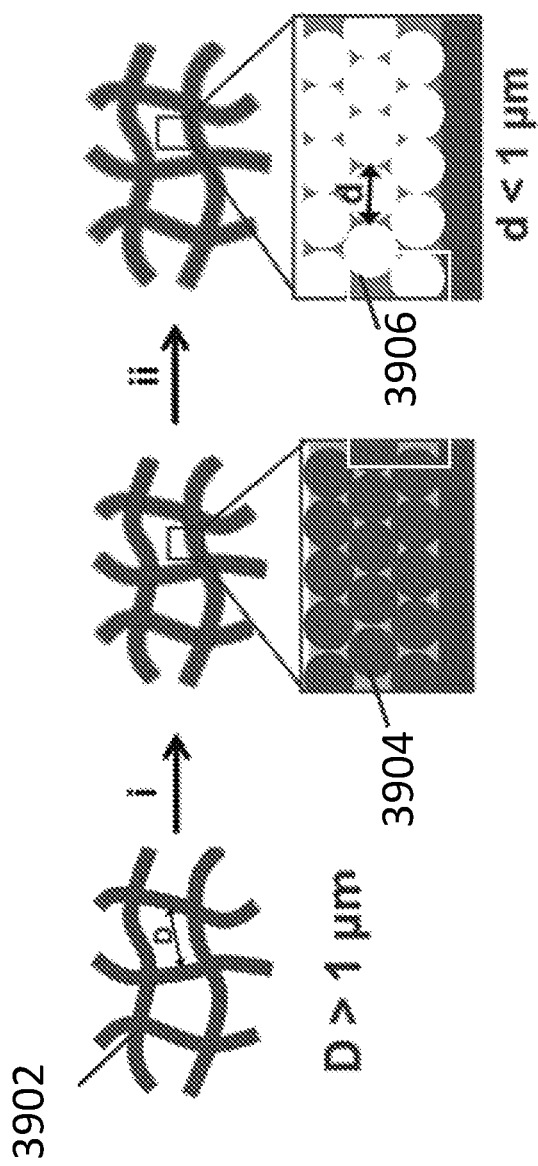
FIG. 39 is a schematic illustration of a method of fabricating a hierarchically porous catalytic material via application of the catalytic porous materials described in certain embodiments in the form of coatings as onto a macroscopically porous substrate (e.g. cordierite, polyurethane or other polymeric foams, carbon-based porous substrates, and metallic substrates).

FIG. 39 illustrates a method of fabricating a hierarchically porous catalytic material structure via application of the catalytic porous materials coating described in certain embodiments (e.g., inverse opal film) in the form of coatings onto a macroscopically porous substrate (e.g. cordierite, polyurethane or other polymeric foams, carbon-based porous substrates, and metallic substrates), for example using a colloidal co-assembly process, in accordance with some embodiments. More specifically, FIG. 39 illustrates a method of fabricating a hierarchically porous structure using a macroscopically porous substrate 3902 utilizing a co-assembly process, in accordance with some embodiments. A substrate 3902 with macroscopic pores (D>1 µm) is pretreated through application of adhesion-promoting agents and/or surface activation processes. Although depicted in FIG. 39 to have macroscopic pores with a diameter of D>11 µm, other pore sizes for substrate 3902 are also contemplated (e.g., D>10 µm, etc.). The substrate is then modified with CTPC 3904 comprising templating and matrix precursor materials, using a co-assembly approach (step i). Subsequently, the colloids are removed (step ii), resulting in the formation of a porous film 3906 (with macro, meso, and micro pores) on the macroscopically porous substrate. In certain embodiments, the macroporous film 3906 can have an average pore size of about 50 nm-2,000 nm and its matrix can include micro and meso pores (from sub-nanometer to 50 micrometers) after the CTPC formation process is complete. The co-assembly process allows for fine control over the composition and porosity of the resulting CTPCs. Specifically, various precursor materials and functional components can be utilized to control the composition of the resulting matrix, while various templating components can be used to control the final porosity on the macro, meso, and micro-scales.

Figure 40:
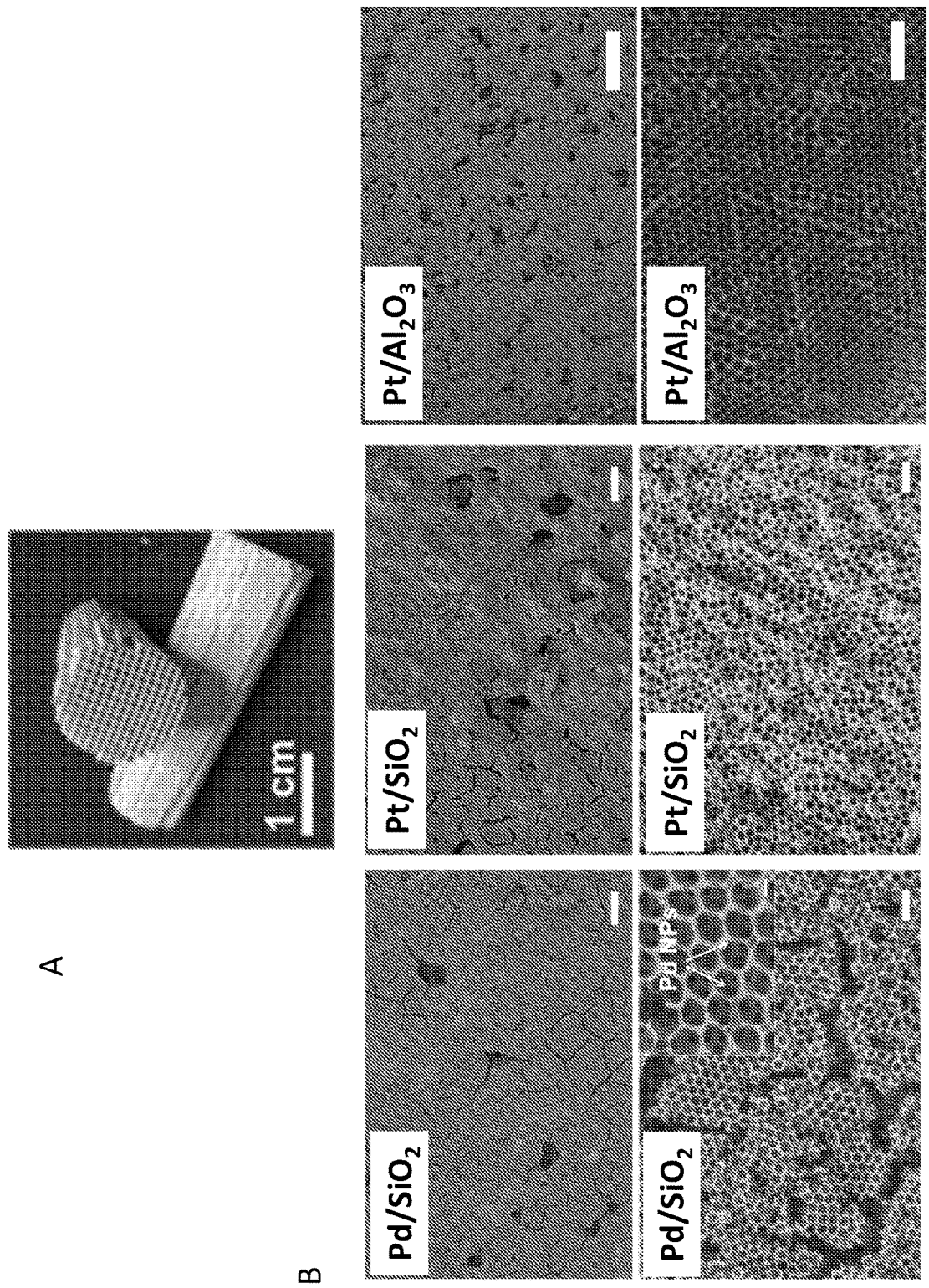
FIG. 40 is images of exemplary catalytic hierarchical porous materials obtained via coating of cordierite substrates with the catalytic porous templated material described herein, in accordance with certain embodiments. View A is a macroscopic sample of a cordierite, in accordance with certain embodiments, and view B is a series of SEM images of the samples including coatings of $Pt/SiO_2$, $Pd/SiO_2$, and $Pt/Al_2O_3$, in accordance with certain embodiments.

FIG. 40 shows exemplary catalytic hierarchical porous materials obtained via coating of cordierite substrates with the catalytic porous templated material described herein. View A is a macroscopic sample of a cordierite, and view B is a series of SEM images of the samples including coatings of $Pt/SiO_2$, $Pd/SiO_2$, and $Pt/Al_2O_3$. The top row in view B contains large field of view and the bottom row high magnification SEM images. Individual Pd NPs embedded in silica matrix are shown with an arrow in the inset of the corresponding SEM image.

Figure 41:
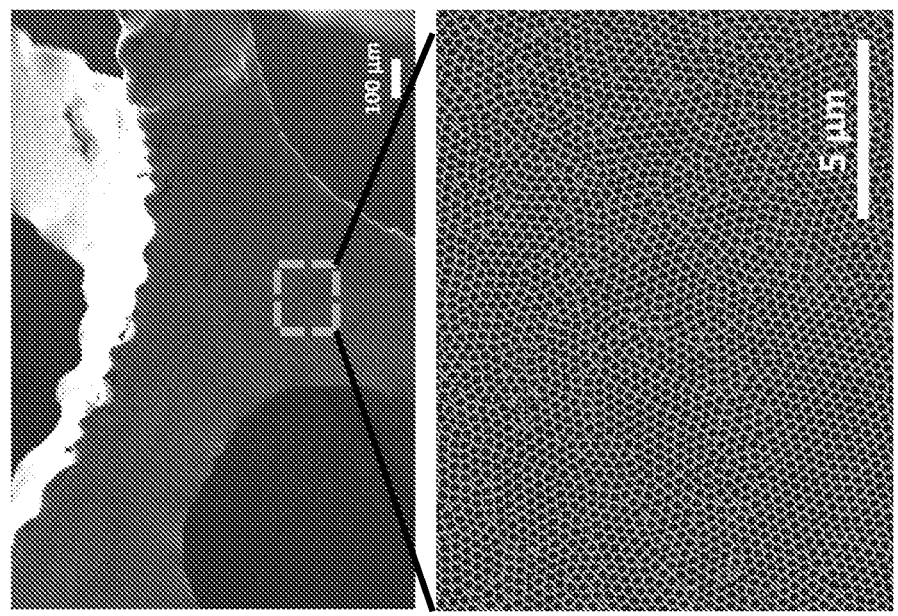
FIG. 41 is images shows exemplary catalytic hierarchical porous materials obtained via coating of a polyurethane substrate with the catalytic porous templated material described herein, in accordance with certain embodiments. View A is a macroscopic sample of polyurethane foam coated with $Au/SiO_2$, in accordance with certain embodiments, and view B is a series of SEM images of the same sample.
Figure 41:
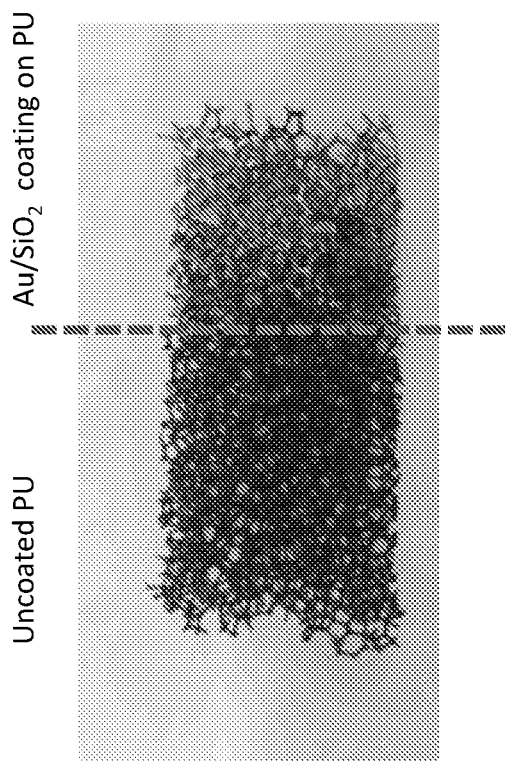
Figure 42:
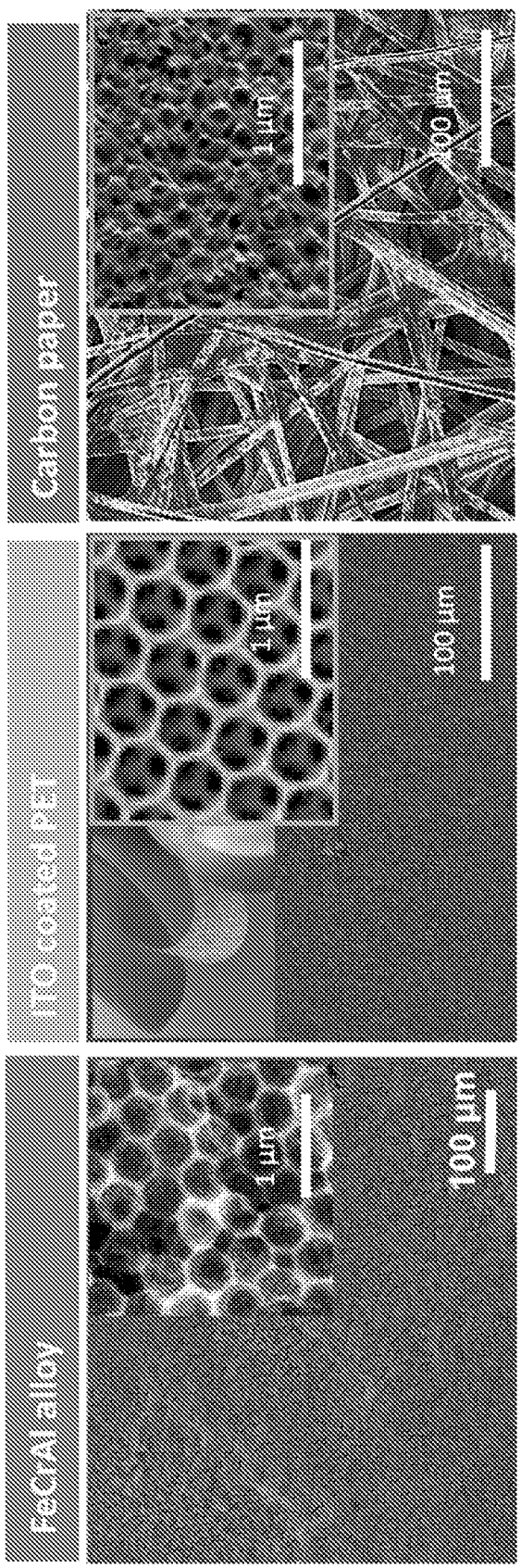
FIG. 42 is images showing exemplary catalytic porous materials obtained via coating conductive substrates with the catalytic porous templated material described herein, in accordance with certain embodiments. The examples include coatings on metallic (FeCrAl) substrate, Indium Tin Oxide coated on polyethylene terephthalate (PET) substrate, and carbon paper.

FIG. 41 shows exemplary catalytic hierarchical porous materials obtained via coating of a polyurethane substrate with the catalytic porous templated material according to certain embodiments described herein. View A shows a macroscopic sample of polyurethane foam partially coated with $Au/SiO_2$, in accordance with certain embodiments. The coated side on the right is clearly seen as a lighter color due to the coating. View B shows is a large field of view and high magnification SEM images of the coated part of the sample, showing uniform conformal coating of catalytic material on macroscopic pores FIG. 42 shows exemplary catalytic porous materials obtained via coating conductive substrates with the catalytic porous templated material according to certain embodiments described herein. The examples include coatings on metallic (FeCrAl) substrate, Indium Tin Oxide coated on polyethylene terephthalate (PET) substrate, and carbon paper, showing uniform conformal coating of catalytic material on macroscopic pores.

Figure 43:
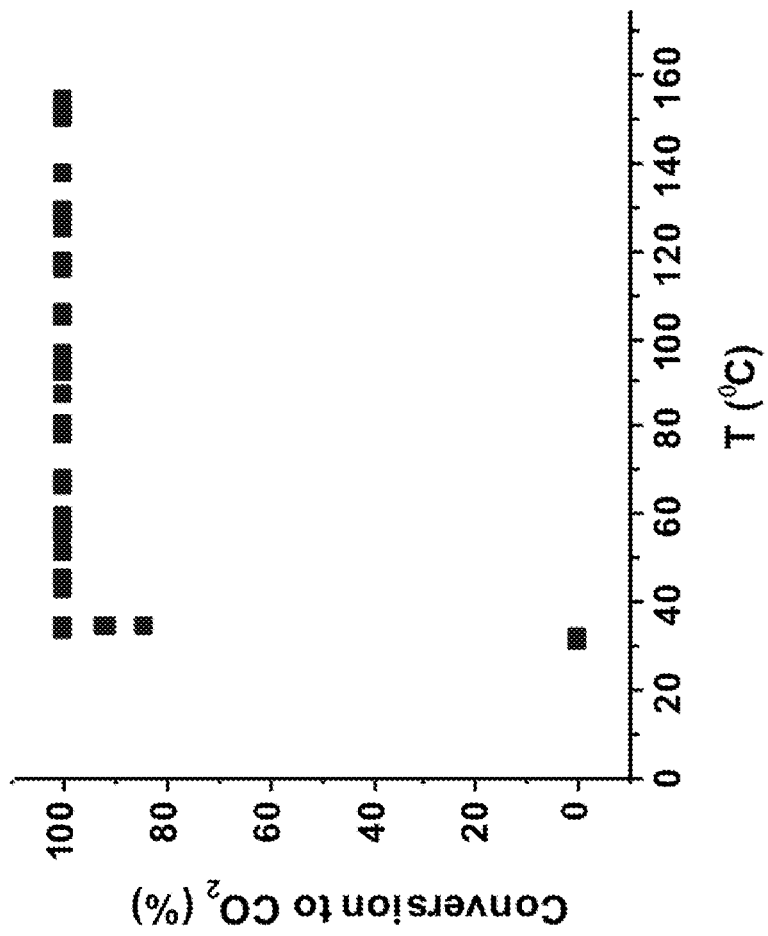
FIG. 43 is an example of experimental results for the complete oxidation of methanol and isopropanol to $CO_2$ and water obtained using $Pt/Al_2O_3$ catalytic materials disclosed herein coated on a cordierite substrate, in accordance with certain embodiments.
Figure 44:
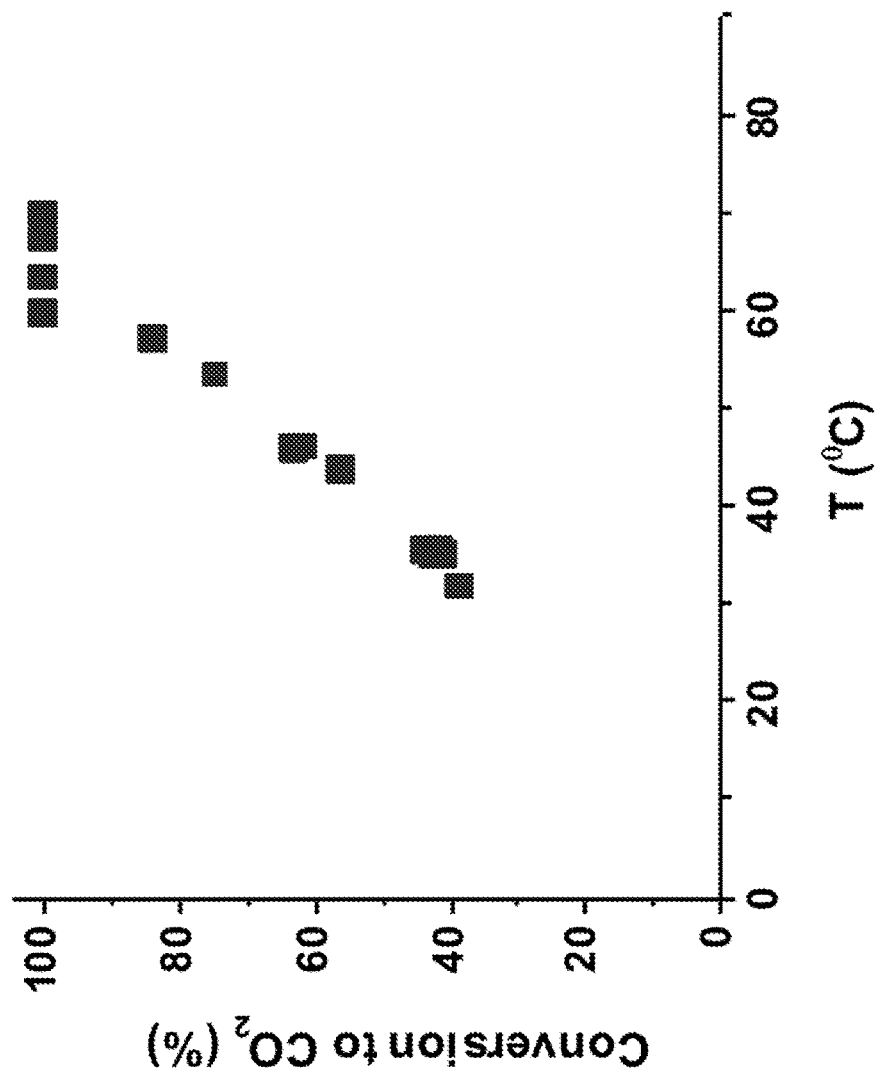
FIG. 44 is an example of experimental results for the complete oxidation of methanol and isopropanol to $CO_2$ and water obtained using $Pt/Al_2O_3$ catalytic materials disclosed herein coated on a cordierite substrate, in accordance with certain embodiments.

FIGS. 43 and 44 are examples of experimental results for the complete oxidation of methanol to $CO_2$ and water using cordierite substrate (length 3"; diameter 1") modified with 1 w % $Pt/Al_2O_3$ catalytic material according to the approach depicted in FIG. 39, in accordance with certain embodiments. The sample was tested under different flow rates of reactants: 50 mL/min (FIG. 43) and 400 mL/min (FIG. 44). Catalytic activity was measured using a conventional fixed-bed reactor. The cordierite samples were loaded into the quartz reactor tube and pretreated by heating at 150° C. for 30 min under 25 ml/min He flow to remove any water and air, then cooled to ~25° C. The reactor temperature was ramped back to 150 C at 10° C./min rate under flow of 7.5 mol % methanol in He and 22 mol % $O_2$. After each increment by 10° C., the reaction conditions were held constant for one hour to allow the catalyst to reach stable conversion. At low flow rates of 50 mL/min, the conversion of methanol to $CO_2$ occurs at room temperature (FIG. 43) while at much higher flow rates of 400 mL/min, the complete combustion of methanol occurs at ~60° C. (FIG. 44). The low light-off temperature at even high flow rates makes these systems very useful for practical catalytic applications where macroscopic substrates and high flow rates are utilized.

Figure 45:
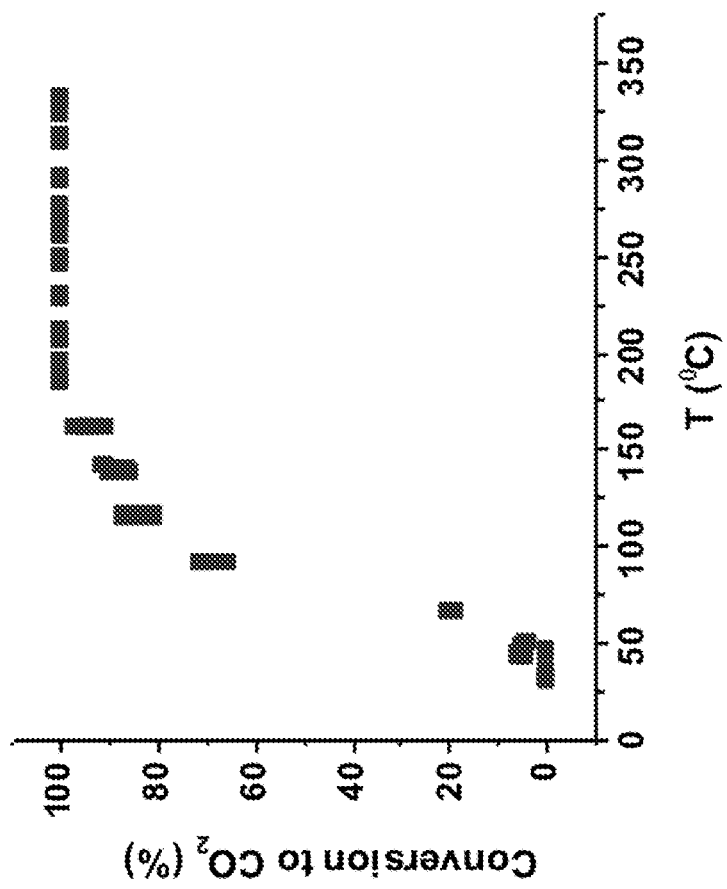
FIG. 45 is an example of experimental results for the complete oxidation of methanol and isopropanol to $CO_2$ and water obtained using $Pt/Al_2O_3$ catalytic materials disclosed herein coated on a cordierite substrate, in accordance with certain embodiments.

FIG. 45 shows examples of experimental results for the complete oxidation of isopropyl alcohol (IPA) to $CO_2$ and water using cordierite substrate (length 3"; diameter 1") modified with 1 w % $Pt/Al_2O_3$ catalytic material according to the approach depicted in FIG. 39, according to certain embodiments herein. Catalytic activity was measured using a conventional fixed-bed reactor. The cordierite samples were loaded into the quartz reactor tube and pretreated by heating at 150° C. for 30 min under 25 ml/min He flow to remove any water and air, then cooled to ~25° C. The reactor temperature was ramped back to 350° C. at 10° C./min rate in 50 mL/min flow of 3 mol % IPA in He and 22 mol % $O_2$. After each increment by 10° C., the reaction conditions were held constant for one hour to allow the catalyst to reach stable conversion. The complete conversion of IPA to $CO_2$ occurs at ~180° C. (FIG. 45).

7. Discussion and Outlook

Catalysis involves a complex interplay of physical and chemical processes, yet in practice it remains a challenge to design catalytic materials that can optimize multiple parameters simultaneously. As described in certain embodiments herein, using metal-bearing colloids both to structure porous lattices and to organize catalysts within them can provide, a potent materials strategy, which unites state-of-the-art techniques in nanoparticle synthesis, mesoscale self-assembly, bulk materials synthesis, and post-synthesis transformation into a single platform that creates new synergies and opens degrees of synthetic freedom across a hierarchy of scales (see FIG. 35). The nanoscale catalytic particles can in certain embodiments be a variety of single metals or multimetallic mixed or core-shell structures, with sizes uniformly controlled across the population, or can be composed of transition metal compounds with controlled crystallinity. At the microscale, sacrificial colloids can direct metal NP placement within individual pores, enabling uniform distribution, localization to the pore surface, and a broad choice of configurations such as different catalysts in different pores, potentially with catalyst-specific pore sizes, or controlled ratios of two or more catalysts in the same pore, according to certain embodiments. Transition metal dopants that have catalytic as well as other properties can be localized selectively at the pore interface or controllably distributed between the interface and the bulk matrix, according to certain embodiments. At the scale of the overall architecture, lattice features such as degree of disorder, connectivity, and pore size and shape can each be finely tuned, and a wide range of bulk matrix materials and tailored composites can be used to create combinatorial libraries of matrix and catalyst compositions, according to certain embodiments. Macroscale gradients of surface properties and reactivity can further be designed by patterning the surface chemistry, NP size, and NP composition, according to certain embodiments. Finally, all of these chemical and architectural choices can be used in a variety of macroscopic formats, including thin films as well as dispersible SHARDS, or photonic balls, according to certain embodiments.

These hierarchical features in turn specify the catalytic material's functional properties, including mass transport, thermal and fluidic diffusion, affinity for various reactant and product species, ability to undergo redox transformations, and electronic and photonic behaviors, according to desired characteristics of certain embodiments. For example, in certain embodiments this strategy permits the quasi-compartmentalization and spatiotemporal control of multi-step reactions. In certain embodiments, the ability to place different catalysts in close proximity within pores, or segregated within different pores, makes it possible to construct catalytic systems that take into account the variations between distinct intermediates in terms of their lifetimes, diffusion rates, and compatibility with different catalysts. Additional surface modifications of the pores and patterned modifications of embedded catalysts can lead to gradients of wettability and reactivity across the structure that, along with tailored connectivity and pore and neck sizes, further guide the flow of fluid and optimize the reaction efficiency and selectivity according to certain embodiments.

Together or separately, the capacity for quasi-compartmentalization and spatiotemporal control, ability to systematically vary multiple features individually and in combination, and tunable photonic properties create a potent system for design of a wide variety of catalyzed reactions. Additionally, in certain embodiments, inverse opals can be utilized in certain embodiments as colorimetric sensors, with high spatial resolution. In certain embodiments the designed catalytic materials can therefore also serve as self-reporting systems that monitor the evolution of chemical and heat profiles across space and time as a function of different NP, pore, connectivity, and matrix properties. This can allow various factors to be systematically varied and analyzed in a single system, providing both a comprehensive foundational understanding and a toolkit for constructing designed systems for diverse reactions.

Beyond optimizing reactions, in certain embodiments, it is important that the hierarchical degrees of freedom simultaneously provide a unique, comprehensive or exemplary set of handles for addressing the many practical issues involved in bringing these materials to bear on pressing global challenges. In both developed and developing countries, catalysis is central to nearly every facet of supporting an increasing population as well as to the growing crises in energy use and air pollution: the quality of reactions determines the efficiency and footprint of electricity generation, fuel harvesting and refinement, steel production, transportation and communications infrastructures, and production of food, clothes, and pharmaceuticals, and plays an important role in breaking down contaminants before and after they reach the air. Optimizing catalysis can cut U.S. energy consumption in half and is essential for meeting regulations and preserving public health, but a gulf persists between compelling research progress and the development of widespread robust and feasible systems. The primary hurdles—stability, cost, scalability, and adaptability—each represent complex multiscale issues that the strategy described in embodiments herein confronts.

The lifetime of the catalytic materials can be maximized by controlling the embedding, distribution, size, and composition of nanoparticles, in combination with the mechanical and thermal properties of the architecture and matrix material, according to certain embodiments. As discussed in certain embodiments, a unique, particularly practical feature of NP-decorated particle co-assembly is the partial entrenchment or embedding of the NPs within the pore walls. Such lock-in-place positioning of NPs fixed to the wall and their even distribution stabilize them against mechanical disruption and thermally induced migration and fusion. In some embodiments, the uniform control over NP size is important for ensuring that all NPs have a sufficiently large embedded surface area, as small NPs can migrate or be dislodged by flow under reaction conditions. Multimetallic compositions can further stabilize the NPs against leaching, oxidation, and evaporation, in certain embodiments. On a larger scale, in certain embodiments the co-assembly method prevents cracks that would make the material vulnerable to mechanical stress and heat concentration, and in certain embodiments a controlled degree of disorder can be introduced into the pore lattice to increase mechanical toughness. These design features can be complemented with matrix materials or combinations that have mechanical or thermal properties required for specific settings and reaction conditions, according to certain embodiments.

Controls described in the embodiments herein can also minimize the cost and materials requirements of production. Targeting the NPs directly to the pore walls and uniformly maximizing their exposed surface area can substantially reduce the need for expensive, scarce precious metals, by enabling essentially every NP to be available for catalysis rather than buried inside the bulk matrix. Additionally, the control over pore connectivity provided by the co-assembly system can prevent dead ends and tortuosity from blocking access to the NPs. The ability to target different metals to different pores by localizing them on different NP-decorated particles can decrease metal requirements even further, by enabling each NP to not only be accessible but also to be precisely placed for optimized use in a reaction sequence. At the same time, maximizing the exposed surface area and connectivity of the pores can minimize the amount of bulk matrix material needed, and tailoring the surface chemistry and roughness can complement these approaches by further enhancing the effective surface area and exposure to reactants.

In certain embodiments, the ability to incorporate gradients in pore wettability and reactivity opens possibilities for integrating a wide range of catalytic processes into microfluidic and lab-on-chip systems. The approach is also universal in that it can be expanded to matrix materials beyond metal oxides, in certain embodiments. Biocompatible and biodegradable materials such as silk could allow formation of implantable devices capable of performing catalytic functions, potentially with degradation in response to specific triggers, while stimuli-responsive matrix materials such as hydrogels could enable the catalytic systems to adapt to changing environments or self-regulate, by changing their geometry or chemical properties in response to specific chemical species or changes in temperature, pH, or light, according to certain embodiments.

Ultimately, the versatility of the co-assembly process discussed in embodiments herein, such as raspberry co-assembly, facilitates customized integration of optimized catalytic materials into a tremendous variety of existing systems. The materials' multiscale features are formed through a simple evaporative self-assembly process that can in certain embodiments be scaled up from miniaturized model systems to large-scale industrial applications, and can be performed on a variety of flat or curved surfaces or batch-produced in dispersible formats with controlled shapes and sizes, in certain embodiments. As discussed, the hierarchical degrees of freedom make the materials adaptable for reactions important to numerous aspects of current energy, environmental, and health challenges: catalytic and photocatalytic decomposition of environmental pollutants such as CO, soot, $NO_x$, and volatile organic compounds, production of raw and fine chemicals, solar energy utilization, and energy storage, to name just a few embodiments. The exceptional performance of these catalysts in a set of model, industrially important, chemical reactions, such as oxidation of alcohols and carbon monoxide, gives many reasons to believe that the strategy described herein offers a broad platform for developing multifunctional catalytic materials, opening routes not only for integration into existing systems but also for imagining new ways and places to incorporate sophisticated catalytic reactions into functional materials within buildings, air and water treatment facilities, energy harvesting and storage systems, medical devices, textiles, and more, in accordance with certain embodiments.

Embodiments described herein, including those discussed above, can be practiced in isolation or combined to produce benefits tailored to the specific application.

III. Exemplary Applications

There is a growing need in indoor air purification in residential, industrial and office spaces. Current methodologies involve mostly ventilation and filtration. However, ventilation is often difficult or impossible, for a variety of reasons originating in the designs of buildings, and when possible, it is associated with energy inefficiency, due to energy losses resulting from exchange of heated or cooled indoor air with the outside air. Filtration also requires spending energy and it is typically effective in removing particulate matter from the air. Toxic Volatile Organic Compounds (VOCs) that are a cause of various health problems—from asthma and lung disease, to systemic blood, neurological, and oncological diseases can best be removed by chemical decomposition that would transform them into non-toxic gases present in clean air, such as nitrogen, carbon dioxide and water vapor.

Figure 36:
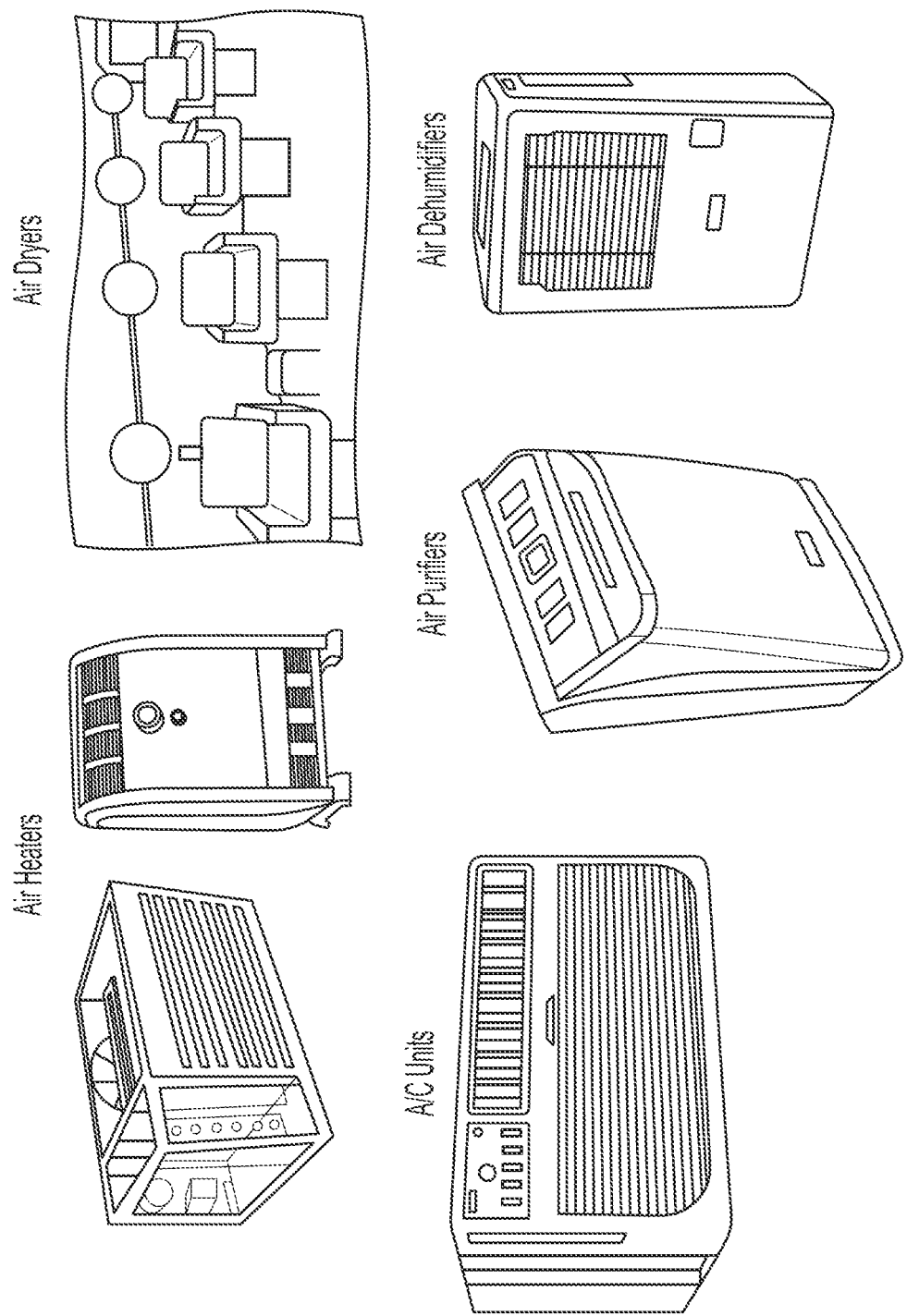
FIG. 36 is a schematic depiction of an exemplary non-limiting list of types of devices with forced air circulation and/or heater elements that can be used for indoor air purification by integrating catalytically active coatings in their design, in accordance with certain embodiments.

Disclosed in embodiments herein are concepts expended from earlier patent application titled "High Surface Area Functional Material Coated Structures" (application. Ser. No. 14/900,567) to ambient- or slightly elevated-temperature catalytic decomposition of VOCs when the porous catalytically active material is deposited as a coating, including as a paint, on the surfaces of indoor air heaters, air conditioning units, fans, hair dryers in hair salons (often sharing the space with nail salons, having a lot of VOCs emitted into the indoor atmosphere all the time), other air recirculating devices like air purifiers, humidifiers or dehumidifiers, on the surfaces of indoor electrical/lighting fixtures, and even on the walls or ceilings or furniture surfaces (FIG. 36). An aspect of the invention is that catalytically active material can be designed such that to have a very high activity, allowing it to effectively operate and destroy VOCs at room temperature and/or under a very moderate heating, when such heating is intrinsically present in the device in question, e.g. AC unit, recirculating air heater, warm surface of a lighting fixture and such). Importantly, a noticeable, measurable and beneficial air purification effect can result even from a room temperature operation, allowing the claimed catalytic coatings to be applied to other indoor surfaces, including, e.g. walls and ceilings. In certain embodiments, a very small heating element is integrated into the air circulating devices specifically to heat a small area proximal to where the functional catalytic coating is located.

Figure 37:
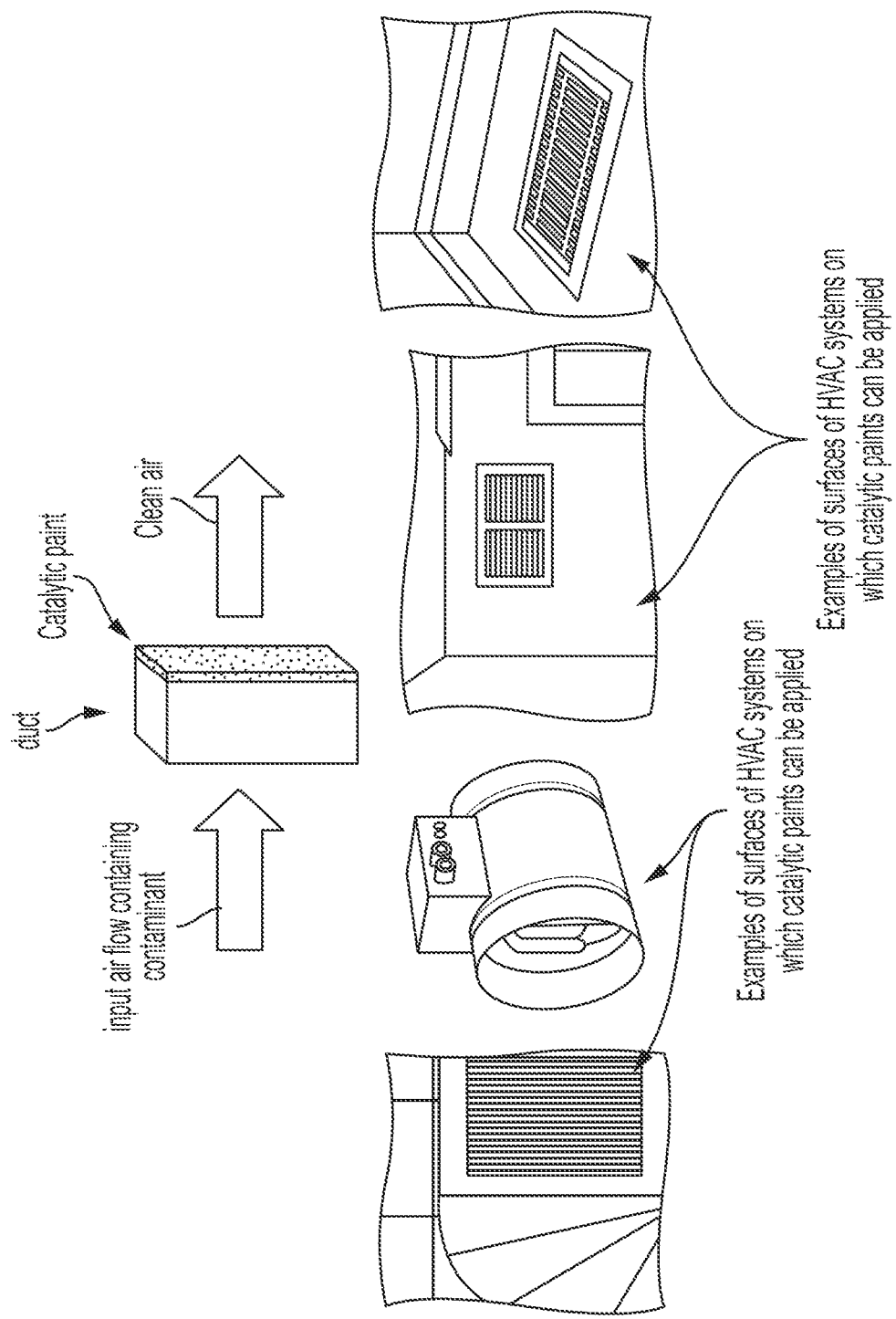
FIG. 37 is a schematic of air purifying action of catalytic paints created according to certain embodiments and utilized in HVAC systems (top) and non-limiting examples of surfaces of HVAC systems, on which such catalytic paint can be applied (bottom).

FIG. 37 depicts additional embodiments for use of the catalytic material disclosed herein, according to certain embodiments. For example, in certain embodiments, catalytic material can be used in the duct of, e.g., in an HVAC system, to filter contaminated input air flowing therethrough. In certain embodiments, the catalytic material is in the form of a paint that is applied to surfaces, e.g., of HVAC systems, to filter the contaminated air. In certain embodiments, the catalytic paint can be applied to ducts having input air from outdoors to filter outside contaminants, or to ducts having input air from inside to filter contaminants. In certain embodiments, the paint can be applied directly to the vent face, or to the internal surfaces of the HVAC systems.

FIGS. 14-19 show light-off graphs of complete combustion of methanol using $Pt/Al_2O_3$ and $Pd/Al_2O_3$ catalytic materials prepared according to the process described in FIG. 25, view A. In FIGS. 14 and 16 the commercial catalysts (1 w % Pt) have a measured light-off temperature of 90° C. (open circles), while our catalysts achieve room temperature operation at the same NPs loading (black squares) for both $Al_2O_3$ and $TiO_2$ support. When Pt NPs loading is decreased to 0.5% (FIG. 17, circles) and 0.05% (FIG. 18, triangles) our catalysts still maintain lower light-off temperature than commercial catalyst. Similar catalytic activity is observed for $Pd/Al_2O_3$ systems as shown on FIGS. 15 and 19.

In certain embodiments, the coating is a hierarchically porous matrix, typically composed of appropriately chosen oxide materials (e.g., silica, alumina, other related oxides) with embedded particles comprised of known catalytically active metals (Pt, Pd, Rh, Ru, Os, Ir, Au, Ag, less noble metals, such as Cu, Co, Ni, Fe, Mo, Ti—this list being exemplary and, of course, non-limiting) and/or their compounds, including mono-, bi-, or multi-metal containing mixtures or alloys thereof. Additionally, in certain embodiments the VOC decomposition can be achieved by designing into the coating photochemically active supports, such as titanium dioxide, which can further enhance catalytic activity of the coating.

Additionally, a person skilled in the art can certainly appreciate that a variety of existing catalytic materials can be utilized for the purposes of this invention—either alone or in combination with the hierarchically porous type of catalytic materials described in the cited above Application "High Surface Area Functional Material Coated Structures" (App. Ser. No. 14/900,567). Any of the catalytic materials and concepts discussed above can also be used alone or in combination for such applications.

In certain embodiments, a number of methods of applying of such a coating/paint, with the essential requirement being that it be deposited as the top coat or layer, directly exposing it to the air to be purified. In certain embodiments, functional elements can be dispersed uniformly within the coating or introduced only as parts or sections, like stripes, other periodic or random areas, depending on the technological, manufacturing, and other constraints. In addition, the combination of structural color with catalytic function can be utilized in decorative art and craft products such as pictorial art products, wallpapers, posters, tiles, flooring and etc., to produce both aesthetic and functional objects.

IV. Exemplary Materials

Disclosed below are exemplary materials that can be used in any of the embodiments discussed above.

Matrix

In certain embodiments, the matrix material can be made from various materials or mixtures of materials. The choice of the matrix material can be dictated by its intended application and the ability of its precursor to comply with templating processing conditions (e.g., its ability to form a stable mixture with other ingredients, exhibit particular self-assembly or polymerization kinetics, and/or withstand calcination or other template removal conditions). The matrix material can, for example, be catalytically active, stimuli-responsive, chemically robust, degradable, and/or exhibit specific thermal and mechanical properties.

In some embodiments, the matrix material includes at least one of: an oxide, a metal, a semiconductor, a metal sulfide, a metal chalcogenide, a metal nitride, a metal pnictide, an organometallic compound, an organic material, a natural material, a polymer, and a combination thereof. In some embodiments, the matrix precursor material includes a sol-gel precursor. In some embodiments, the matrix material is formed from a precursor material which includes, but is not limited to, nanoparticle precursor, e.g., metal oxide nanoparticles.

In accordance with certain embodiments, the matrix comprises at least one of a metal oxide. Examples of metal oxides include, but are not limited to, silica, alumina, iron oxide, zinc oxide, tin oxide, alumina silicates, aluminum titanate, beryllia, noble metal oxide, platinum group metal oxide, titania, zirconia, hafnia, cobalt oxide, manganese oxide, molybdenum oxide, tungsten oxide, rhenium oxide, tantalum oxide, niobium oxide, vanadium oxide, chromium oxide, scandium oxide, yttria, lanthanum oxide, ceria, thorium oxide, uranium oxide, and rare earth oxides.

In still other embodiments, the matrix material comprises a semiconductor, including at least one of: silicon carbide, silicon, germanium, tin, silicon doped with a group III element, silicon doped with a group V element, germanium doped with a group III element, germanium doped with a group V element, tin doped with a group III element, tin doped with a group V element, and transition metal oxides.

In some embodiments, the matrix material can be a ceramic, such as cordierite, and/or includes at least one of the following: mullites, zeolites, natural clays, and synthetic clays.

In other embodiments, the matrix material comprises at least one of a metal and a metal alloy. Examples of metals include, but are not limited to, gold, palladium, platinum, silver, copper, rhodium, ruthenium, rhenium, titanium, osmium, iridium, iron, cobalt, or nickel, or a combination thereof. Examples of metal alloys include, but are not limited to, stainless steel, ferritic steel (e.g., an iron-chromium alloy), austenitic steel (a chromium-nickel alloy), copper, nickel, brass, gold, silver, titanium, tungsten, aluminum, palladium, and platinum.

In still other embodiments, the matrix material comprises an oxidizing agent. In still other embodiments, the matrix material comprises a reducing agent.

In some embodiments, the matrix material further comprises a complex salt with at least one of: an alkali metal, an alkali-earth metal, a group (III) metal, and a transition metal salt. In some embodiments, the matrix material is selected from silica, titania, zirconia, ceria, vanadia, group II oxides, group III oxides, rare earth oxides, iron oxides, mixed oxides, nanoparticles, inorganic sol-gel derived oxides, alumina, iron oxides, metal, polymers, and combinations thereof.

In certain embodiments, the materials include one or more metal sulfides, metal chalcogenides, metal nitrides, metal pnictides, or combinations thereof.

In certain embodiments, the matrices can comprise one or more organic materials, such as polymers, natural materials, and mixtures thereof.

In certain embodiments, the material is polymeric, and includes one or more of polyurethane, poly(methyl methacrylate), polyacrylate, polyalkylacrylate, substituted polyalkylacrylate, polystyrene, poly(divinylbenzene), polyvinylpyrrolidone, poly(vinylalcohol), polyacrylamide, poly(ethylene oxide), polyvinylchloride, polyvinylidene fluoride, polytetrafluoroethylene, other halogenated polymers, hydrogels, organogels, and combinations thereof. Other polymers of different architectures can be utilized as well, such as random and block copolymers, branched, star and dendritic polymers, and supramolecular polymers.

In certain embodiments, the material is of natural origin, and includes, for example, a protein- or polysaccharide-based material, silk fibroin, chitin, shellac, cellulose, chitosan, alginate, gelatin, or a mixture thereof.

In certain embodiments, the matrix precursor material is in the form of a sol-gel precursor, a nano-particulate precursor, or a combination of thereof.

In certain embodiments, the sol-gel matrix precursor material is a silica, alumina, titania, vanadia, ceria and/or zirconia sol-gel.

In certain embodiments, the nano-particulate precursor comprises a single or a mixture of nanoparticles of the matrix materials described above.

Templating Component

In some embodiments, the templating component includes at least one of: a polymer, a random copolymer, a biopolymer, an organometallic compound, a supramolecular polymer, and a combination thereof.

In still other embodiments, the templating component comprises a polymer, such as polyurethane, and/or comprises at least one of: polystyrene, poly(methyl methacrylate), polyacrylate, polyalkylacrylate, substituted polyalkylacrylate, polystyrene, poly(divinylbenzene), polyvinylpyrrolidone, poly(vinylalcohol), polyacrylamide, poly(ethylene oxide), polyvinylchloride, polyvinylidene fluoride, polytetrafluoroethylene, other halogenated polymers, hydrogels, organogels, chitin, chitosan, random and block copolymers, branched, star and dendritic polymers, and supramolecular polymers.

In some embodiments, the templating component is a biologically derived material, such as an enzyme or a protein.

In still other embodiments, the templating component comprises a natural material, for example including at least one of cellulose, natural rubber (e.g., latex), wool, cotton, silk, linen, hemp, flax, and feather fiber.

In other embodiments, the templating component includes at least one of: polymeric fiber, biopolymer fiber, fiber with organometallic composition, supramolecular self-assembled fiber, and a combination thereof.

In other embodiments, the templating component comprises a composite material combining both organic and inorganic components.

Within the context of this application, the colloids are defined as dispersed particles or large molecules suspended in another substance, and may be alternatively referred to as a colloidal dispersion. As used herein, the dispersed substance or particles are referred to alternatively as 'colloids' or 'colloidal particles.' Many different types of colloidal particles can be utilized in performing the methods set forth herein. The colloids can be made from various materials or mixtures of materials. In order to serve as sacrificial templating material, at least part of the colloidal material should be combustible, dissolvable, sublimable, or meltable during the course of formation of the porous templated materials disclosed herein. Colloidal particles can have a size (particle size) on the order of micropores (<2 nm), mesopores (2-50 nm), and/or macropores (>50 nm).

In certain embodiments, the materials include polymeric fibers, biopolymer fibers, fibers with organometallic composition, supramolecular self-assembled fibers, or a combination thereof.

In certain embodiments, sizes (e.g., diameters) of the templating particles can range from about 1 nm to several tens or hundreds of microns. Some exemplary sizes include about 1 nm to about 1000 nm to provide specific optical properties and/or improved assembly characteristics that are not largely affected by gravity. Some exemplary sizes include 200 nm to 50000 nm to obtain porosity for specific mass transport properties, and/or filtration and/or catalytic applications. Depending upon the application, many types of sacrificial particles can be utilized.

Catalytic NPs and Other Catalytic or/and Co-Catalytic Components

In certain embodiments, the catalytic NP can comprise at least one of: metal NPs, metal alloy NPs, bimetallic, multimetallic NPs, semiconductor NPs, metal oxide NPs, mixed metal oxide NPs, metal sulfide NPs, a solid solution, and a combination thereof.

In certain embodiments, the catalytic nanoparticles comprise a metal, a transition metal, a main group metal, a metal oxide, a mixed metal oxide, any one or more metals from group I, II, III, IV, V, VI, VII, VIII, from both main and transition series, or groups 1-16 in alternative nomenclature, any one or more oxides of metals from group I, II, III, IV, V, VI, VII, VIII, from both main and transition series, or groups 1-16 in alternative nomenclature, oxometallates, a metal sulfide, a metal pnictide, a metal carbide, a binary metal salt, a complex metal salt, a metal salt of an organic acid, a metal salt of inorganic acid, a metal salt of a complex acid, a base, an acid, a metal alloy, a multimetallic species, an intermetallic compound, non-stoichiometric phases, an organometallic compound, a coordination compound, one or more platinum group metal, one or more platinum group metal oxide, carbon, iron, cobalt, nickel, ruthenium, rhodium, palladium, osmium, iridium, platinum, copper, silver, gold, iron oxides, cobalt oxides, nickel oxides, ruthenium oxides, rhodium oxides, palladium oxides, osmium oxides, iridium oxides, platinum oxides, copper oxides, silver oxides gold oxides, titanium oxides, zirconium oxides, hafnium oxides, vanadium oxides, niobium oxides, tantalum oxides, chromium oxides, molybdenum oxides, tungsten oxides, manganese oxides, rhenium oxides, scandium oxide, yttrium oxide, lanthanum oxide, rare earth metal oxides, any species above in a single crystal polymorph or in several polymorphs, any species above presenting to the channel a specific crystallographic plane, any species above in non-crystalline form, and combinations thereof.

In certain embodiments, the NPs can include such metals as gold, silver, platinum, palladium, ruthenium, rhodium, cobalt, iron, nickel, osmium, iridium, rhenium, copper, chromium, tungsten, molybdenum, vanadium, niobium, tantalum, titanium, zirconium, hafnium, bimetals, metal alloys, and the like, metal compounds, such as pnictides, hydroxides, binary and complex salts, including heteropolyacids and their derivatives or a combination thereof semiconductors such as silicon, germanium, and the like, pure or doped with elements or compounds of group III or V elements, and combinations thereof; metal oxides including $V_2O_5$, silica, alumina, noble metal oxides, platinum group metal oxides, titania, zirconia, hafnia, molybdenum oxides, tungsten oxides, rhenium oxides, tantalum oxide, niobium oxide, chromium oxides, scandium, yttrium, lanthanum and rare earth oxides, thorium and uranium oxides and the like; metal sulfides, or combinations thereof. In some embodiments, multi-metallic nanoparticles comprise two or more metals, which are selected from gold, silver, platinum, palladium, ruthenium, rhodium, cobalt, iron, nickel, osmium, iridium, rhenium, copper, and chromium.

In certain embodiments, the catalytically relevant components include complex salts with alkali, alkali-earth, and group (III) metals and/or transition metal salts such as salts of nickel, copper, cobalt, manganese, magnesium, chromium, iron, platinum, tungsten, zinc, or other metals.

In certain embodiments, the catalytically relevant species deposited at the matrix-pore and/or NP-pore interfaces can include carbon, polycyclic/polycondensed carbon-rich species, acidic species, e.g. heteropolyacids, solid acids or basic species, metal particles, metal oxide particles, or combinations thereof. In some embodiments, the catalytically relevant species deposited at the matrix-pore and/or NP-pore interfaces are derived from the interconnecting templating component. In some embodiments, the templating component is organometallic and the catalytically relevant species deposited at the matrix-pore and/or NP-pore interfaces is a metal or metal oxide particle.

In certain embodiments, the templating component (i.e. NP-decorated templating particles or colloids) can include one or more of the following shapes: spherical, elongated, concave, amorphous, facetted, fiber-like, and flake-shaped.

In certain embodiments, methods described herein facilitate formation of highly porous structures with interconnected porosity on multiple length scales, as well as the decoration of pore surfaces with functional components including, but are not limited to, catalytic and co-catalytic components. The functional components can be designed to provide catalytic, photocatalytic, electrocatalytic, photonic, antimicrobial, UV-visible absorbing and/or emitting, and sensing properties, and a combination thereof.

In certain embodiments, the functional components can be further modified through one or more growth processes.

Upon review of the description and embodiments provided herein, those skilled in the art will understand that modifications and equivalent substitutions can be performed in carrying out the invention without departing from the essence of the invention. Thus, the invention is not meant to be limiting by the embodiments described explicitly above.

What is claimed is:

1. A catalytic material, comprising:
an interconnected matrix material defining a network of interconnected channels; and
a plurality of catalytic nanoparticles having proximal portions and distal portions, wherein the plurality of catalytic nanoparticles are partially embedded in and chemically bonded to the matrix material such that the proximal portions of the plurality of catalytic nanoparticles are embedded in and chemically bonded to the matrix material and the distal portions of the plurality of catalytic nanoparticles are exposed to the interconnected channels.

2. The catalytic material of claim 1, wherein at least part of the proximal portions are chemically bound at the interface by covalent interaction, ionic bonding, through formation of a species selected from the group consisting of oxides, mixed oxides, oxometallates, aluminates, mixed aluminates, silicates, mixed silicates, alumosilicates, titanates, mixed titanates, stannates, mixed stannates, stannites, mixed stannites, cerium oxides, mixed cerium oxides, vanadium oxides, mixed vanadium oxides, boron oxides, zirconium oxides, mixed zirconium oxides, hafnium oxides, mixed hafnium oxides, yttrium oxides, mixed yttrium oxides, niobium oxides, mixed niobium oxides, iron oxides, mixed iron oxides, tin oxides, mixed tin oxides, cobalt oxides, mixed cobalt oxides, indium oxide, mixed indium oxide, scandium oxides, mixed scandium oxides, rare-earth oxides, uranium oxides, thorium oxides, mixed oxides of elements from group I, mixed oxides of elements from group II, mixed oxides of elements from group III, mixed oxides of elements from group IV, mixed oxides of elements from group V, mixed oxides of elements from group VI, heteropolyacids, zeolites, carbides, metal alloys, intermetallic compounds, organometallic compounds, coordination compounds, organic compounds, synthetic polymers, natural polymers, inorganic compounds, and combinations thereof.

3. The catalytic material of claim 2, wherein the species is formed by one of local oxidation or reduction of at least one of the interconnected matrix material and the plurality of catalytic nanoparticles near the proximal portions between the matrix material and the plurality of catalytic nanoparticles.

4. The catalytic material of claim 1, wherein the proximal portions of the plurality of catalytic nanoparticles are chemically bound to the matrix material and the chemical binding creates a different catalytic species than unmodified catalytic nanoparticles.

5. The catalytic material of claim 1, wherein the distal portions are chemically modified at the interface between the interconnected channels and the plurality of catalytic nanoparticles.

6. The catalytic material of claim 1, wherein the distal portions are physically modified to produce a roughened distal portion or a faceted distal portion.

7. The catalytic material of claim 1, wherein a circumference of each catalytic nanoparticle of the plurality of catalytic nanoparticles at the interface between the matrix material, the catalytic nanoparticle, and the interconnected channels is chemically modified.

8. The catalytic material of claim 1, wherein
the matrix material has a first phase, a first crystallinity, or a first porosity,
a portion of the matrix material at the interface between the plurality of catalytic nanoparticles and the matrix material has a second phase, a second crystallinity, or a second porosity, and
at least one of:
the first phase is different from the second phase,
the first crystallinity is different from the second crystallinity, or
the first porosity is different from the second porosity.

9. The catalytic material of claim 1, wherein the interface between the matrix material and the interconnected channels is chemically modified.

10. The catalytic material of claim 9, wherein the chemical modification introduces a wettability gradient, changes the wettability, changes the surface energy of the matrix material, or acts as recognition units for attracting a target moiety.

11. The catalytic material of claim 9, wherein the chemical modification at the interface between the matrix material and the interconnected channels comprises a catalytic interfacial material on the surface of the matrix material.

12. The catalytic material of claim 11, wherein the interfacial material is in the form of one or more films, one or more islands, or as a plurality of particles.

13. The catalytic material of claim 1, wherein the proximal portions and the distal portion have at least one of different crystallinity, crystal structure, chemical composition, faceting, roughness, morphology or density.

14. The catalytic material of claim 1, wherein the plurality of catalytic nanoparticles comprise one or more metals.

15. The catalytic material of claim 14, wherein the plurality of catalytic nanoparticles comprise two or more metals and the plurality of catalytic nanoparticles are bimetallic, multimetallic, metal alloys, intermetallic compounds, or combinations thereof.

16. The catalytic material of claim 15, wherein
the proximal portions comprise a first atomic distribution or a first chemical composition of two or more metals and the distal portions comprises a second atomic distribution or a second chemical composition, of the two or more metals, and
at least one of
the first atomic distribution is different from the second atomic distribution, or
the first chemical composition is different from the second chemical composition.

17. The catalytic material of claim 14, wherein the plurality of catalytic nanoparticles comprise two or more metals and the plurality of catalytic nanoparticles of two or more metals comprise at least some nanoparticles of a first metal and at least some nanoparticles of a second metal.

18. The catalytic material of claim 14, wherein the distal portions further comprise a crust or shell of a metal or metal alloy that is different from the bulk of the plurality of catalytic nanoparticles.

19. The catalytic material of claim 1, wherein the matrix material further includes a second network of channels smaller than the network of interconnected channels.

20. The catalytic material of claim 1, wherein the interconnected matrix material comprises silica, alumina, titania, ceria, boron oxide, zirconia, hafnia, yttria, vanadia, niobia, tantalum oxide, iron oxides, cobalt oxides, tin oxides, indium oxide, scandium oxide, rare-earth oxides, uranium oxides, thorium oxides, mixed oxides of elements from group I, mixed oxides of elements from group II, mixed oxides of elements from group III, mixed oxides of elements from group IV, mixed oxides of elements from group V, mixed oxides of elements from group VI, silicon, germanium, tin, silicon doped with group III elements, or silicon doped with group V elements, germanium doped with group III elements, germanium doped with group V elements, tin doped with group III elements, tin doped with group V elements, aluminates, mixed aluminates, silicates, mixed silicates, alumosilicates, titanates, mixed titanates, stannates, mixed stannates, stannites, mixed stannites, oxometallates, heteropolyacids, zeolites, metal-organic frameworks, organometallic compound, synthetic polymers, natural polymers, metals, alloys, and combinations thereof.

21. The catalytic material of claim 1, wherein the plurality of catalytic nanoparticles comprise a metal, a metal oxide, a mixed metal oxide, a metal sulfide, a metal pnictide, a binary metal salt, a complex metal salt, a metal salt of an organic acid, a metal salt of inorganic acid, a metal salt of a complex acid, a base, an acid, a metal alloy, a multimetallic species, an intermetallic compound, an organometallic compound, a coordination compound, silicon, germanium, silicon doped with group III elements, silicon doped with group III V elements, germanium doped with group III elements, germanium doped with group V elements, platinum group metals, platinum group metal oxides, iron, cobalt, nickel, ruthenium, rhodium, palladium, osmium, iridium, platinum, copper, silver, gold, iron oxides, cobalt oxides, nickel oxides, ruthenium oxides, rhodium oxides, palladium oxides, osmium oxides, iridium oxides, platinum oxides, copper oxides, silver oxides, gold oxides, vanadium oxides, niobium oxide, tantalum oxide, chromium oxide, molybdenum oxide, tungsten oxide, scandium oxide, yttrium oxide, lanthanum oxide, rare-earth metal oxide, and combinations thereof.

22. A monolithic porous substrate having the catalytic material of claim 1 disposed thereon.

23. The monolithic porous substrate of claim 22, wherein the monolithic porous substrate is used in a catalytic converter, a fuel cell, or an electrolyzer.

* * * * *